United States Patent
Obayashi et al.

[11] Patent Number: 6,100,009
[45] Date of Patent: Aug. 8, 2000

[54] IMAGE RECORDING MEDIUM, IMAGE RECORDING METHOD AND HEAT COLORING POLYMER COMPOUND

[75] Inventors: Tatsuhiko Obayashi; Junichi Yamanouchi; Atsuhiro Ohkawa, all of Kanagawa, Japan

[73] Assignee: Fuji Photo Film Co., Ltd., Kanagawa, Japan

[21] Appl. No.: 09/173,165

[22] Filed: Oct. 15, 1998

[30] Foreign Application Priority Data

Oct. 15, 1997 [JP] Japan ................. 9-282272
Oct. 15, 1997 [JP] Japan ................. 9-282273

[51] Int. Cl.$^7$ ............... G03C 1/73; G03C 5/18; G03C 5/16
[52] U.S. Cl. ................. 430/270.1; 430/280.1; 430/292; 430/945; 430/944; 430/914; 522/35; 522/151; 522/152; 526/268; 526/259; 526/257; 526/243; 526/287
[58] Field of Search ................. 526/243, 244, 526/256, 257, 266, 270, 284, 287, 273, 278, 298, 292.3, 309, 316, 259, 261, 263, 297, 279, 268, 311, 312; 430/280.1, 270.1, 270.14, 914, 945, 944, 292; 522/35, 151, 152

[56] References Cited

U.S. PATENT DOCUMENTS 4,528,311 7/1985 Beard et al. ............. 526/259

FOREIGN PATENT DOCUMENTS 8-248561 9/1996 Japan.
WO 94/10607 5/1994 WIPO.

OTHER PUBLICATIONS

A Novel Concept of Acid Proliferation, Autocatalytic Fragmentation of an Acetoacetate Derivative as an Acid Amplifier, Chemistry Letters 1995, pp. 551–552.

*Primary Examiner*—Janet Baxter
*Assistant Examiner*—Sin J. Lee
*Attorney, Agent, or Firm*—Sughrue, Mion, Zinn, Macpeak & Seas, PLLC

[57] ABSTRACT

An image recording medium is disclosed which comprising: an acid generating agent capable of generating an acid by the action of heat or an acid, which is represented by the following formula (1); and a compound of causing variation in the absorption region of from 360 to 900 nm by the intramolecular or intermolecular reaction triggered by the action of an acid:

$$W^1OP \quad (1)$$

wherein $W^1$ represents a residue of an acid represented by $W^1OH$, and P represents an acid-sensitive substituent capable of splitting off at a temperature of 150° C. or less due to catalysis by $W^1OH$.

17 Claims, No Drawings

IMAGE RECORDING MEDIUM, IMAGE RECORDING METHOD AND HEAT COLORING POLYMER COMPOUND

FIELD OF THE INVENTION

The present invention relates to an image recording medium using a coloring (or decolorizing) reaction accelerated by an acid catalyst, more specifically, the present invention relates to an image recording medium having high sensitivity and good storability using an acid breeding system.

The present invention also relates to a copolymer of a monomer having a partial structure capable of generating an acid by the heating or action of an acid and a monomer having a partial structure of causing variation in the absorption by the contact with an acid, to an image recording medium having high sensitivity and good storability using the polymer and to an image forming method using the recording medium.

BACKGROUND OF THE INVENTION

The thermosensitive recording material expresses the image area and the non-image area as a temperature difference distribution and many systems therefor have been proposed, such as transfer by the melting or sublimation of a coloring agent, color formation reaction between two components due to heat-melting or rupture of a capsule, or change in the optical properties due to phase transition. These kinds of thermosensitive recording mediums are advantageous in that a recording image can be obtained by a dry and simple system and the maintenance is not necessary, thus, are widely used as an output material of various printers, word processors, facsimiles and the like. Furthermore, to keep up with the progress of laser recording devices in recent years, application of the thermosensitive recording medium to optical disks or photomechanical materials is being studied.

The photomechanical material heretofore used is a silver halide light-sensitive material requiring a wet processing. However, because of demands for simplification of the processing steps and problems of environmental pollution by the processing solutions, development of a dry process is required and several technical proposals using a thermosensitive recording system have been recently made. In view of the resolution, recording of an image using a laser is preferred and for example, a system using a high output laser, called dye ablation, has been developed. Recording materials therefor are disclosed in JP-A-7-164755 (the term "JP-A" as used herein means an "unexamined published Japanese patent application"), JP-A-7-149063 and JP-A-7-149065, and image forming apparatuses are disclosed in JP-A-8-48053 and JP-A-8-72400. According to this system, a recording material comprising a support having coated thereon a dye composition comprising an image dye, a substance having an absorption in the laser wavelength region (infrared ray absorptive substance) and a binder is irradiated with a laser beam from the dye layer side to record an image. The energy given by the laser beam brings about abrupt local changes in the image forming layer at the spot of the laser beam thrusting the material and thereby expels the substance from the layer. According to the above-described patent publications, this is not a completely physical change (for example, melting, evaporation or sublimation) but a kind of chemical change (for example, bond destruction), and the image dye is not partially removed but completely removed. The dye ablation system has, however, problems that a high output laser is indispensable so as to increase the dye removal efficiency at the site exposed to a laser beam and a dust collector for collecting dyes removed is necessary to be installed in combination.

As a system which can dispense with a dust collector, an ablation transfer image recording method using a laser heat source is disclosed in U.S. Pat. No. 5,171,650. This system uses a dye donor sheet containing a dynamic release layer formed by overcoating an ablative carrier topcoat, where an image is transferred to a separate receiving sheet which is placed adjacently and aligned. Therefore, the sheet left useless after the recording of an image raises a problem of waste materials. Furthermore, also in this case, a high output laser is indispensable so as to increase the transfer efficiency. Thus, conventional thermosensitive recording systems using ablation by a laser cannot dispense with a high output laser and are bound to the problem of dusts or waste materials.

On the other hand, a method expanded from a system called "dry silver" is described in JP-A-6-194781 as a heat-recording system involving no ablation using a laser. According to this system, recording is performed by a laser on a recording material containing a silver source capable of thermal reduction, a reducing agent for silver ion and a light-heat conversion dye. This system is, however, deficient in the practical performance in view of storability of the non-image area and heat sensitivity.

Another example of the thermosensitive recording system using a laser is a compound capable of changing the absorption due to thermal decomposition of carbamate described in U.S. Pat. Nos. 4,602,263 and 4,826,976. U.S. Pat. No. 5,243,052 describes a compound of forming a yellow color due to thermal decomposition of the t-butoxycarbonyl group introduced into the hydroxyl group. These systems use an irreversible monomolecular reaction and are suited for the image recording within a short time using a laser, however, the sensitivity is not sufficiently high and improvement for higher sensitivity is needed. Higher sensitivity may be achieved by allowing an acid catalyst present together but in turn a problem arises in the storage stability.

With respect to the method for forming a UV mask image (360 nm to 420 nm; corresponding to the exposure light source for PS plate) used for the photomechanical material, heat mode systems using a laser have not been proposed in practice.

U.S. Pat. Nos. 5,286,612, 5,395,736 and 5,441,850, WO94/10606 and WO94/10607 describe a recording material comprising a compound which generates an extra strong acid of pKa<0 by the action of an ultraviolet ray, a secondary acid generating agent which generates a secondary acid in the presence of an extra strong acid, and a compound which changes in the color upon contacting with the secondary acid. This system is effective for achieving high sensitivity of a recording material. However, generation of the secondary acid from a secondary acid generating agent described in those patent publications is catalyzed only by an extra strong acid generated from an extra strong acid precursor and although the patent publications state that about 20 molecules of the secondary acid precursor are catalyzed to decompose per one molecule of the extra strong acid, the secondary acid produced has no catalytic capability. Accordingly, increase in the sensitivity by the acid breeding in geometrical progression cannot be expected.

As a compound which breeds an acid by the action of an acid, K. Ichimura, *Chem. Lett.*, 551 (1995) and JP-A-8-248561 describe a compound capable of producing an organic acid due to decomposition by an acid catalyst. In these publications, an acid reactive polymer composition comprising a combination of a photoacid generating agent and a substance of causing structural change by the action of an acid is described. However, the structural change caused by the action of an acid generated from a photoacid generating agent is to cause solubilization or insolubilization in a polar solvent or an aqueous alkali solution and the end use thereof is a so-called photoresist. These publications are completely silent on the recording material using change in the absorption.

The present inventors have made extensive investigations on the compounds developed by Ichimura et al and have found that the compounds reported by Ichimura et al mostly have a function as a thermal acid generating agent and can be used for the image formation because of their capability to act as an acid generating agent even if a photo or thermal acid generating agent is not newly added.

SUMMARY OF THE INVENTION

A first object of the present invention is to provide a novel image recording medium which has high thermal sensitivity, enables recording at a low output laser on the level of not causing ablation (image recording responsive to 360 to 420 nm indispensable for the photomechanical mask film) even when a heat mode image recording system using a laser is employed, can dispense with a separate image receiving sheet, and has excellent storage stability, and an image recording method using the medium.

A second object of the present invention is to provide a novel polymer capable of coloring (or decolorizing) only by an acid in a catalytic amount or by the action of heat.

These objects of the present invention can be attained by the following inventions 1) to 27).

1) An image recording medium comprising:

an acid generating agent capable-of generating an acid by the action of heat or an acid, which is represented by the following formula (1); and a compound of causing variation in the absorption region of from 360 to 900 nm by the intramolecular or intermolecular reaction triggered by the action of an acid:

$$W^1OP \quad (1)$$

wherein $W^1$ represents a residue of an acid represented by $W^1OH$, and P represents an acid-sensitive substituent capable of splitting off at a temperature of 150° C. or less due to catalysis by $W^1OH$.

2) The image recording medium as described in 1), wherein the acid generating agent represented by formula (1) is a compound selected from the compounds represented by the following formulae (2) to (5):

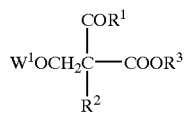

(2)

wherein $R^1$ represents an alkyl group or an aryl group; $R^2$ represents an alkyl group; $R^3$ represents a secondary or tertiary alkyl group having a hydrogen atom at the β-position; and $W^1$ represents a residue of an acid represented by $W^1OH$;

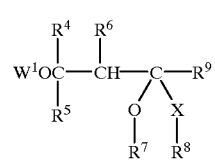

(3)

wherein $R^4$, $R^5$, $R^6$ and $R^9$ each represents a hydrogen atom, an alkyl group or an aryl group; $R^7$ and $R^8$ each represents an alkyl group, an aryl group or a silyl group; $R^7$ and $R^8$ may form a ring; X represents O or S; and $W^1$ represents a residue of an acid represented by $W^1OH$;

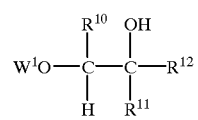

(4)

wherein $R^{10}$, $R^{11}$ and $R^{12}$ each represents a hydrogen atom, an alkyl group or an aryl group; and $W^1$ represents a residue of an acid represented by $W^1OH$;

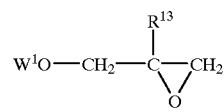

(5)

wherein $R^{13}$ represents an alkyl group or an aryl group; and $W^1$ represents a residue of an acid represented by $W^1OH$.

3) The image recording medium as described in 1) or 2), which further comprises a compound capable of generating an acid by the action of light or heat in addition to the acid generating agent represented by formula (1).

4) The image-recording medium as described in 3), wherein the acid generating agent capable of generating an acid by the action of light or heat is a compound capable of generating a sulfonic acid, a carboxylic acid or a phosphoric acid.

5) The image recording medium as described in 1) to 4), wherein the compound of causing variation in the absorption region of from 360 to 900 nm by the action of an acid is a compound having at least one amino group substituted by a substituent which is accelerated to split off by the action of an acid, and causing variation in the absorption region due to the splitting off of said substituent.

6) The image recording medium as described in 5), wherein said substituent of the amino group, which is accelerated to split off by the action of an acid, is a secondary or tertiary alkoxycarbonyl group having a hydrogen atom at the β-position.

7) The image recording medium as described in 1) to 4), wherein the compound of causing variation in the absorption region of from 360 to 900 nm by the action of an acid is a compound having at least one hydroxyl group substituted by a substituent which is accelerated to split off by the action of an acid, and causing variation in the absorption region due to removal of said substituent.

8) The image recording medium as described in 7), wherein the substituent of the hydroxyl group, which is accelerated to split off by the action of an acid, is a secondary or tertiary alkoxycarbonyl group having a hydrogen atom at the β-position, an alkoxymethyl group or a silyl group.

9) The image recording medium as described in 1) to 8), which further comprises an infrared ray absorptive substance.

10) A method for recording an image, which comprises scan-exposing the image recording medium described in 1) by a laser beam and then heating the entire surface of the image recording medium at a temperature of from 60 to 150° C.

11) A polymer represented by the following formula (6):

(6)

wherein A represents a repeating unit obtained by polymerizing at least one vinyl monomer having a function of generating an acid by the action of an acid and further breeding an acid by the action of an acid generated from the vinyl monomer itself; B represents a repeating unit obtained by polymerizing at least one vinyl monomer having a partial structure of causing an absorption region of from 360 to 900 nm by the action of an acid; C represents a repeating unit obtained by polymerizing at least one vinyl monomer copolymerizable with A and B; and x, y and z each represents % by weight and satisfy the conditions of $1 \leq x \leq 99$, $1 \leq y \leq 99$, $0 \leq z \leq 98$ and $x+y+z=100$.

12) The polymer as described in 11), wherein A in formula (6) has a function of generating an acid by the action of heat.

13) The polymer as described in 12), wherein A in formula (6) is a repeating unit obtained by polymerizing at least one vinyl monomer represented by the following formula (7):

(7)

wherein $R^{21}$ represents an electron-withdrawing group having a Hammett's σp value greater than 0; $R^{22}$ represents an alkyl group or an aryl group; $R^{23}$ represents a secondary or tertiary alkyl group having a hydrogen atom at the β-position; $W^2$ represents a residue of an acid represented by $W^2OH$; and any one of the substituents $R^{21}$, $R^{22}$, $R^{23}$ and $W^2$ represents a polymerizable vinyl group.

14) An image recording medium which comprises a polymer having both (i) a partial structure of generating an acid by the action of an acid and further breading an acid by the action of an acid generated from the partial structure itself and (ii) a partial structure of causing variation in the absorption region of from 360 to 900 nm by the action of an acid.

15) The image recording medium as described in 14), wherein the polymer is a polymer represented by formula (6):

(6)

wherein A represents a repeating unit obtained by polymerizing at least one vinyl monomer having a function of generating an acid by the action of an acid and further breeding an acid by the action of an acid generated from the vinyl monomer itself; B represents a repeating unit obtained by polymerizing at least one vinyl monomer having a partial structure of causing an absorption region of from 360 to 900 nm by the action of an acid; C represents a repeating unit obtained by polymerizing at least one vinyl monomer copolymerizable with A and B; and x, y and z each represents % by weight and satisfy the conditions of $1 \leq x \leq 99$, $1 \leq y \leq 99$, $0 \leq z \leq 98$ and $x+y+z=100$.

16) The image recording medium as described in 14), which further comprises an acid generating agent capable of generating an acid by the action of light or heat.

17) The image recording medium as described in 14), which further comprises (i) an acid generating agent capable of generating an acid by the action of heat and (ii) an infrared ray absorptive substance.

18) The image recording medium as described in 14), wherein the polymer is a polymer represented by formula (6), and the image recording medium further comprises an infrared ray absorptive substance, and wherein A in formula (6) has a function of generating an acid by the action of heat.

19) A method for recording an image, which comprises scan-exposing the image recording medium described in 14) by a laser beam.

20) A method for recording an image, which comprises scan-exposing an image recording medium described in 14) by a laser beam and then heating the entire surface of the image recording medium at a temperature of from 60 to 150° C.

21) An image recording medium comprising a polymer having both a moiety of generating an acid by the action of an acid and a partial structure of causing variation in the absorption region of from 360 to 900 nm by the action of an acid.

22) The image recording medium as described in 21), which further comprises an acid generating agent capable of generating an acid by the action of light or heat.

23) The image recording medium as described in 21), wherein the polymer is a polymer represented by formula (6).

24) The image recording medium as described in 21), wherein A in formula (6) is a repeating unit obtained by polymerizing at least one vinyl monomer represented by formula (7).

25) The image recording medium as described in 21), which further comprises an infrared ray absorbing substance.

26) A method for forming an image, which comprises scan-exposing the image recording medium described in 21) by a laser beam.

27) A method for forming an image, which comprises scan-exposing the image recording medium described in 21) by a laser beam and then heating the entire surface of the image recording medium at a temperature of from 60 to 150° C.

DETAILED DESCRIPTION OF THE INVENTION

The present invention is described in detail below.

The compound represented by formula (1) has a function of generating an acid self-breedingly by the action of an acid generated from the acid generating agent itself due to thermal decomposition, or a function of generating an acid self-breedingly by the action of an acid generated from the acid generating agent itself after an acid is generated by the reaction of the acid generating agent and an acid generated from the other acid generating agent.

In the acid generating agent represented by formula (1), $W^1$ represents a residue of an acid represented by $W^1OH$ (e.g., sulfonic acid, carboxylic acid, phosphoric acid, phenol). $W^1OH$ is preferably an acid having pKa<3. Preferred examples thereof include p-toluenesulfonic acid, benzenesulfonic acid, methanesulfonic acid, polyvinylbenzenesulfonic acid and p-nitrobenzoic acid.

P represents an acid-sensitive substituent which can be removed by the action of an acid. With the removal of P, an acid represented by $W^1OH$ is formed from an acid generating agent represented by $W^1OP$. Furthermore, P is a substituent capable of splitting off at a temperature of 150° C. or less using the acid ($W^1OH$) formed by the decomposition of the acid generating agent ($W^1OP$) as a catalyst. A substituent capable of splitting off at a temperature of 120° C. or less with a catalyst of $W^1OH$ is preferred. The term "catalyze or catalysis" as used in the present invention means that the decomposition temperature lowers by 10° C. or more, preferably 20° C. or more by adding an acid as compared with the case of using the compound alone. Examples of such a protective group include an alkyl group having a hydrogen atom at the β-position (e.g., tetrahydropyranyl, tetrahydrofuranyl, t-butyl, cyclohexyl, 4,5-dihydro-2-methylfuran-5-yl, 2-cyclohexenyl), an alkoxycarbonyl group having a hydrogen atom at the β-position (e.g., t-butoxycarbonyl, cyclohexyloxycarbonyl, 2-(2-methyl)butoxycarbonyl, 2-(2-phenyl)propyloxycarbonyl, 2-chloroethoxycarbonyl), a silyl group (e.g., trimethylsilyl, triethylsilyl, t-butyldimethylsilyl, phenyldimethylsilyl), and a protective group which is triggered to split off by the decomposition of the above-described group or acetal, ketal, thioketal, pinacol or epoxy ring thereof (examples of this protective group include the groups substituted by $W^1OH$ described later in the description of formulae (1) to (4)).

Examples of the self-breeding type acid generating agent represented by formula (1) include trifluoroacetic acid (α-phenyl-isopropyl)ester, trifluoroacetic acid t-butyl ester, toluenesulfonic acid cyclohexyl ester, triethylsilyl p-nitrobenzoate, tetrahydropyranyl p-nitrobenzoate, poly(4-vinyl-1-t-butoxycarbonyloxy-2-nitrobenzene) and poly(cyclohexyl 4-vinylbenzenesulfonate), however, in view of the breeding sensitivity and storage stability, the following compounds are particularly preferred in the present invention.

A first example is a compound represented by formula (2).

In formula (2), $R^1$ represents an alkyl group (inclusive of an alkyl group having a substituent, preferably having from 1 to 60 carbon atoms, e.g., methyl, ethyl, iso-propyl, t-butyl, trifluoromethyl, ethoxymethyl) or an aryl group (inclusive of an aryl group having a substituent, preferably having from 6 to 60 carbon atoms, e.g., phenyl, naphthyl, 4-chlorophenyl, 2-methoxyphenyl, 4-nitrophenyl, 3-methanesulfonylphenyl), $R^2$ represents an alkyl group (preferably an alkyl group described for $R^1$), $R^3$ represents a secondary or tertiary alkyl group having a hydrogen atom at the 1-position (inclusive of one having a substituent, preferably having from 3 to 60 carbon atoms, e.g., t-butyl, cyclohexyl, tetrahydropyranyl, tetrahydrofuranyl, 4,5-dihydro-2-methylfuran-5-yl, 2-cyclohexenyl), and $W^1$ represents a residue of an acid represented by $W^1OH$ ($W^1OH$ preferably has a pKa of 3 or less, e.g., p-toluenesulfonic acid, benzenesulfonic acid, methanesulfonic acid, polyvinylbenzenesulfonic acid, p-nitrobenzoic acid).

The self-breeding type acid generating agent represented by formula (2) may be formed as a polymer by connecting a plurality of polymerizable groups introduced into the sites capable of substitution. In this case, the polymer may be either a homopolymer or a copolymer with another monomer. The polymer preferably has a molecular weight of from 1,000 to 1,000,000, more preferably from 2,000 to 100,000.

Specific examples of the compound represented by formula (2) are set forth below, however, the present invention is by no means limited thereto.

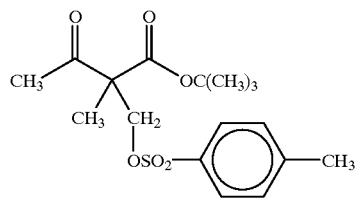

F-(1)

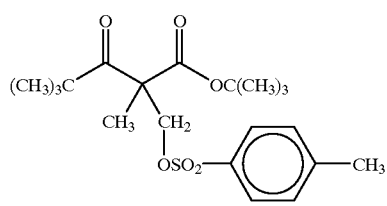

F-(2)

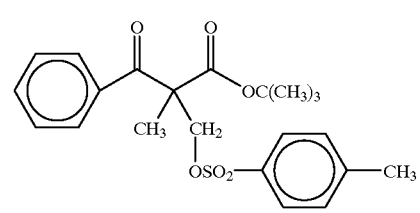

F-(3)

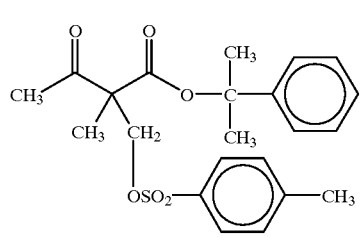

F-(4)

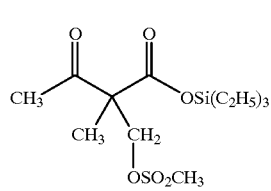

F-(5)

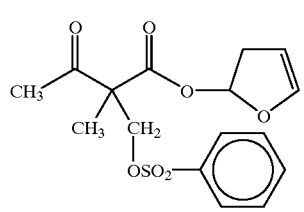

F-(6)

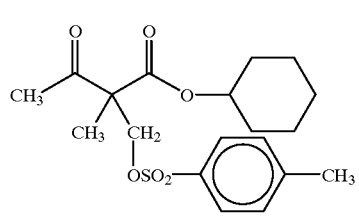

F-(7)

F-(8) 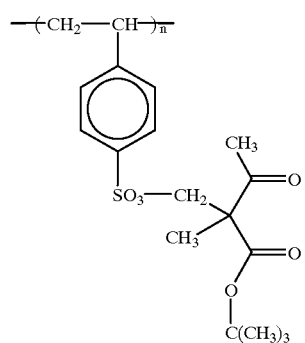
F-(9) 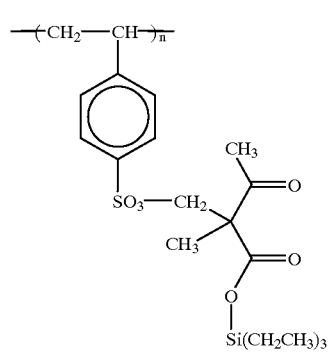
F-(10) 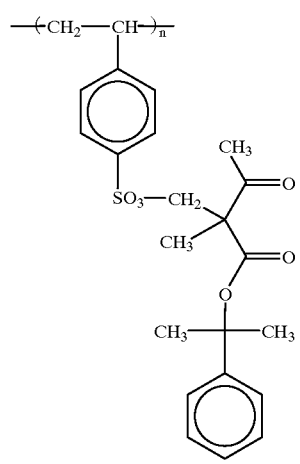
F-(11) 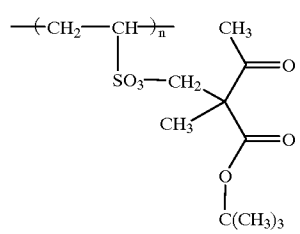
F-(12) 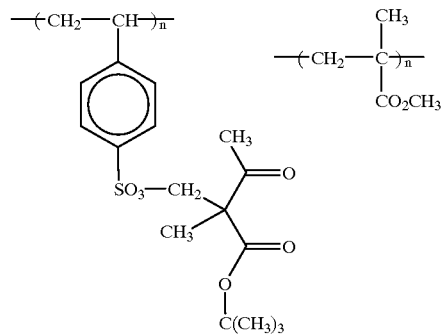
F-(13) 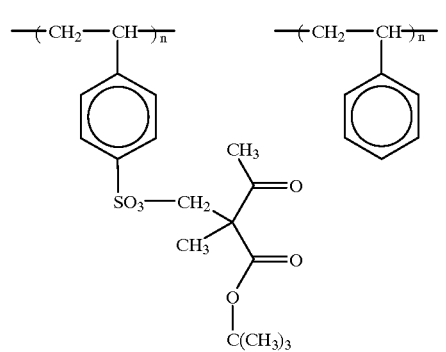
F-(14) 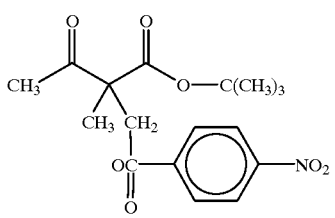
F-(15) 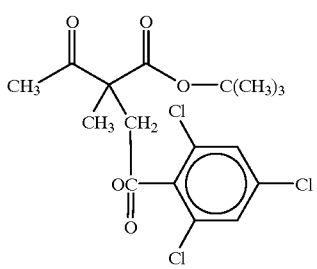
F-(16) 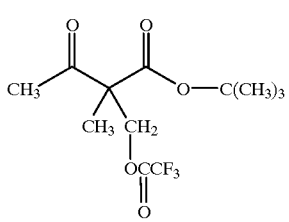

-continued

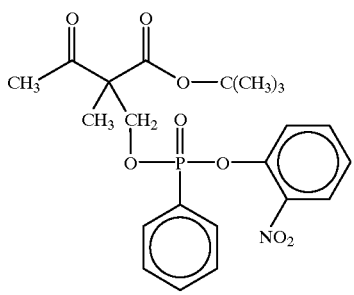
F-(17)

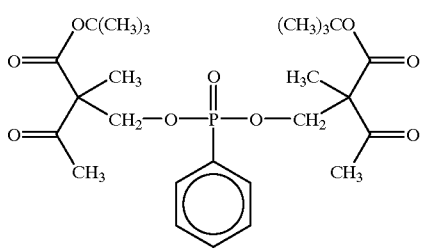
F-(18)

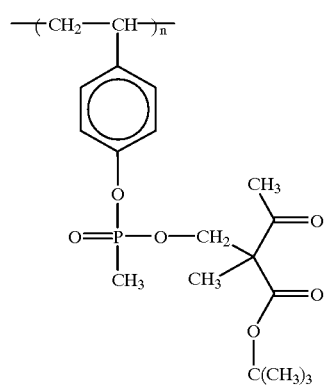
F-(19)

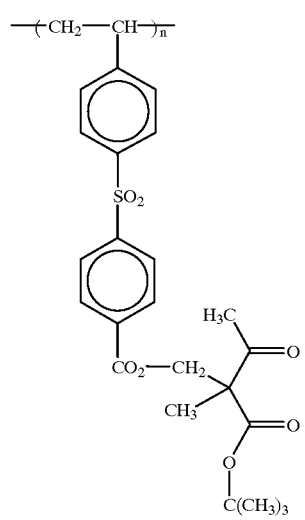
F-(20)

A second example is a compound represented by formula (3).

In formula (3), $R^4$, $R^5$, $R^6$ and $R^9$ each represents a hydrogen atom, an alkyl group (preferred examples thereof are the same as those described for $R^1$) or an aryl group (preferred examples thereof are the same as those described for $R^1$), $R^7$ and $R^8$ each represents an alkyl group (preferred examples thereof are the same as those described for $R^1$), an aryl group (preferred examples thereof are the same as those described for $R^1$) or a silyl group (e.g., trimethylsilyl, triethylsilyl, t-butyldimethyl, phenyldimethylsilyl), $R^7$ and $R^8$ may be combined together to form a ring and in the case when $R^7$ and $R^8$ form a ring, the ring is preferably a 5-, 6-, 7-, 8-, 9- or 10-membered ring, preferably a 5- or 6-membered ring, formed together with —O—C—X—, X represents O or S, and $W^1$ represents a residue of an acid represented by $W^1OH$ (preferred examples thereof are the same as those described for $R^1$).

The self-breeding type acid generating agent represented by formula (3) may be formed as a polymer by connecting a plurality of polymerizable groups introduced into the sites capable of substitution. In this case, the polymer may be either a homopolymer or a copolymer with another monomer. The polymer preferably has a molecular weight of from 1,000 to 1,000,000, more preferably from 2,000 to 100,000.

Specific examples of the compound represented by formula (3) are set forth below, however, the present invention is by no means limited thereto.

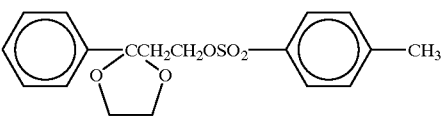
F-(21)

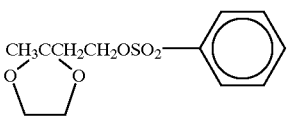
F-(22)

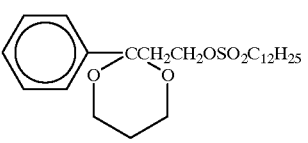
F-(23)

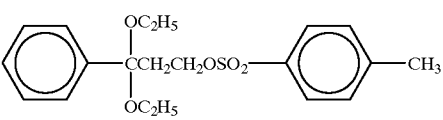
F-(24)

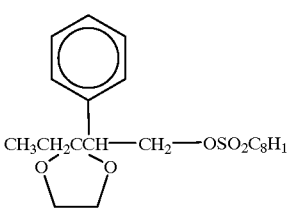
F-(25)

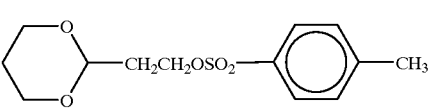
F-(26)

-continued

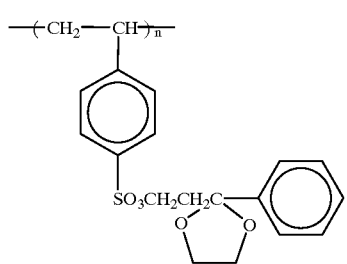
F-(27)

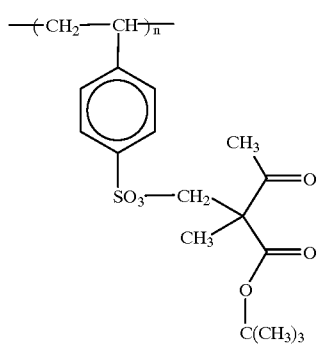
F-(28)

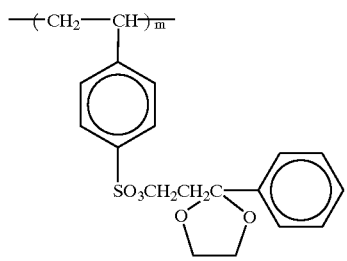

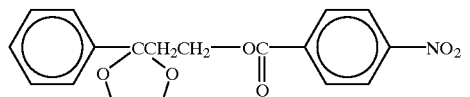
F-(29)

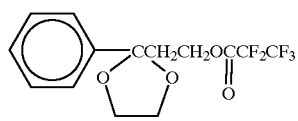
F-(30)

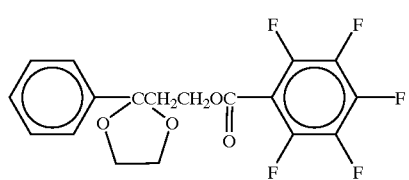
F-(31)

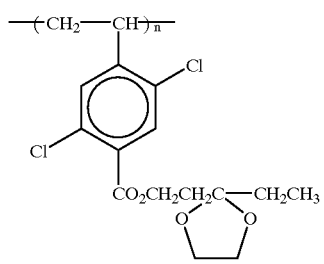
F-(32)

-continued

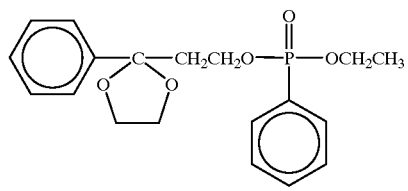
F-(33)

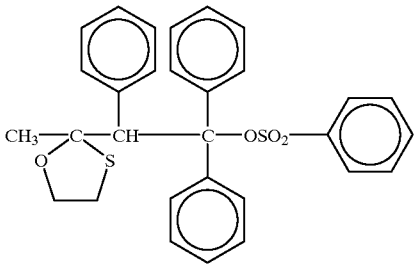
F-(34)

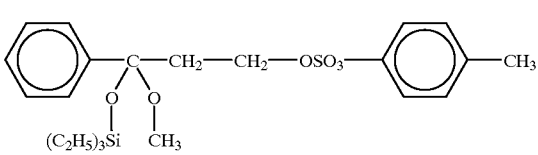
F-(35)

A third example is a compound represented by formula (4).

In formula (4), $R^{10}$, $R^{11}$ and $R^{12}$ each represents a hydrogen atom, an alkyl group (preferred examples thereof are the same as those described for $R^1$) or an aryl group (preferred examples thereof are the same as those described for $R^1$), $W^1$ represents a residue of an acid represented by $W^1OH$ (preferred examples thereof are the same as those described for $R^1$).

The self-breeding type acid generating agent represented by formula (4) may be formed as a polymer by connecting a plurality of polymerizable groups introduced into the sites capable of substitution. In this case, the polymer may be either a homopolymer or a copolymer with another monomer. The polymer preferably has a molecular weight of from 1,000 to 1,000,000, more preferably from 2,000 to 100,000.

Specific examples of the compound represented by formula (4) are set forth below, however, the present invention is by no means limited thereto.

F-(36)

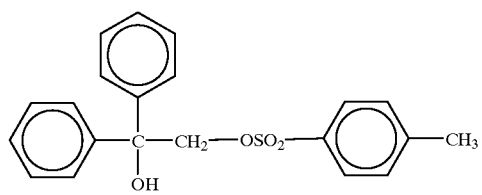

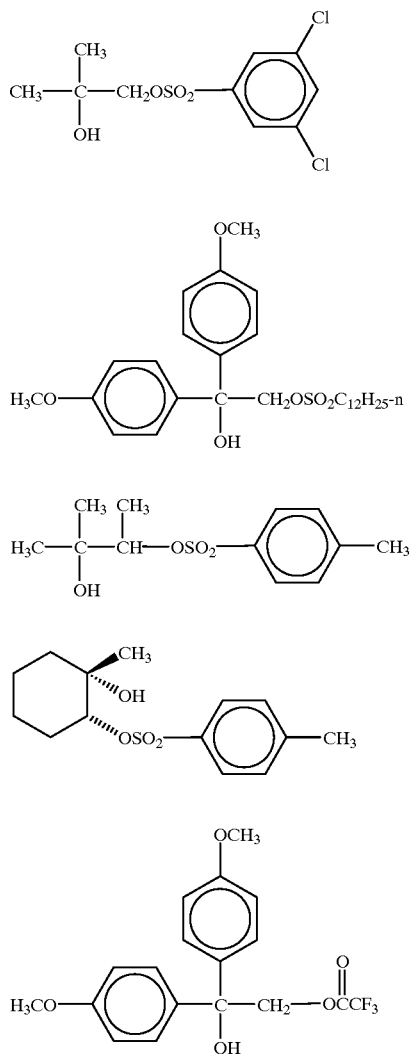
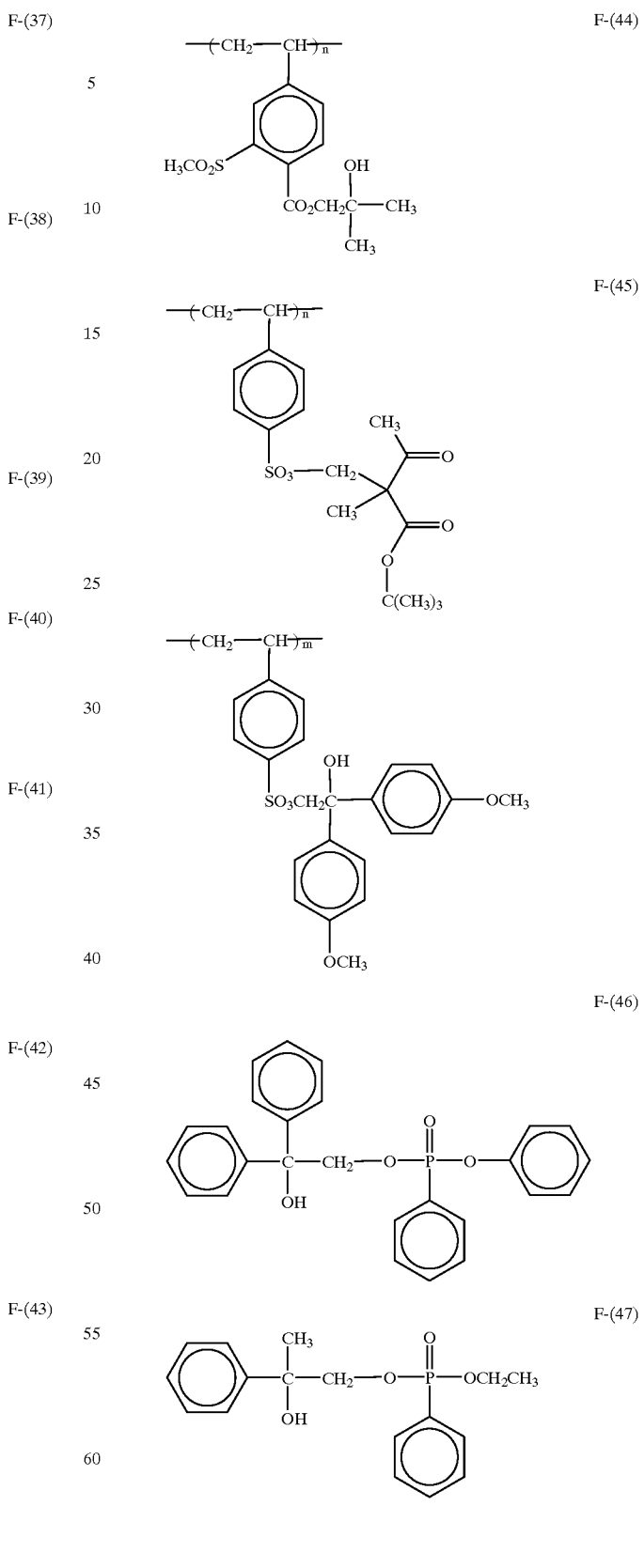

F-(48)
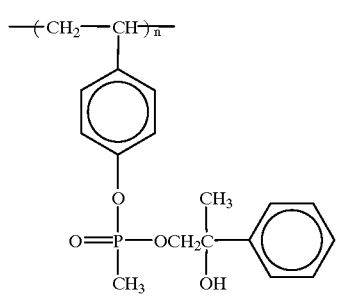

F-(49)
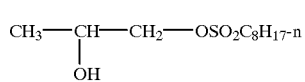

F-(50)
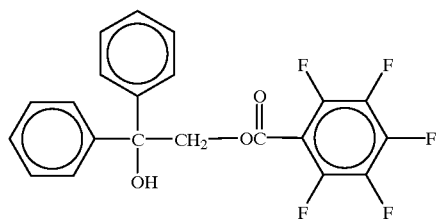

A fourth example is a compound represented by formula (5).

In formula (5), $R^{13}$ represents an alkyl group (preferred examples thereof are the same as those described for $R^1$) or an aryl group (preferred examples thereof are the same as those described for $R^1$), $W^1$ represents a residue of an acid represented by $W^1OH$ (preferred examples thereof are the same as those described for $R^1$).

The self-breeding type acid generating agent represented by formula (5) may be formed as a polymer by connecting a plurality of polymerizable groups introduced into the sites capable of substitution. In this case, the polymer may be either a homopolymer or a copolymer with another monomer. The polymer preferably has a molecular weight of from 1,000 to 1,000,000, more preferably from 2,000 to 100,000.

Specific examples of the compound represented by formula (5) are set forth below, however, the present invention is by no means limited thereto.

F-(51)
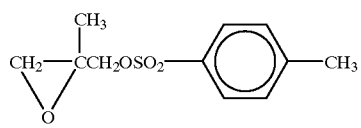

F-(52)
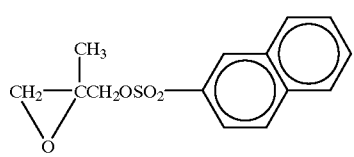

F-(53)
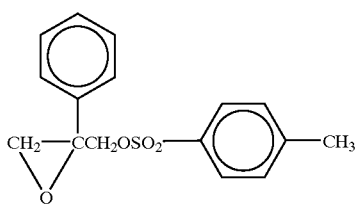

F-(54)
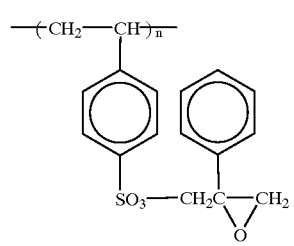

F-(55)
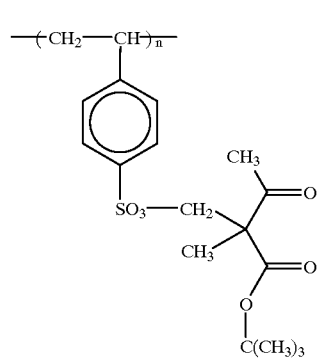

F-(56)
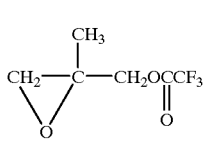

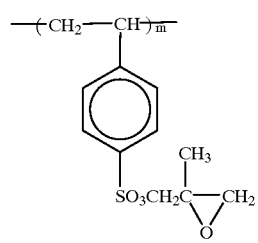

F-(57)
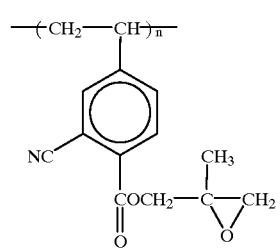

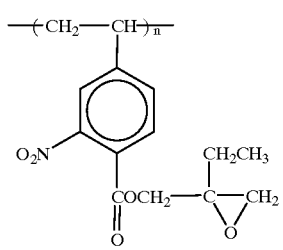
F-(58)

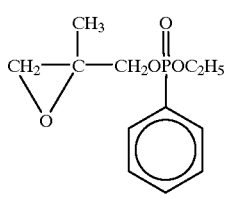
F-(59)

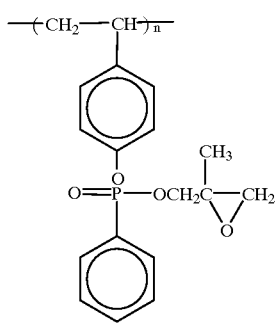
F-(60)

The compounds represented by formulae (1) to (4) can be synthesized according to the method described in JP-A-8-248561.

The amount of the self-breeding acid generating agent added varies depending on the kind of the compound of causing change in the absorption, however, it is preferably from 0.001 to 20 equivalents, more preferably from 0.01 to 5 equivalents, to the compound of causing change in the absorption.

As the compound which newly generates an acid due to the acid generated from the acid generating agent, U.S. Pat. Nos. 5,286,612, 5,395,736 and 5,441,850, WO94/10606 and WO94/10607 describe a squarylic acid derivative and an oxalic acid derivative. These compounds are, however, catalyzed to decompose by an extra acid (acid having pKa<0) and accordingly, the secondary acid produced by the decomposition cannot substantially catalyze further decomposition of a secondary acid precursor. On the other hand, in the present invention, an acid generating agent such that an acid is increased by self-breeding it by utilizing an acid generated from the acid generating agent itself is used and thereby, the sensitivity can be greatly improved. This decomposition is of course catalyzed by an extra acid but can be catalyzed by an acid on the order of a sulfonic acid, a carboxylic acid and a phosphoric acid and in the present invention, an acid generating agent capable of generating a sulfonic acid, a carboxylic acid or a phosphoric acid is preferably used in view of storability.

In the case that the image recording medium of the present invention is used in a photon mode image recording system, it is necessary to add a compound which generates an acid by the action of light.

In contrast, in the case that the image recording medium of the present invention is used in a heat mode image recording system, while it is not necessary to additionally add a thermal acid generating agent if the acid generating agent represented by formula (1) also has a function of generating an acid by the action of heat since an acid is generated by the partial decomposition by the action of heat due to a laser irradiation, a thermal acid generating agent may be added additionally for the purpose of attaining high sensitivity. Furthermore, in the case that the acid generating agent represented by formula (1) does not have a function of generating a acid by the action of heat, it is necessary to add a thermal acid generating agent additionally.

The acid generating agent capable of generating an acid by the action of light or heat is a compound which is originally not an acid but decomposes upon irradiation of light or under heating and generates an acid. In the present invention, an acid generating agent which only decomposes upon laser exposure but does not decompose during storage or at the heating of the entire surface after the laser exposure is preferred.

With respect to the compound capable of generating an acid by the action of light, various examples (e.g., nonionic compounds such as a halide capable of generating hydrogen halogenide, a sulfide capable of generating a sulfonic acid, a carbonylated capable of generating a carboxylic acid and a phosphorus compound capable of generating a phosphoric acid; ionic compounds such as various onium salts) are described in *Imaging yo Yuki Zairyo* (*Organic Materials for Imaging*), pp. 187–198, compiled by Yuki Electronics Zairyo Kenkyu Kai, published by Bunshin Shuppan (1993). Any of these can be used in the present invention, however, in view of low toxicity, acid generating agents capable of a sulfonic acid, a carboxylic acid or a phosphoric acid are particularly preferred. For the purpose of widening the sensitivity region of the photoacid generating agent, various sensitizers (examples thereof are described in *J. Polymer Sci.*, 16 2441 (1978) and the like) can be added.

Specific examples of the compound capable of generating an acid by the action of light, which can be effectively used in the present invention, are set forth below, however, the present invention is by no means limited thereto.

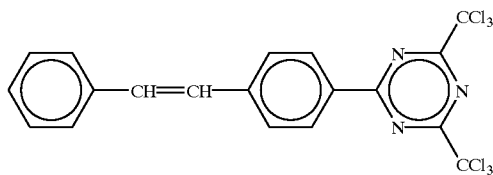
E-(1)

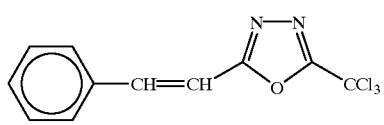
E-(2)

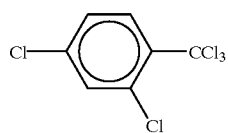
E-(3)

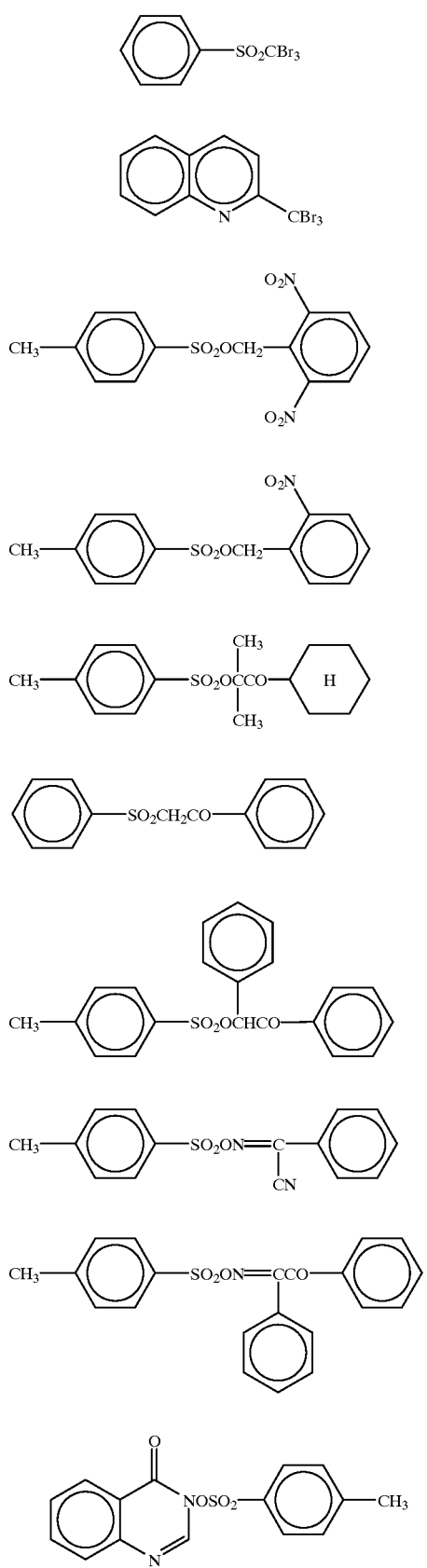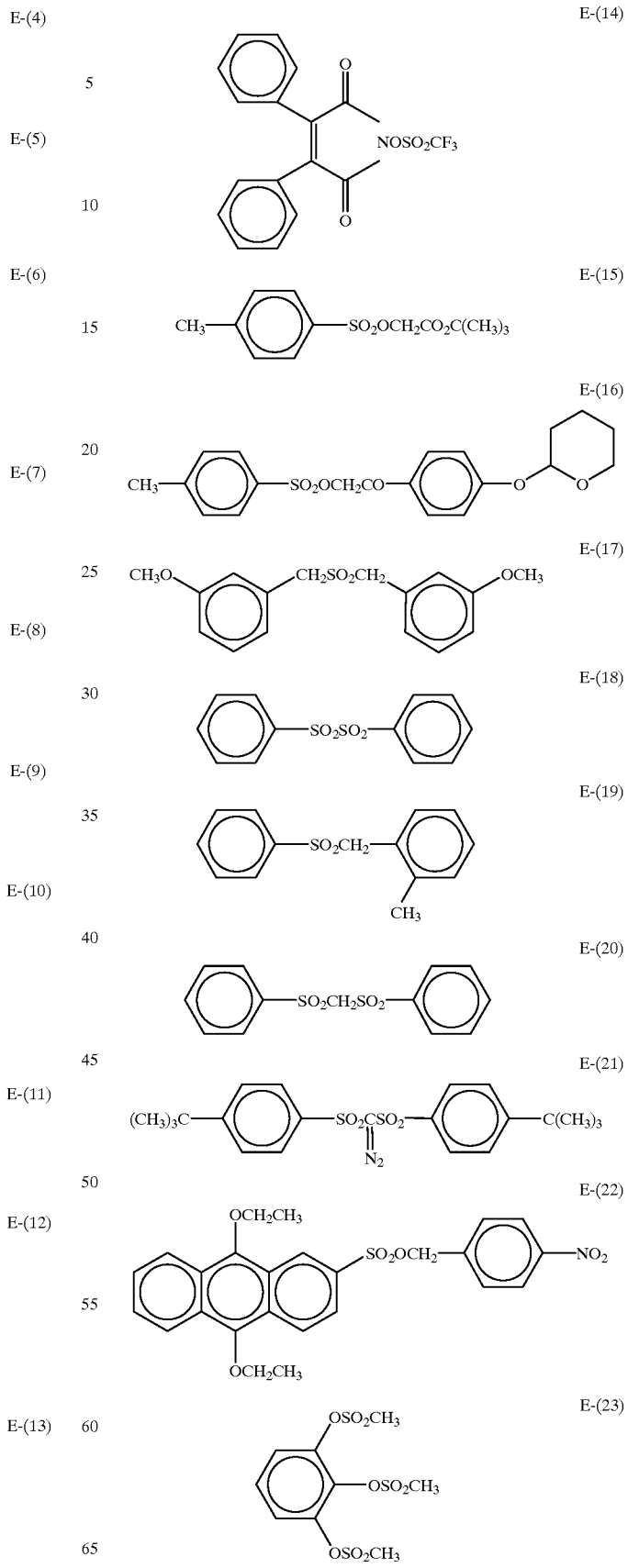

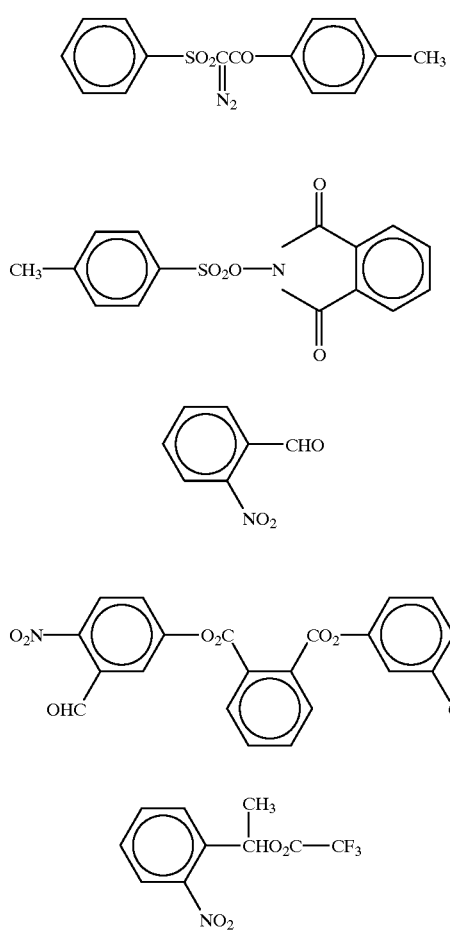
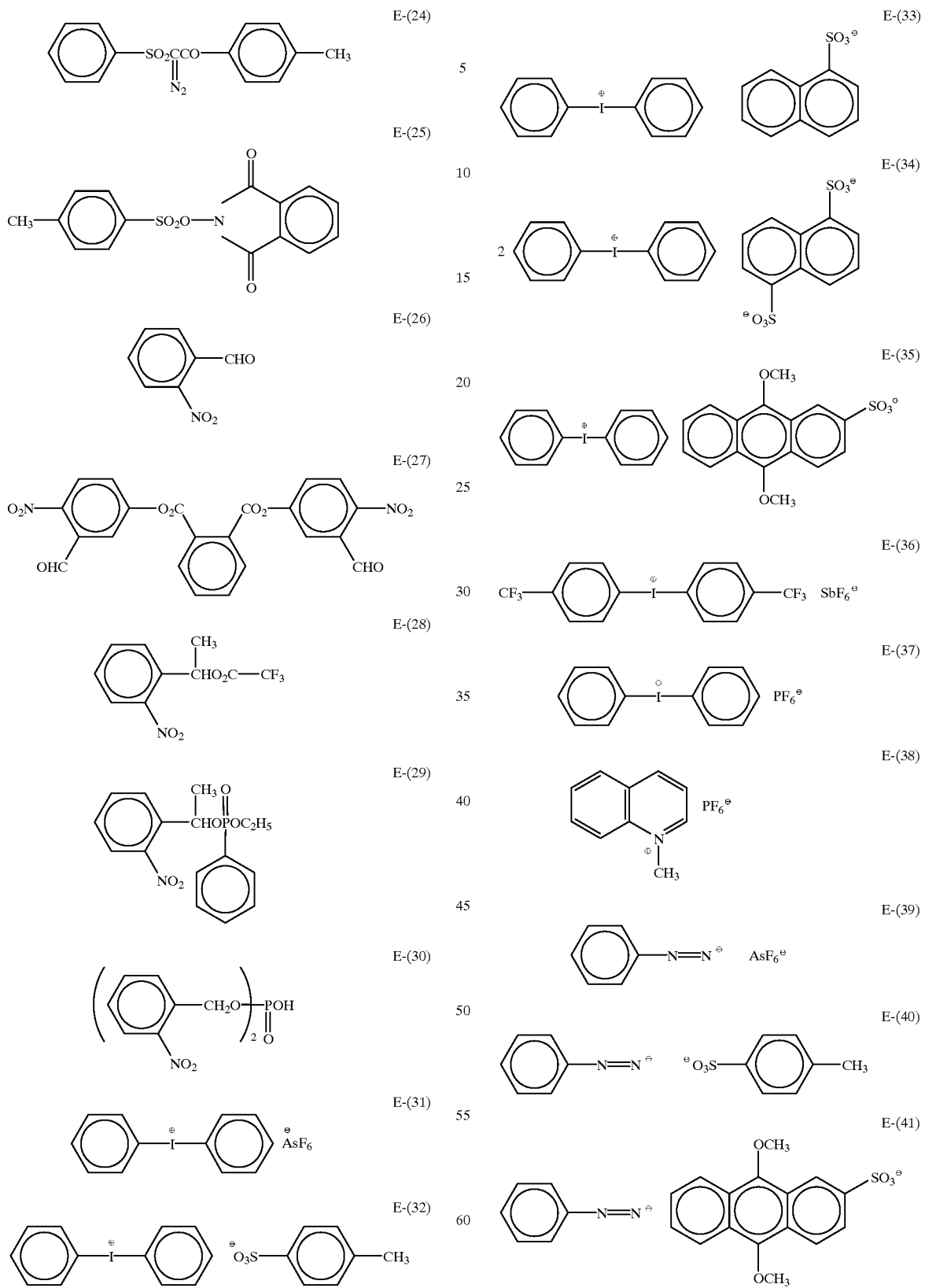

-continued

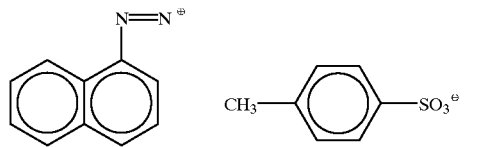
E-(42)

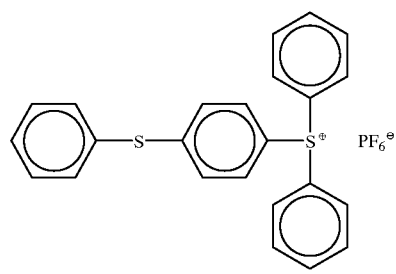
E-(43)

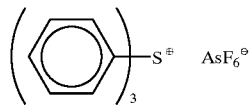
E-(44)

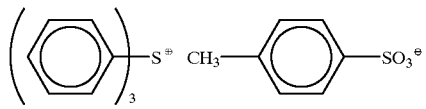
E-(45)

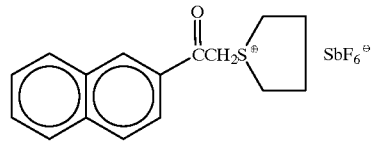
E-(46)

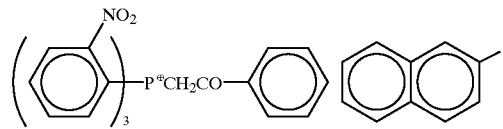
E-(47)

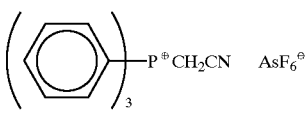
E-(48)

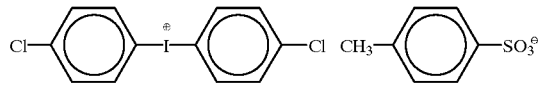
E-(49)

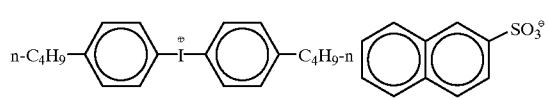
E-(50)

A first example of the thermal acid generating agent capable of generating an acid by the action of heat includes a sulfonate, a $PF_6$ salt, a $AsF_6$ salt and a $SbF_6$ salt of an aromatic onium compound such as diazonium, iodonium, sulfnium and phosphonium. These are a compound which generates an acid also by the action of light and examples thereof include those described as examples of the photoacid generating agent.

A second example of the thermal acid generating agent includes an ammonium salt and an amine complex of an acid. The ammonium salt of an acid can be synthesized by neutralizing an acid with ammonia or amine. Examples of the acid include p-toluenesulfonic acid, benzenesulfonic acid, 1,8-naphthalenedisulfonic acid, p-nitrobenzoic acid, 2,4-dichlorobenzoic acid, phenylphosphonic acid and $HPF_6$. Examples of the amine complex of an acid include complexes obtained by mixing $BF_3Et_2O$ with an amine. The amine may be any of primary amine, secondary amine and tertiary amine and preferably has good volatility. Examples thereof include methylamine, ethylamine, iso-propylamine, t-butylamine, aniline and pyridine.

Specific examples of the ammonium salt of an acid are set forth below, however, the present invention is by no means limited thereto.

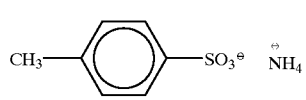
E-(51)

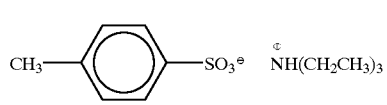
E-(52)

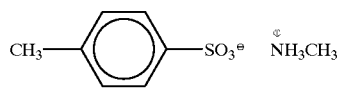
E-(53)

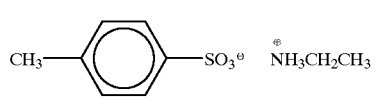
E-(54)

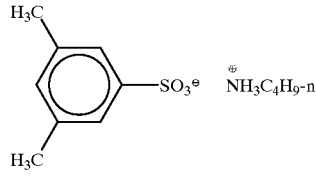
E-(55)

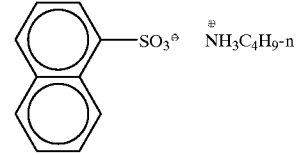
E-(56)

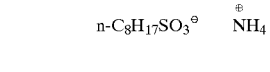
E-(57)

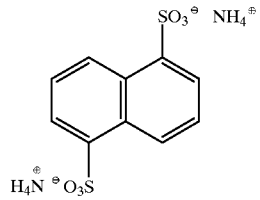
E-(58)

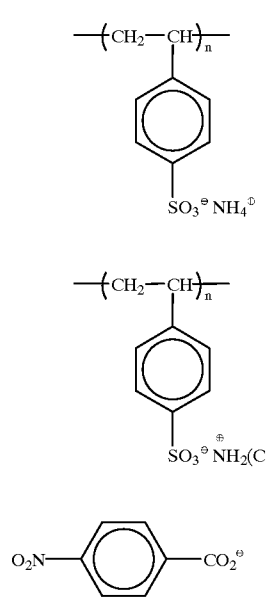

E-(59)

E-(60)

E-(61)

E-(62)

E-(63)

E-(64)

E-(65)

E-(66)

E-(67)

E-(68)

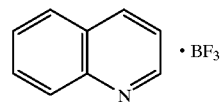 E-(69)

$(CH_3CH_2)_3N \cdot BF_3$    E-(70)

$CH_3NH \cdot BF_3$    E-(71)

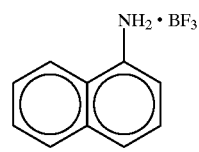 E-(72)

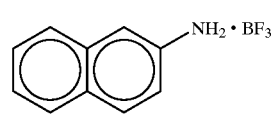 E-(73)

A third example of the thermal acid generating agent includes a compound which causes β-hydrogen elimination by the heating to generate an acid. Examples of this compound include an alkyl ester having a hydrogen atom at the β-position of a sulfonic acid, a carboxylic acid or a phosphoric acid (for example, t-butyl ester, cyclohexyl ester, 2-phenyl ethyl ester, 4,5-dihydro-2-methylfuran-5-yl ester and 2-cyclohexenyl ester) and a compound represented by the following formula (9):

$$YO—N=CH—Z \qquad (9)$$

wherein Y represents a residue of a sulfonic acid, a carboxylic acid or a phosphoric acid represented by YOH, and Z represents a substituted or unsubstituted aryl group preferably having from 6 to 60 carbon atoms, such as a phenyl group, a 2,4-dimethoxyphenyl group, a 1-naphthyl group, a 2-methoxy-1-naphthyl group and a 2-chloro-1-naphthyl group.

Specific examples of the compound which causes β-hydrogen elimination by the heating to generate an acid are set forth below, however, the present invention is by no means limited thereto.

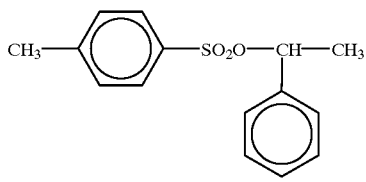 E-(74)

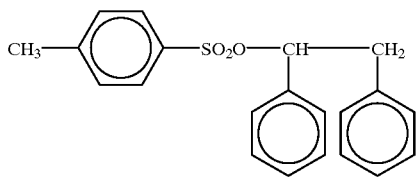 E-(75)

E-(76)
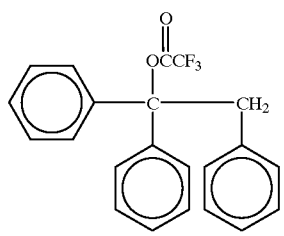
E-(77)
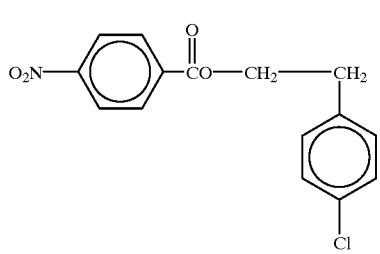
E-(78)
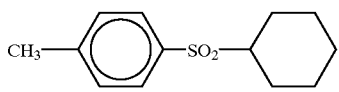
E-(79)
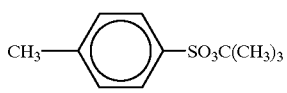
E-(80)
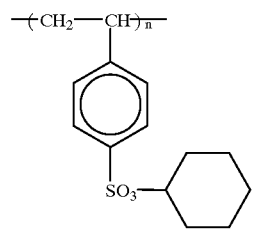
E-(81)
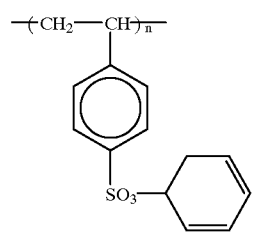
E-(82)
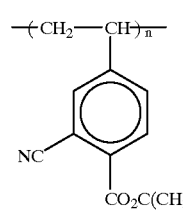
E-(83)
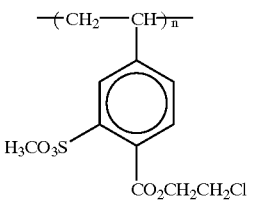
E-(84)
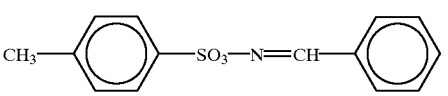
E-(85)
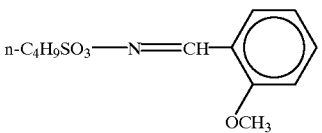
E-(86)
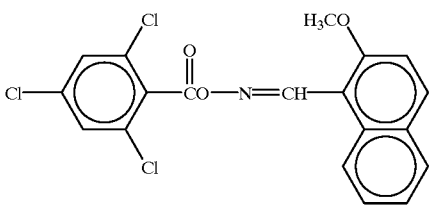
E-(87)
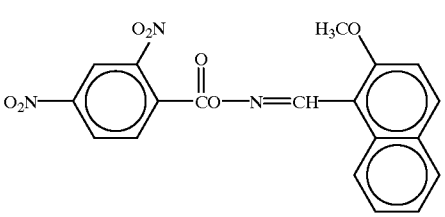
E-(88)
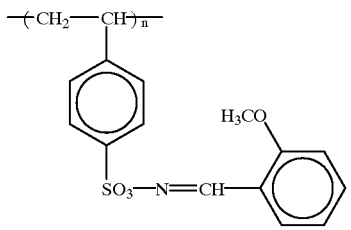
E-(89)
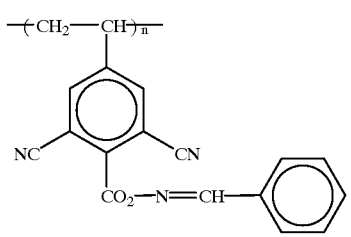

E-(90)

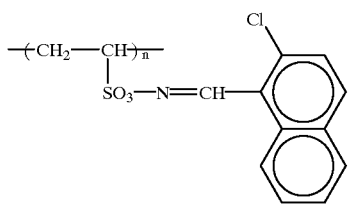

A fourth example of the thermal acid generating agent includes a 2-nitrobenzyl ester and a benzoin ester of a sulfonic acid, a carboxylic acid or a phosphoric acid. These are a compound which generates an acid also by the action of light, and examples thereof include those described above as examples of the photoacid generating agent.

A fifth example of the thermal generating agent includes a compound having a structure of an acid generating agent represented by formula (2). Preferred examples thereof are the same as those described above as examples of the self-breeding type acid generating agent.

Any of these thermal acid generating agents can be used in the present invention, however, in view of storage stability and low toxicity, acid generating agents which generate a sulfonic acid, a carboxylic acid or a phosphoric acid are particularly preferred. The decomposition temperature is preferably from 130 to 300° C., more preferably from 150 to 250° C.

By controlling the amount of these acid generating agent added, the sensitivity and the storability of recording material can be controlled. In general, the acid generating gent is preferably added in an amount of from 1 to 50 mol %, more preferably from 5 to 20 mol %, based on the self-breeding type acid generating agent represented by formula (1) which is described above.

The compound of causing change in the absorption region of from 360 to 900 nm due to intramolecular or intermolecular reaction provoked by the action of an acid, for use in the present invention is a compound which is stable as long as it is stored under the neutral to basic condition but when applied by the action of an acid, is reduced in the activation energy of the intramolecular or intermolecular reaction to allow the reaction to readily proceed by the heating and as a result, causes change in the absorption. In this case, the heating temperature for forming an image is preferably from 60 to 150° C., more preferably from 80 to 120° C.

The compound of causing change in the absorption may be a single compound or may comprise two or more components. Examples thereof include a compound which forms a decolorized image in the above-described region by the Diels-Alder reaction (e.g., 9,10-distyrylanthracene with maleic anhydride, tetraphenylcyclopentadiene with acrylic acid ester), a compound which forms a colored image in the above-described region by the retro Diels-Alder reaction (e.g., adduct of 9,10-distyrylanthracene and maleic anhydride, adduct of diphenylisobenzofuran and acrylamide), a compound which forms a colored image in the above-described region as a result of expansion of the conjugated system by the β-hydrogen elimination (e.g., 1-acetoxy-1,2-diarylethane, 1-sulfoxy-1,2-diarylethane), a combination of aldehyde which forms a colored image in the above-described region by the dehydration condensation with an active methylene compound (e.g., photographic 4-equivalent magenta coupler with p-metoxycinnamaldehyde) and a compound having an amino group or hydroxyl group substituted by a substituent accelerated to decompose or split off by the action of an acid and as a result of elimination of the substituent, causing changes in the absorption in the above-described absorption region. Furthermore a basic leuco dye and the like which instantly forms a color upon contact with an acid may be used in the image forming medium, however, since such a compound acts as a base and inhibits the process of acid breeding, the compound must be isolated from the acid generating agent and the acid breeding agent by using a microcapsule or by coating the composition on a separate layer.

In the present invention, a compound of causing change in the absorption as a result of decomposition or splitting off of the substituent of an amino group or hydroxyl group by the action of an acid is particularly useful.

Preferred examples of the substituent of the amino group include an alkoxycarbonyl group (e.g., t-butoxycarbonyl, cyclohexyloxycarbonyl, 2-(2-methyl)butoxycarbonyl, 2-(2-phenyl)propyloxycarbonyl, 2-chloroethoxycarbonyl), an acyl group (e.g., acetyl, benzoyl, 2-nitrobenzoyl, 4-chlorobenzoyl, 1-naphthoyl) and a formyl group. Of these, an alkoxycarbonyl group having a hydrogen atom at the β-position is more preferred in the present invention in view of storage stability and heat sensitivity. Such a compound is described, for example, in U.S. Pat. Nos. 4,602,263 and 4,826,976. By combining this compound with the thermal acid generating agent and acid breeding agent of the present invention, a thermosensitive recording material having higher sensitivity and excellent storability can be obtained.

Specific examples of the compound having an amino group substituted by the above-described substituent, which is useful in the present invention, are set forth below, however, the present invention is by no means limited thereto.

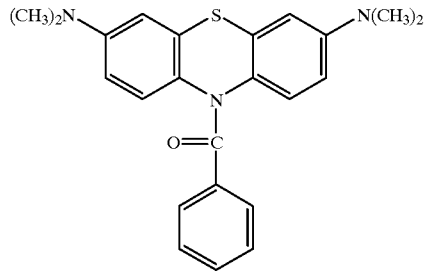

G-(1)

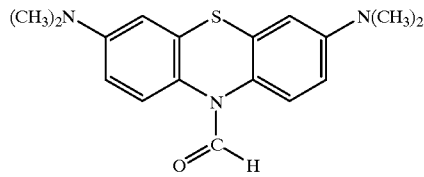

G-(2)

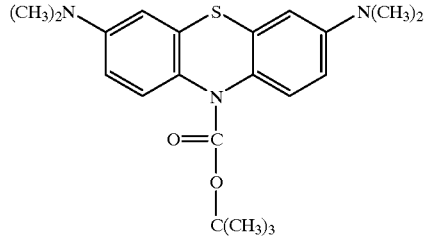

G-(3)

-continued
G-(4)
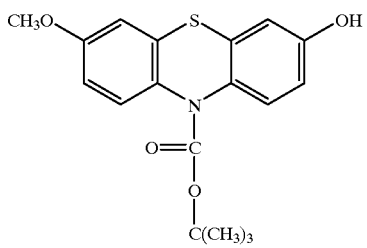
G-(5)
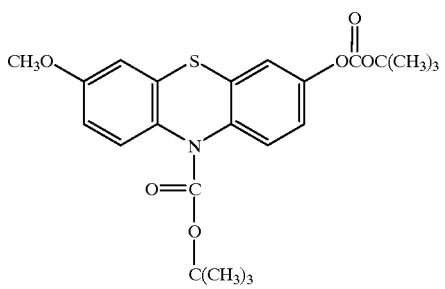
G-(6)
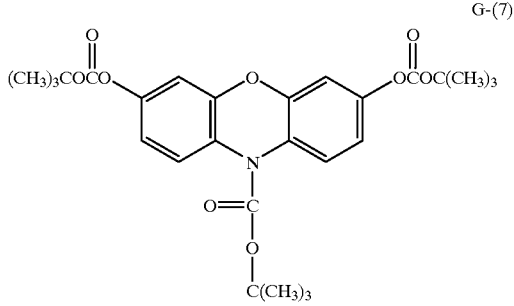
G-(7)
-continued
G-(8)
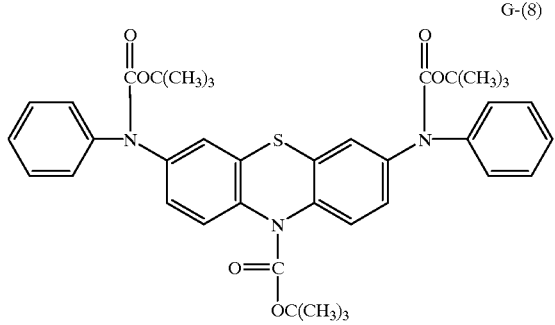
G-(9)
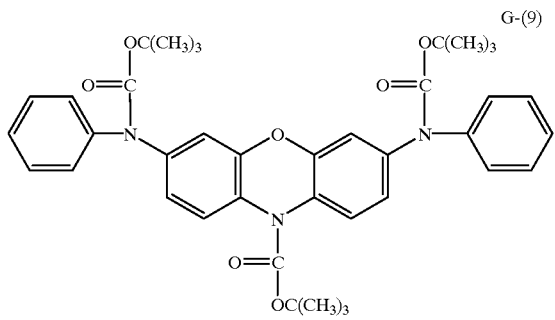
G-(10)
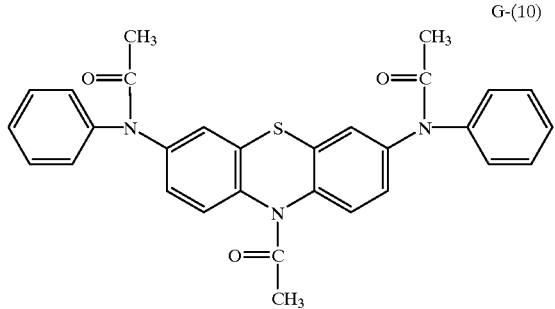
G-(11)
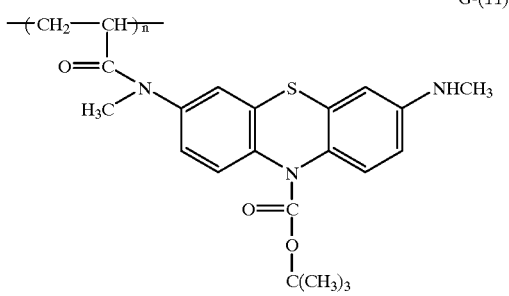
G-(12)
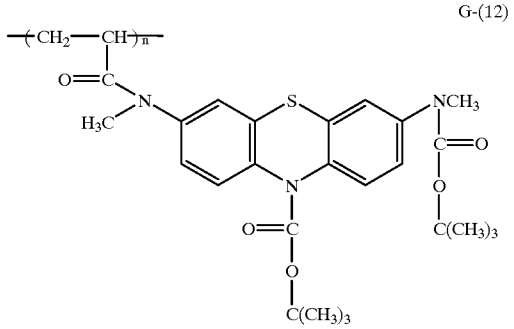

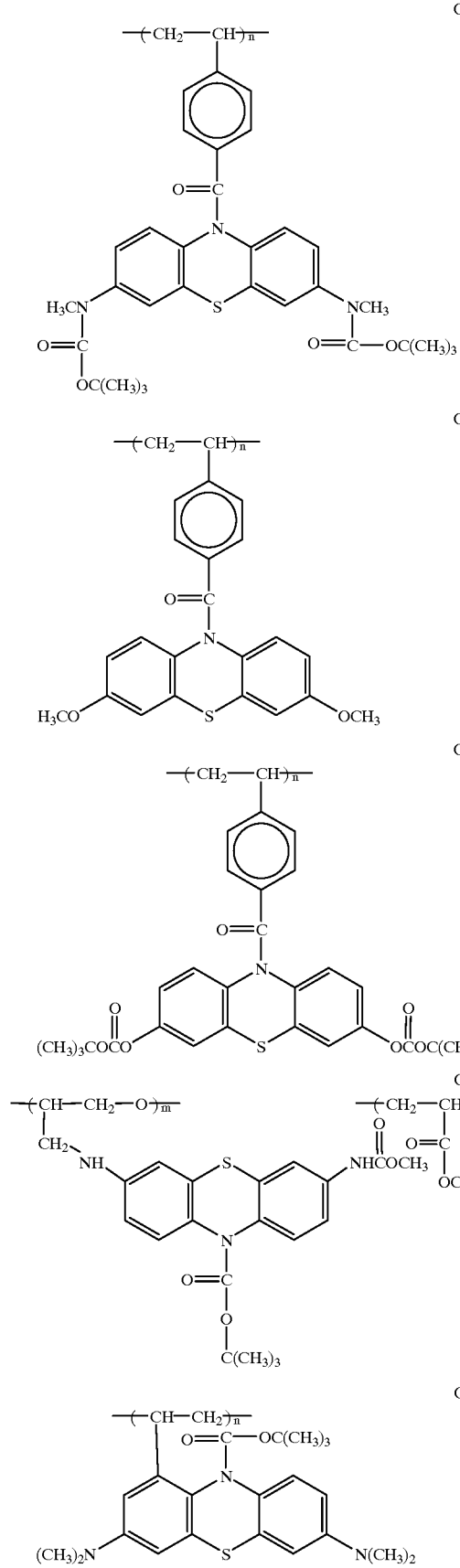
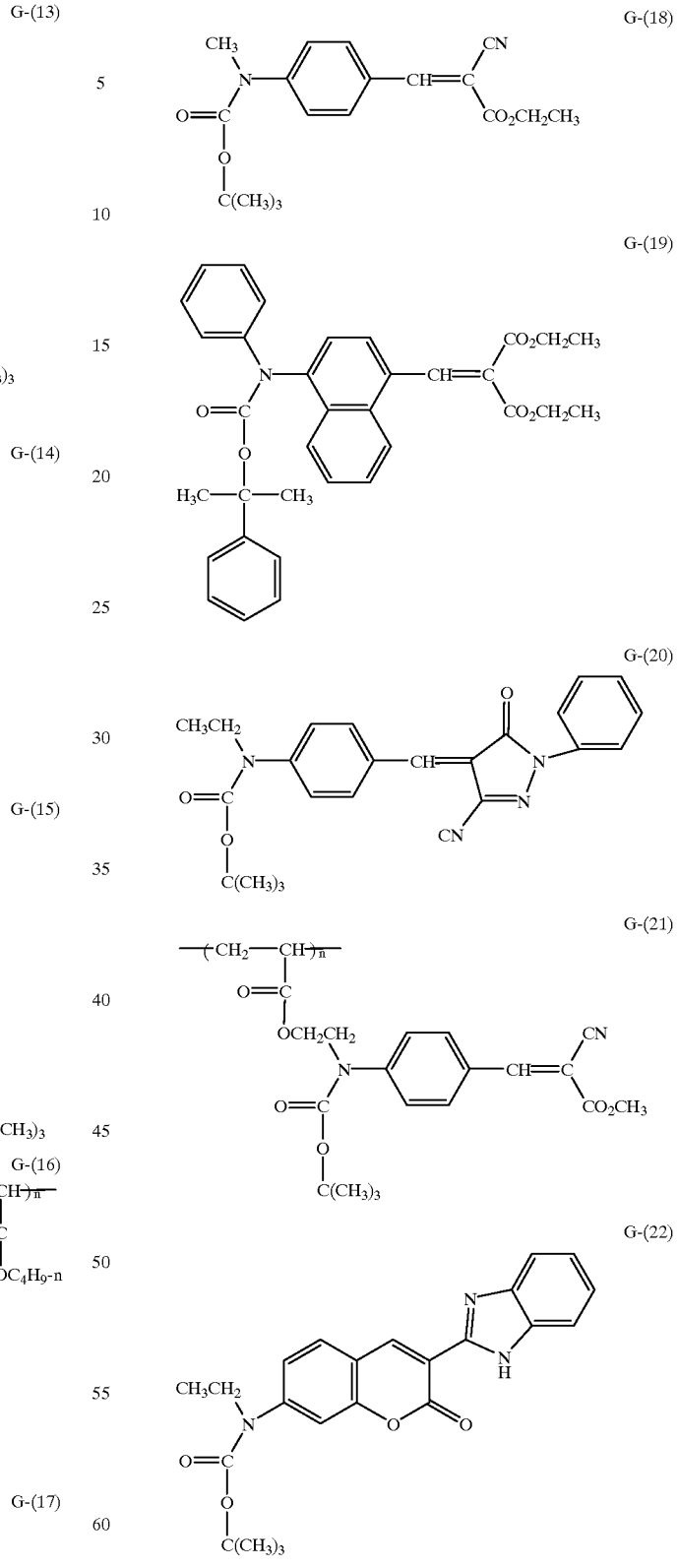

G-(23) 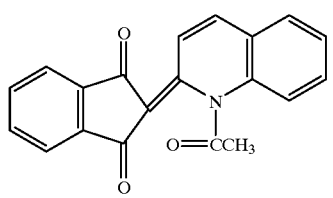
G-(24) 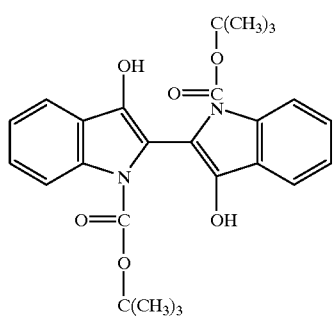
G-(25) 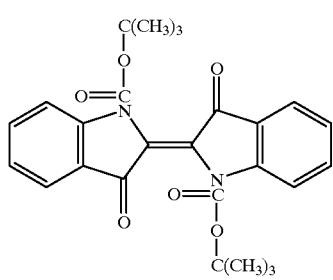
G-(26) 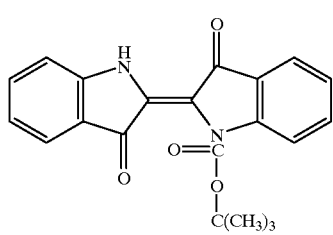
G-(27) 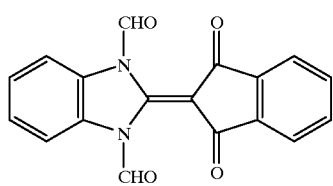
G-(28) 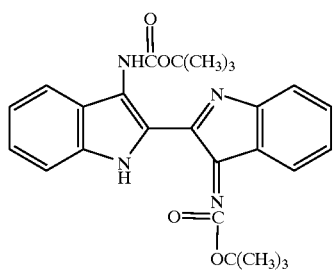
G-(29) 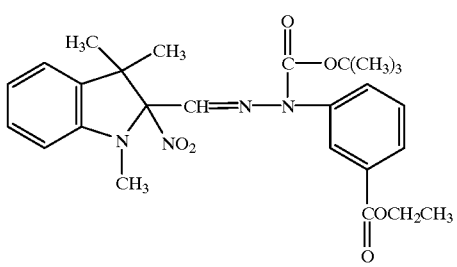
G-(30) 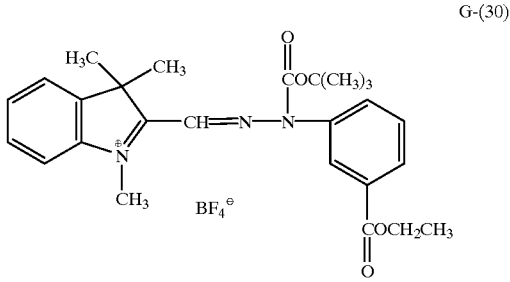
G-(31) 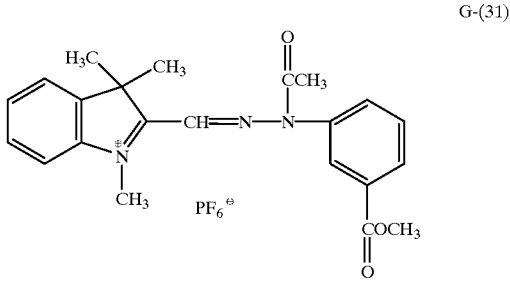
G-(32) 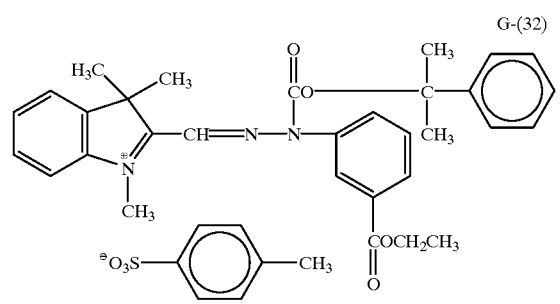
G-(33) 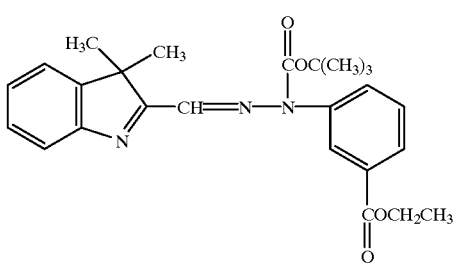

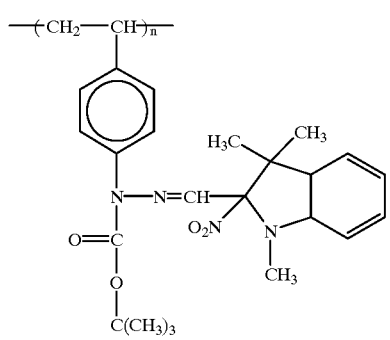

G-(34)

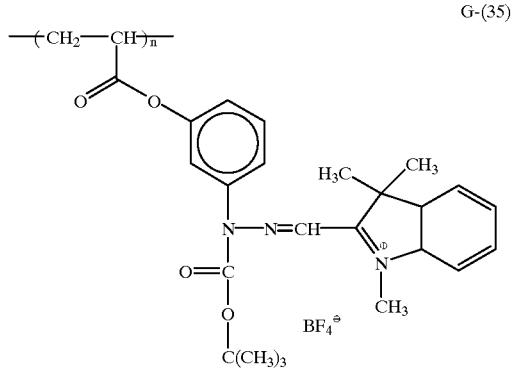

G-(35)

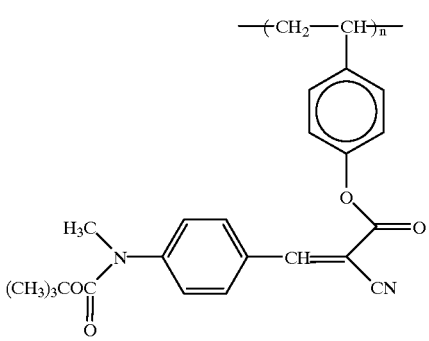

G-(36)

Preferred examples of the substituent of a hydroxyl group, which decomposes or splits off by the action of an acid, include a secondary or tertiary alkoxycarbonyl group having a hydrogen atom at the β-position (e.g., t-butoxycarbonyl, isopropyloxycarbonyl, 1-phenylethoxycarbonyl, 1,1-diphenylethoxycarbonyl, 2-cyclohexeneoxycarbonyl), a silyl group (e.g., trimethylsilyl, triethylsilyl, t-butyldimethylsilyl, t-butyldiphenylsilyl, phenyldimethylsilyl), an alkoxymethyl group (e.g., methoxymethyl, ethoxymethyl, 1-methoxyethyl, 1-phenoxyethyl, 2-(2-metoxypropyl)) and secondary or tertiary alkyl group having a hydrogen atom at the β-position (e.g., tetrahydropyranyl, tetrahydrofuranyl, 4,5-dihydro-2-methylfuran-5-yl, t-butyl, 2-cyclohexenyl). Of these, a secondary or tertiary alkoxycarbonyl group having a hydrogen atom at the β-position is more preferred in the present invention.

Examples of the compound of causing change in the absorption due to decomposition of the substituent of a hydroxyl group are described in U.S. Pat. No. 5,243,052 and JP-A-9-25360.

Specific examples of the compound of causing change in the absorption in the above-described region due to decomposition of the substituent of a hydroxyl group, which is useful in the present invention, are set forth below, however, the present invention is by no means limited thereto.

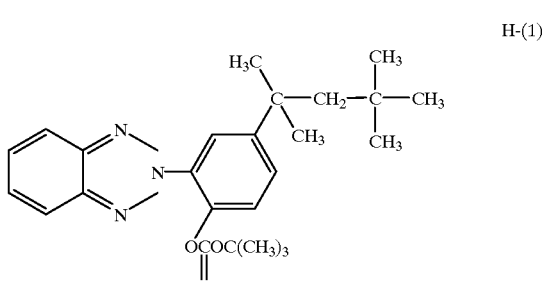

H-(1)

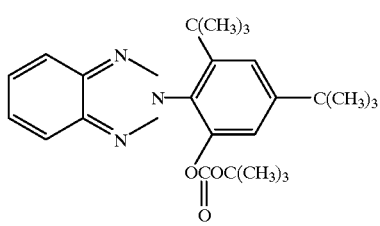

H-(2)

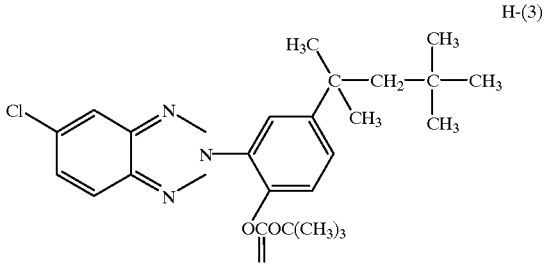

H-(3)

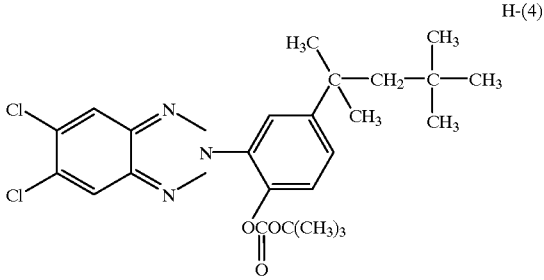

H-(4)

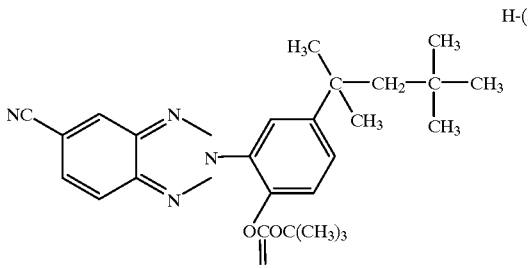

H-(5)

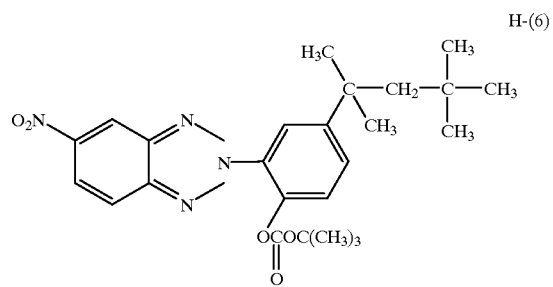
H-(6)
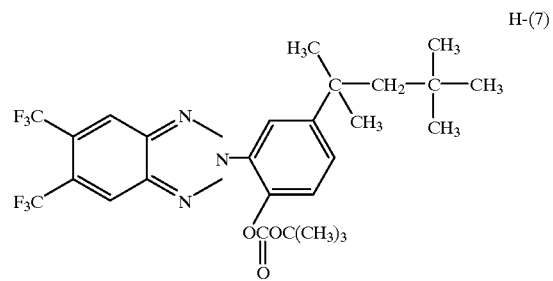
H-(7)
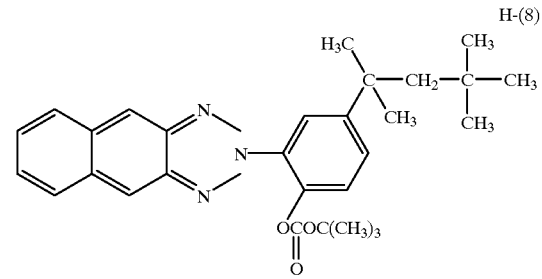
H-(8)
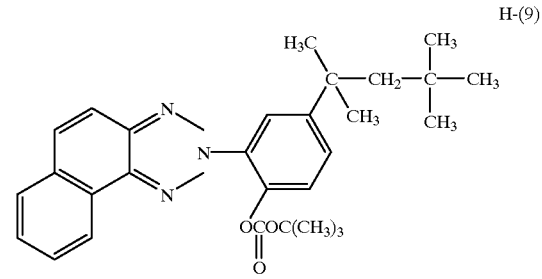
H-(9)
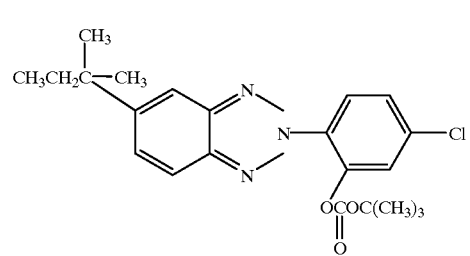
H-(10)
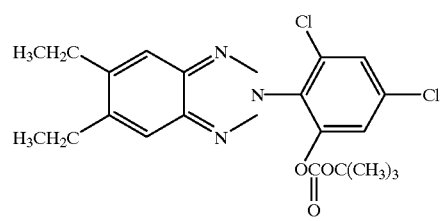
H-(11)
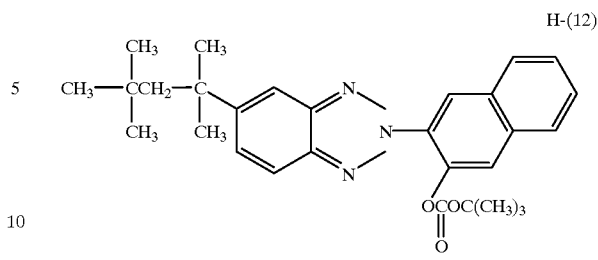
H-(12)
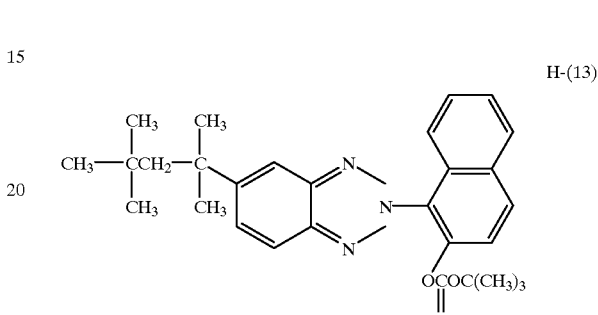
H-(13)
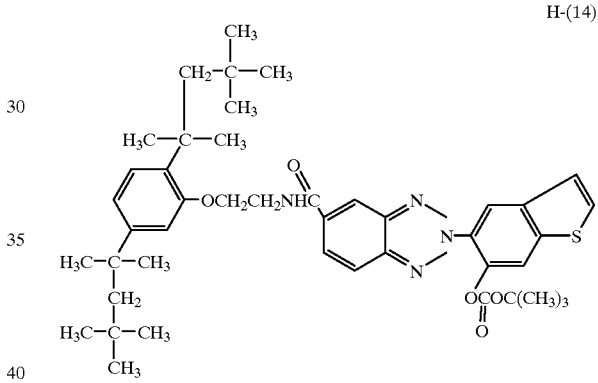
H-(14)
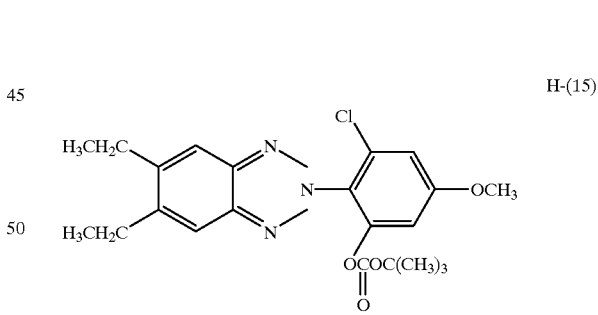
H-(15)
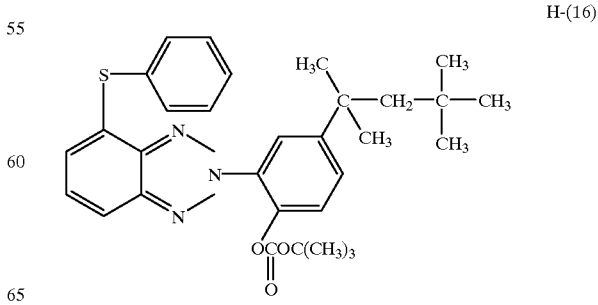
H-(16)

H-(17)
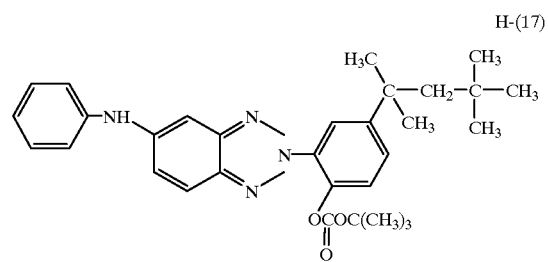
H-(18)
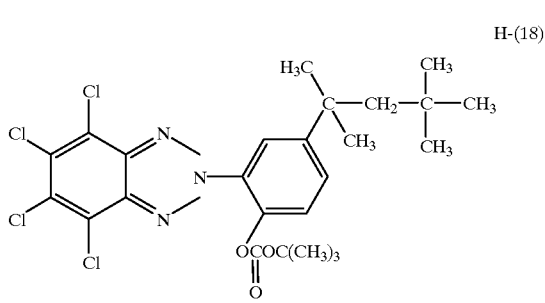
H-(19)
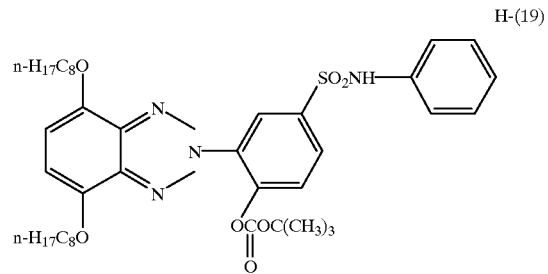
H-(20)
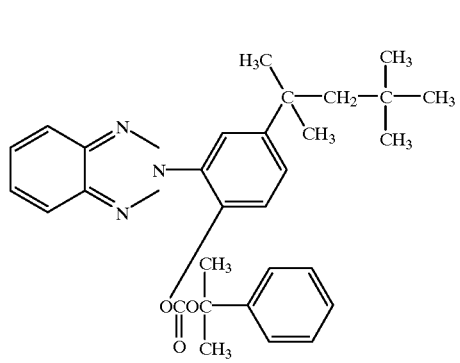
H-(21)
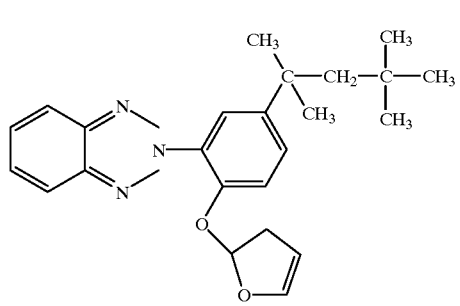
H-(22)
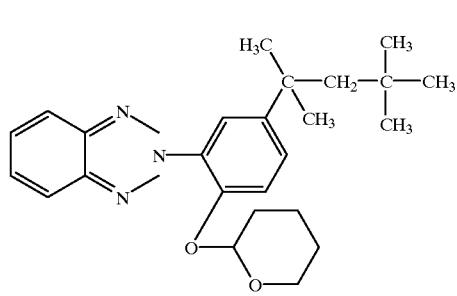
H-(23)
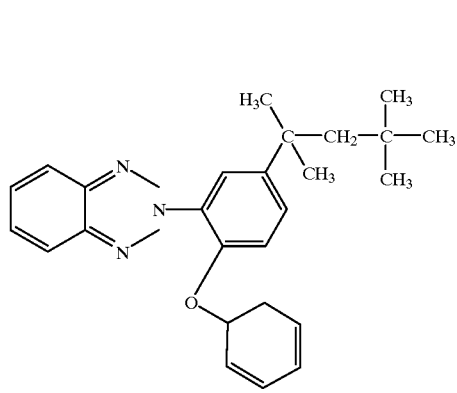
H-(24)
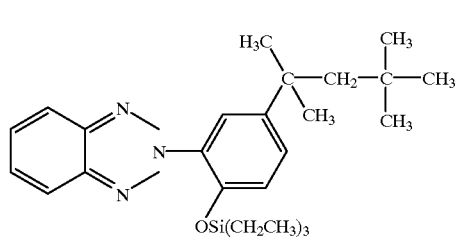
H-(25)
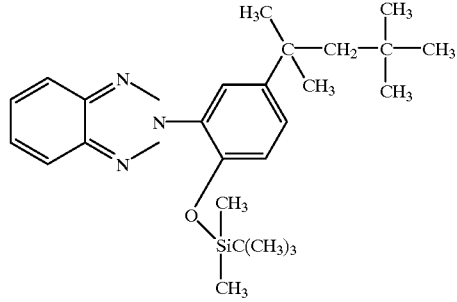
H-(26)
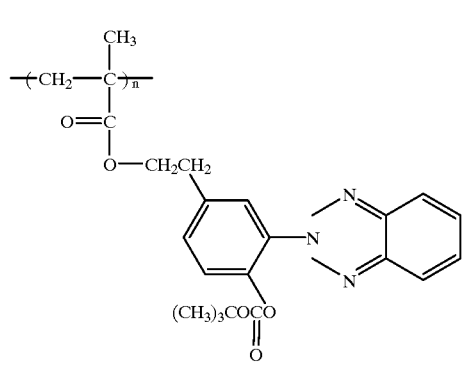

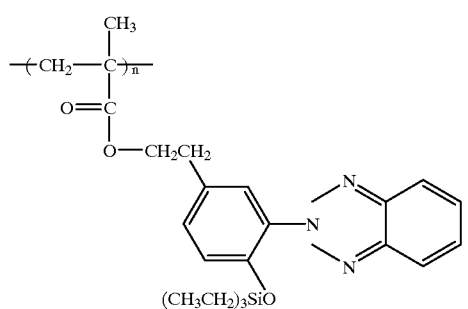 H-(27)
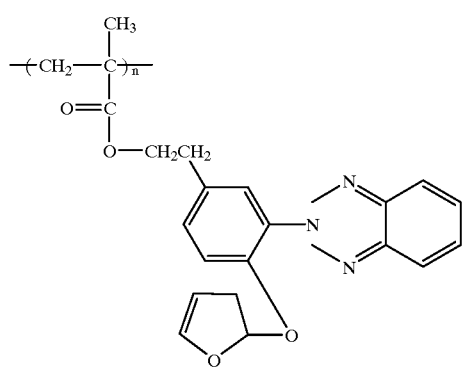 H-(28)
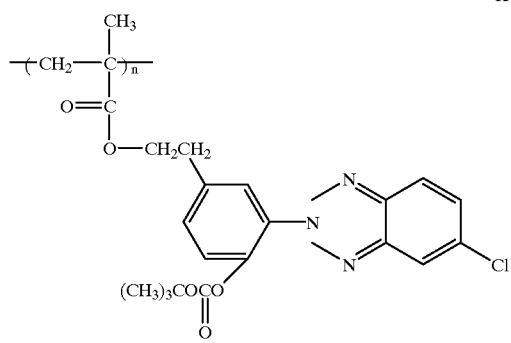 H-(29)
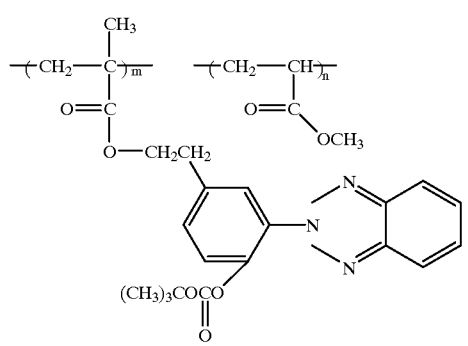 H-(30)
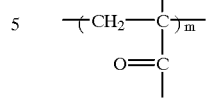 H-(31)
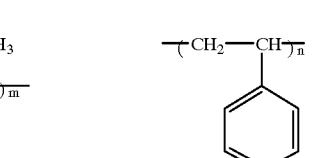 H-(32)
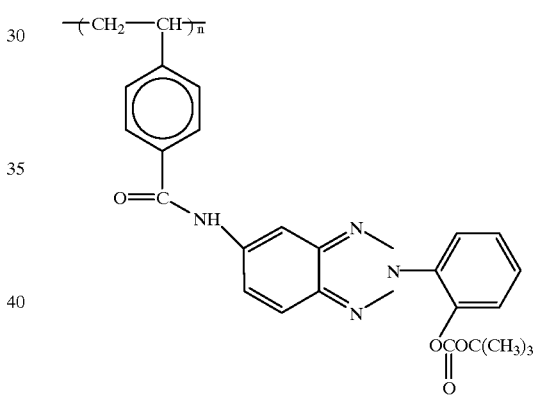 H-(33)
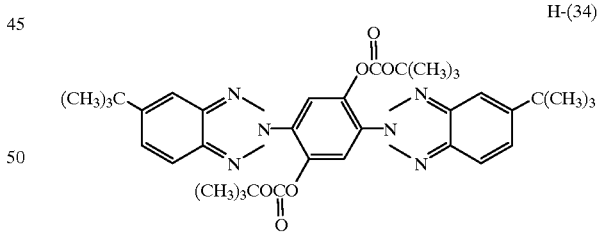 H-(34)
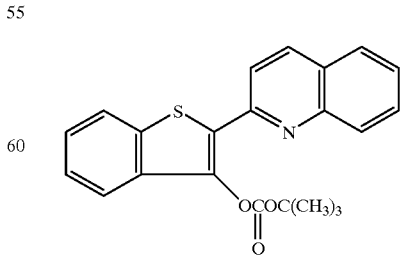 H-(35)

-continued
H-(36)
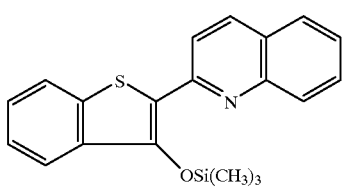
H-(37)
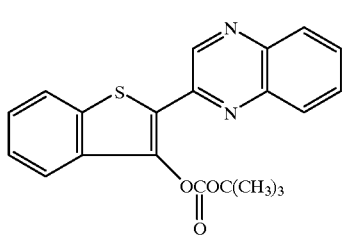
H-(38)
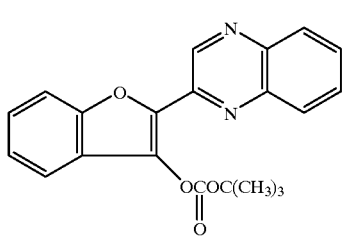
H-(39)
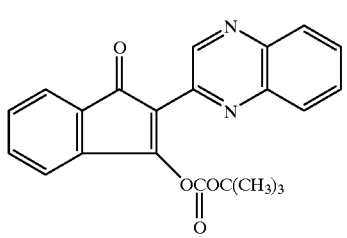
H-(40)
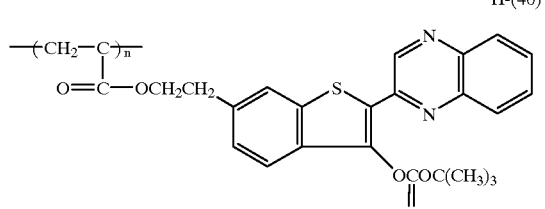
H-(41)
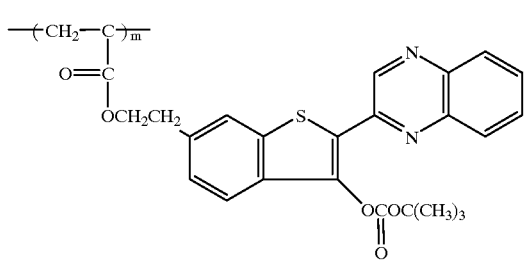
-continued
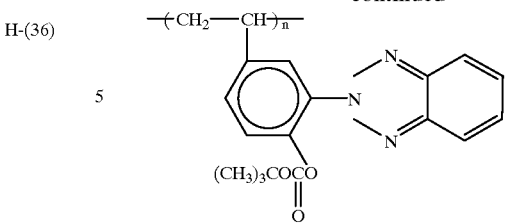
H-(42)
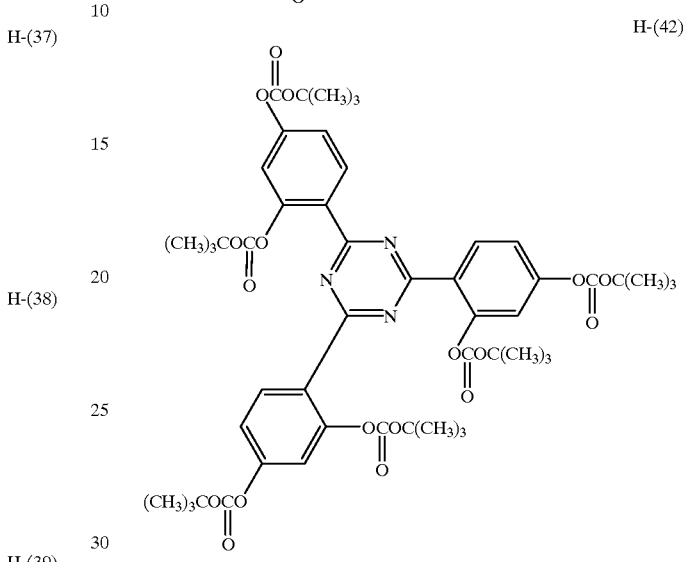
H-(43)
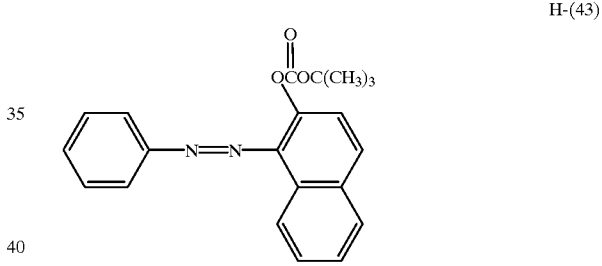
H-(44)
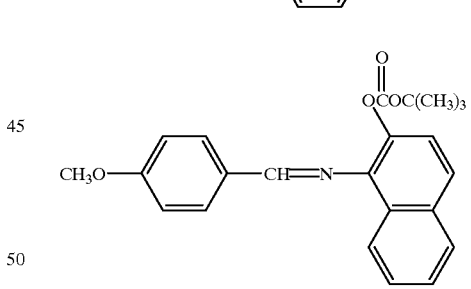
H-(45)
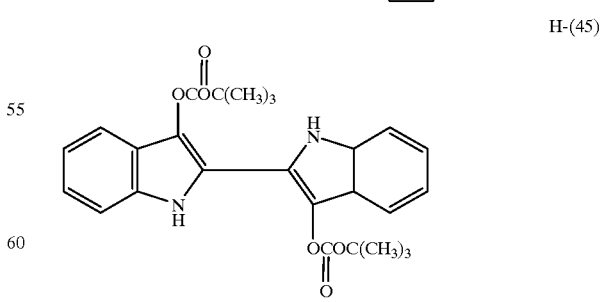

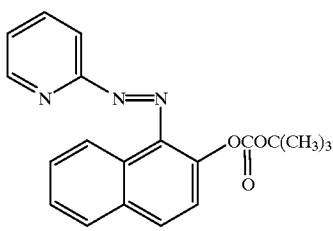

H-(46)

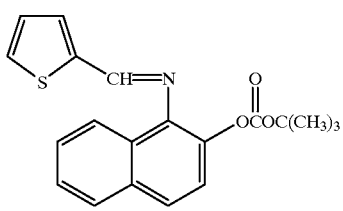

H-(47)

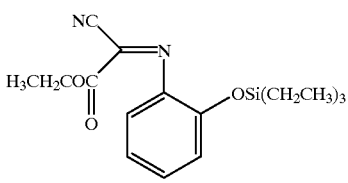

H-(48)

The image recording medium of the present invention is generally manufactured by coating the above-described acid generating agent, acid breeding agent and composition of causing change in the absorption region of from 360 to 900 nm by the action of an acid on a support. At this time, a binder is usually used together except for the case where any of these members is a polymer or an amorphous substance having good coatability. The case where a binder can be dispensed with is advantageous in that the film thickness can be easily reduced and a sharp image can be obtained.

In the case of using a binder, either a water-soluble binder such as gelatin, casein, starches, hydroxyethyl cellulose, carboxymethyl cellulose, polyvinyl alcohol, polyacrylamide and ethylene-maleic acid copolymer, or a water-insoluble binder such as polyvinylbutyral, triacetyl cellulose, polystyrene, methyl acrylate-butadiene copolymer, acrylonitrile-butadiene copolymer may be used.

In formula (6), A represents a repeating unit obtained by polymerizing at least one vinyl monomer having a function of generating an acid by the action of an acid and further breeding an acid by the action of an acid generated from the monomer itself or a function of generating an acid by heat. Examples of the compound having such a function include compounds described in *Chemistry Letter*, p. 551 (1995) and JP-A-8-248561 and cyclohexyl sulfonate.

The polymer having a thermal acid generating function of the present invention is advantageous in that when it is applied to an image recording medium in a laser heat mode system, another acid generating agent is not necessary to be added.

The preferred embodiment of A having such a function includes the structure represented by formula (7).

In formula (7), $R^{21}$ represents an electron-withdrawing group having a Hammet's σp value greater than 0 (having preferably from 0 to 60 carbon atoms, for example, an acyl group such as acetyl and benzoyl, a sulfonyl group such as methanesulfonyl and benzenesulfonyl, a heterocyclic residue such as benzothiazolyl and benzoxazolyl, and a trifluoromethyl group), $R^2$ represents an alkyl group (inclusive of an alkyl group having a substituent, preferably having from 1 to 60 carbon atoms, e.g., methyl, ethyl, iso-propyl, t-butyl, trifluoromethyl, ethoxymethyl) or an aryl group (inclusive of an aryl group having a substituent, preferably having from 6 to 60 carbon atoms, e.g., phenyl, naphthyl, 4-chlorophenyl, 2-methoxyphenyl, 4-nitrophenyl, 3-methanesulfonylphenyl), $R^3$ represents a secondary or tertiary alkyl group having a hydrogen atom at the β-position (inclusive of an alkyl group having a substituent, preferably having from 3 to 60 carbon atoms, e.g., t-butyl, cyclohexyl, tetrahydropyranyl, tetrahydrofuranyl, 4,5-dihydro-2-methylfuran-5-yl, 2-cyclohexenyl), $W^2$ represents a residue of an acid represented by $W^2OH$ ($W^2OH$ preferably having a pKa of 3 or less, e.g., p-toluenesulfonic acid, benzenesulfonic acid, benzenesulfonic acid, methanesulfonic acid, polyvinylbenzenesulfonic acid, p-nitrobenzoic acid), and at least one of $R^{21}$, $R^{22}$, $R^{23}$ and $W^2$ contains a polymerizable vinyl group (for example, groups shown below) at the site capable of substitution.

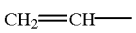

(1)

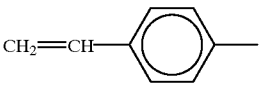

(2)

(3)

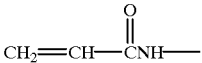

(4)

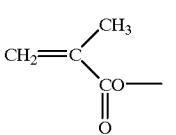

(5)

(6)

Specific examples of the vinyl monomer for forming A of formula (6) are set forth below, however, the present invention is by no means limited thereto. These compounds can be synthesized in the same manner as in the method described in JP-A-8-248561.

A-(1)
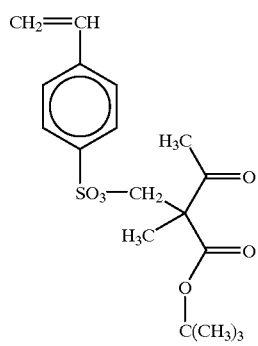
A-(2)
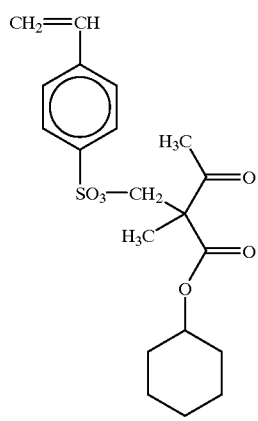
A-(3)
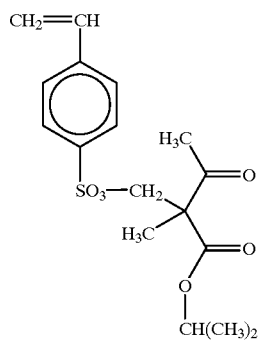
A-(4)
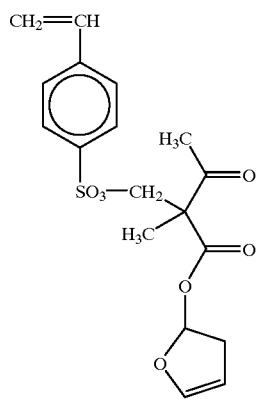
-continued
A-(5)
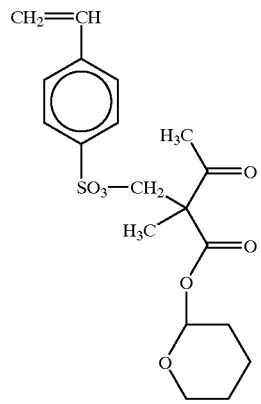
A-(6)
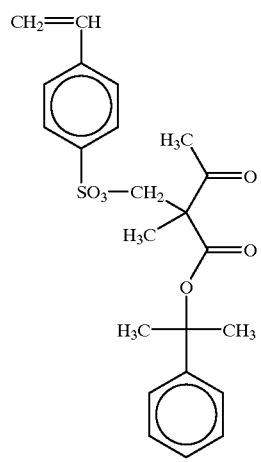
A-(7)
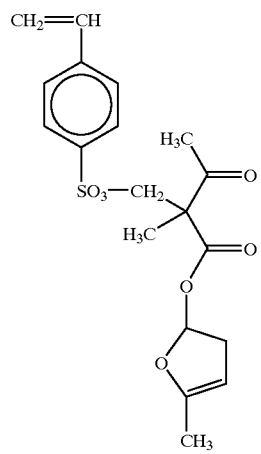

A-(8)
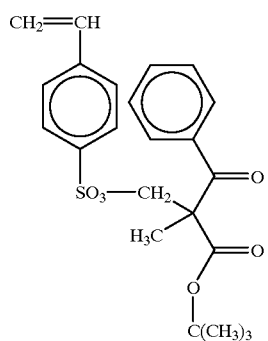
A-(12)
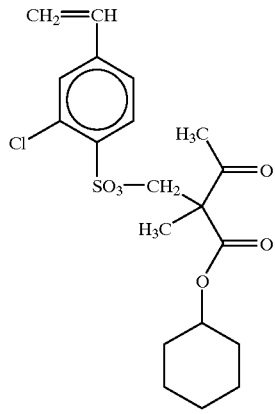
A-(9)
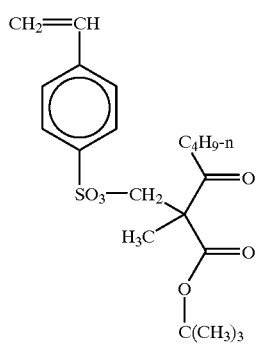
A-(13)
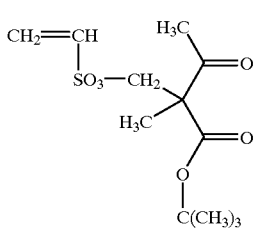
A-(14)
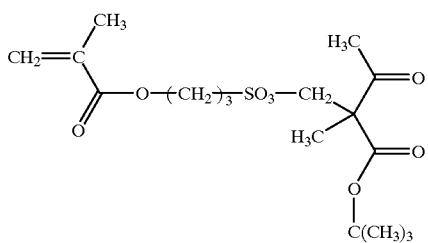
A-(10)
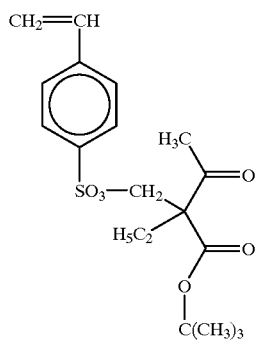
A-(15)
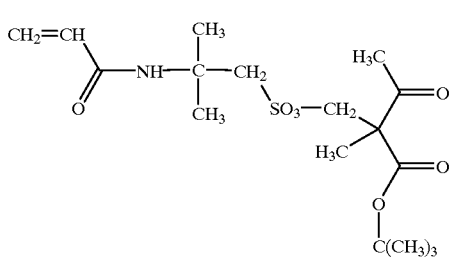
A-(11)
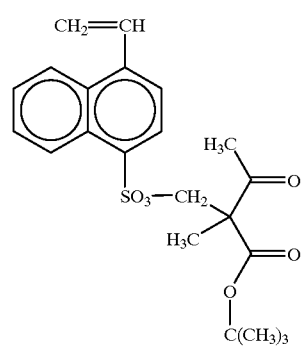
A-(16)
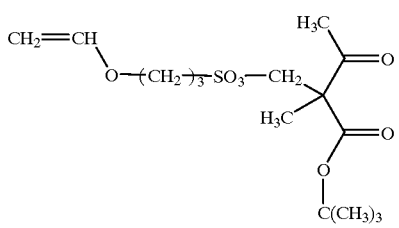

A-(17)
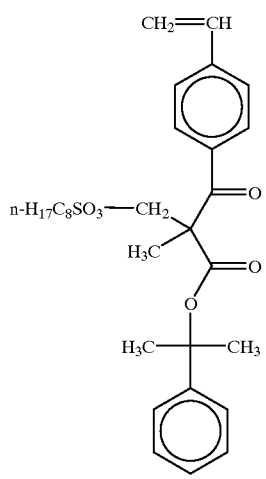
A-(18)
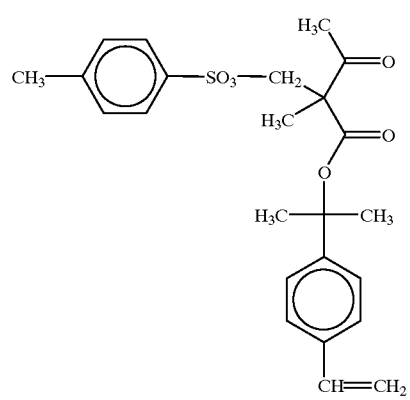
A-(19)
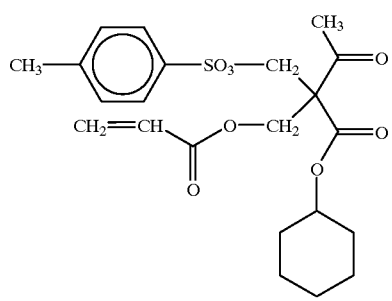
A-(20)
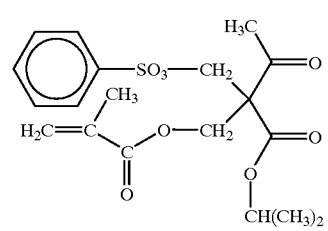
A-(21)
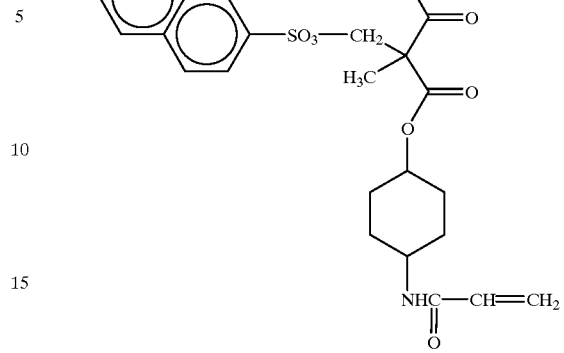
A-(22)
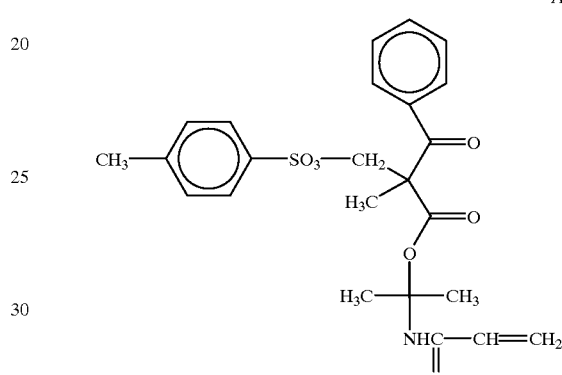
A-(23)
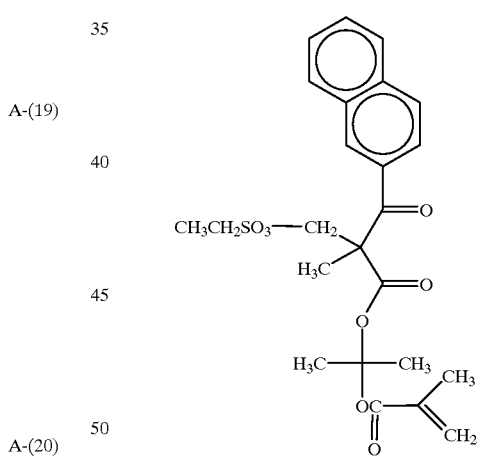
A-(24)
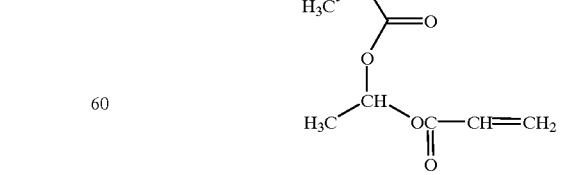

A-(25)
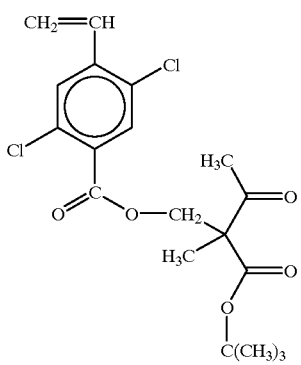
A-(26)
A-(27)
A-(28)
A-(29)
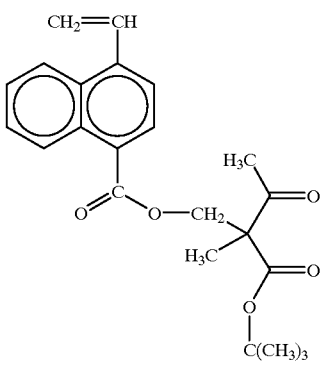
A-(30)
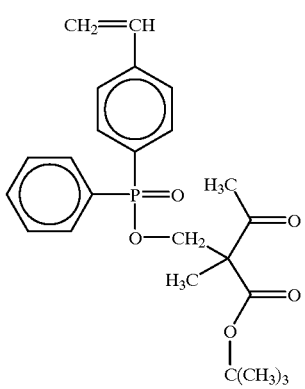
A-(31)
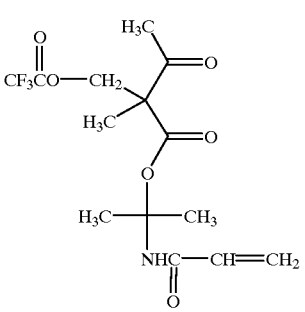
A-(32)
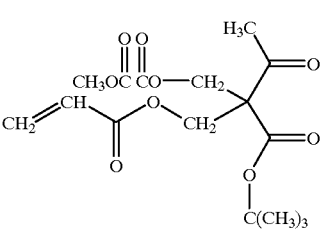

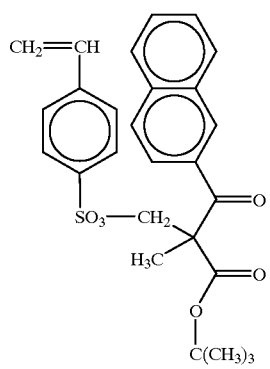
A-(33)
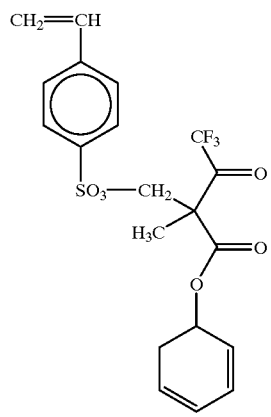
A-(37)
A-(34)
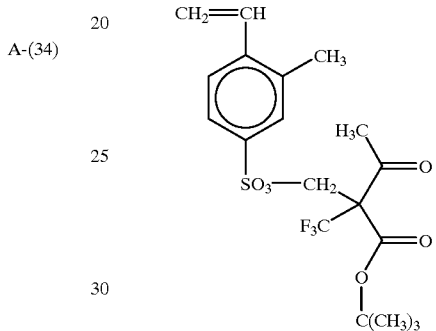
A-(38)
A-(35)
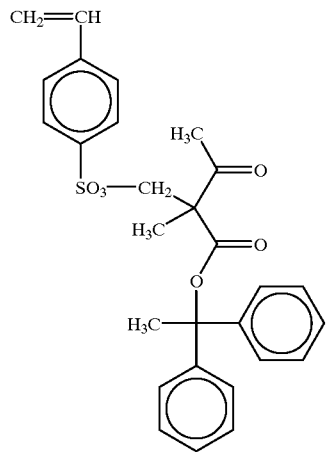
A-(39)
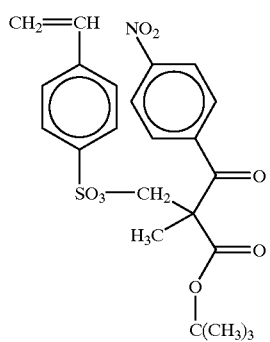
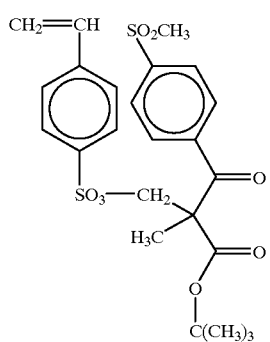
A-(36)
A-(40)

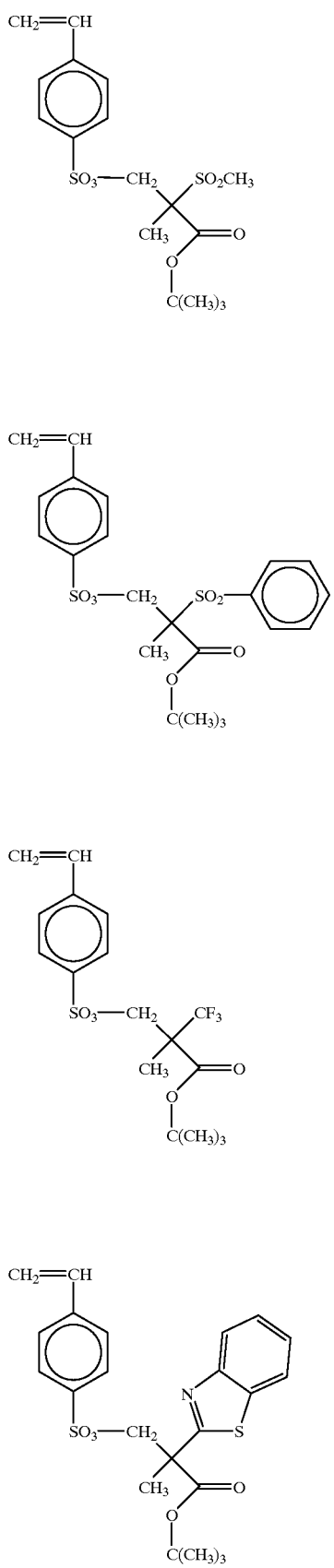

A-(51)

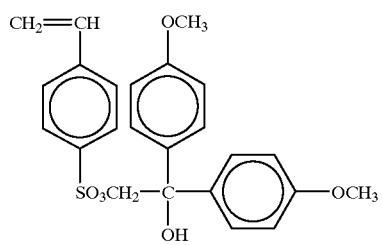

A-(52)

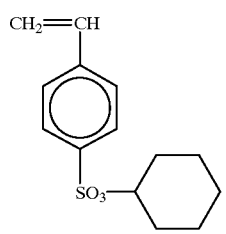

In formula (6), B represents a repeating unit obtained by the polymerization of at least one vinyl monomer having a partial structure of causing change in the absorption region of from 360 to 900 nm by the action of an acid. The partial structure of causing change in this absorption region by the action of an acid is described above.

The monomer for forming a repeating unit represented by B in formula (6) by the polymerization is obtained by introducing a polymerizable vinyl group (examples thereof include those described above for A) into the site capable of substitution in the above-described partial structure of causing change in the absorption by the action of an acid. Examples thereof are set forth below, however, the present invention is by no means limited thereto.

B-(1)

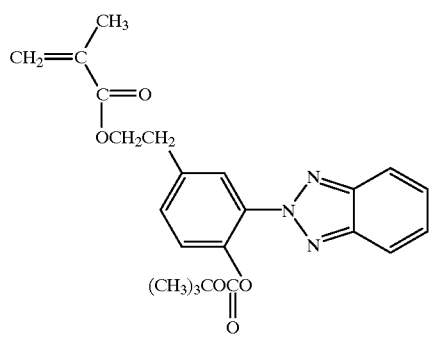

B-(2)

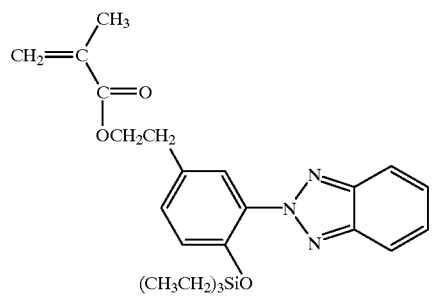

B-(3)

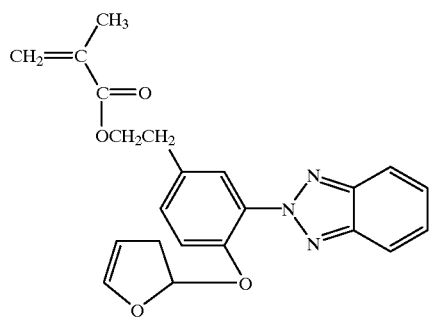

B-(4)

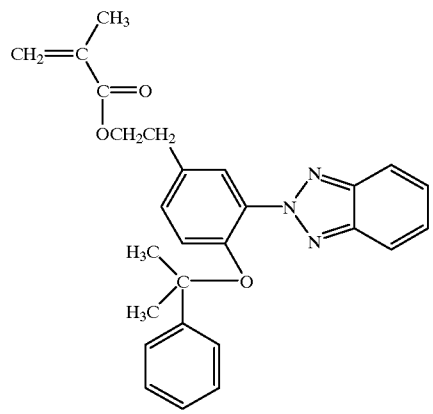

-continued
B-(5)
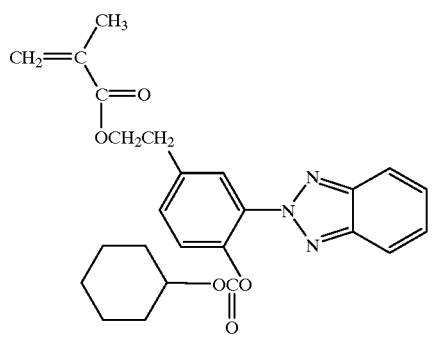
B-(6)
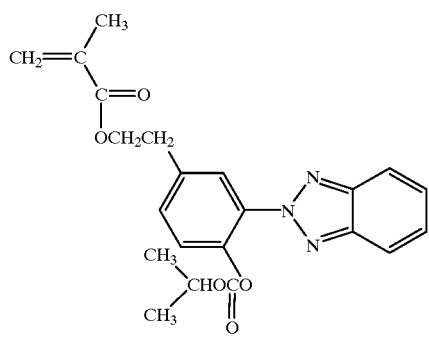
B-(7)
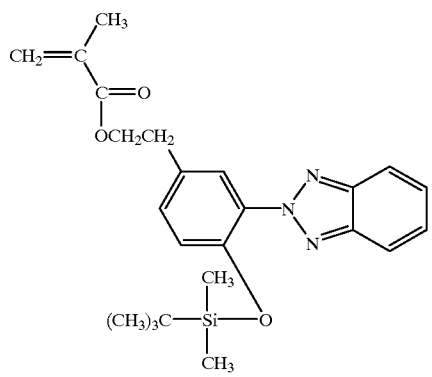
B-(8)
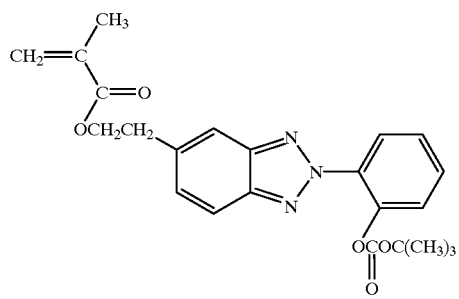
B-(9)
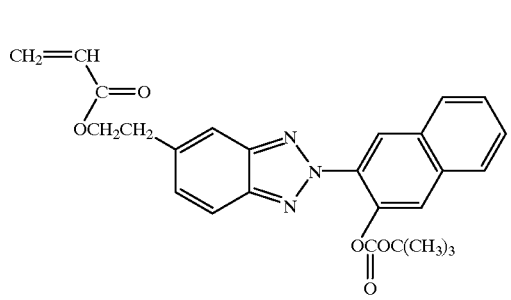
B-(10)
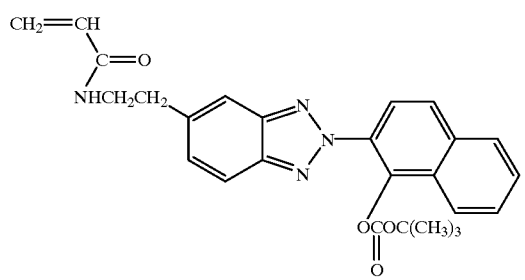
B-(11)
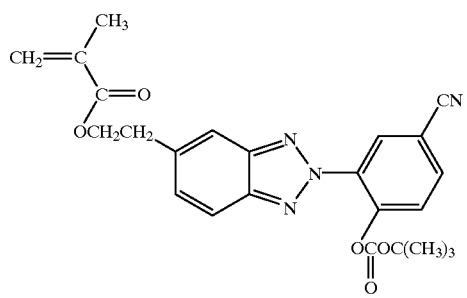
B-(12)
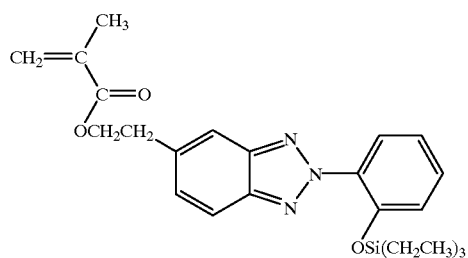

-continued
B-(13)
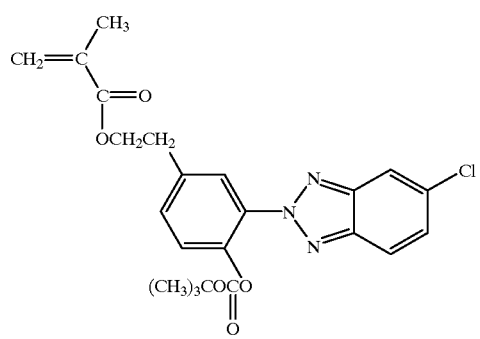
B-(14)
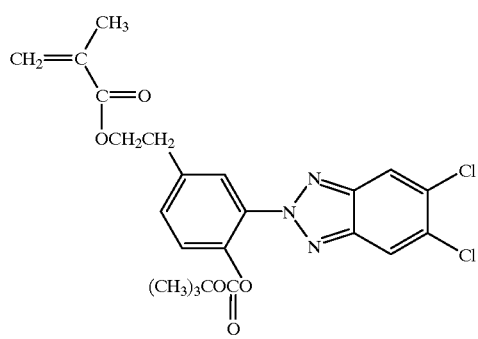
B-(15)
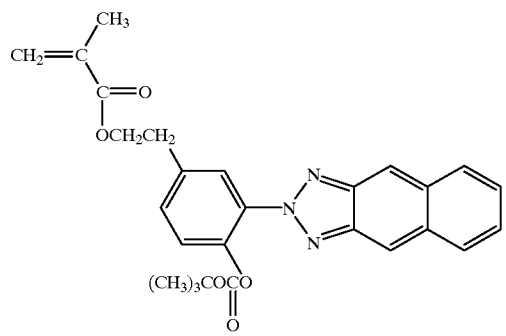
B-(16)
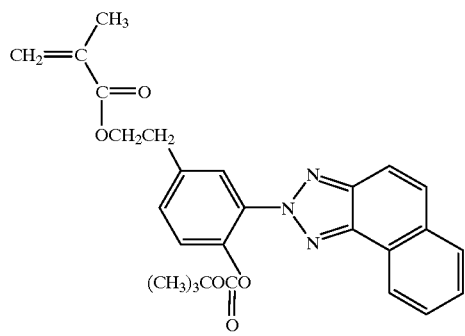
B-(17)
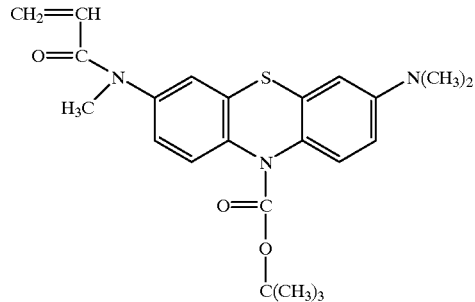
B-(18)
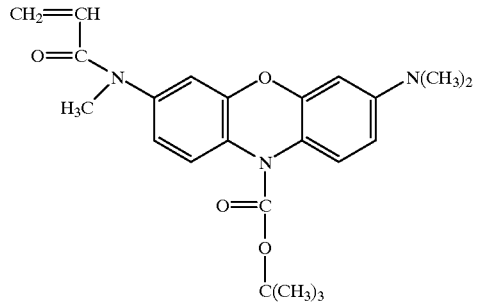
B-(19)
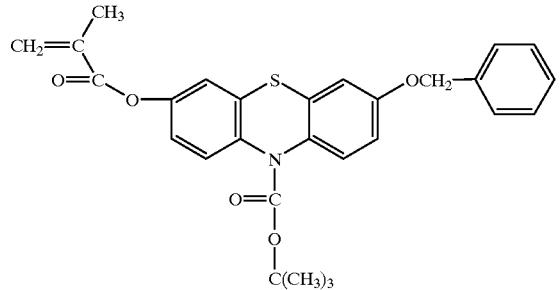
B-(20)
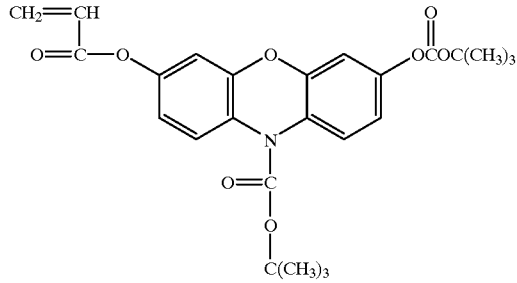

-continued
B-(21)
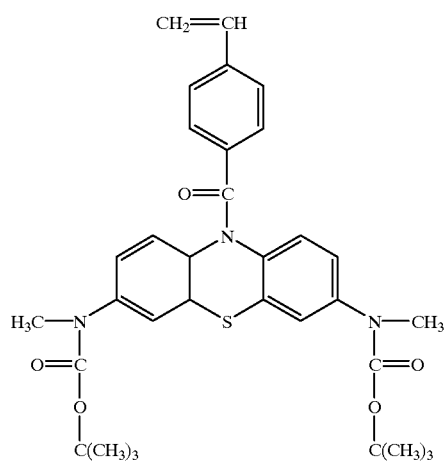
B-(22)
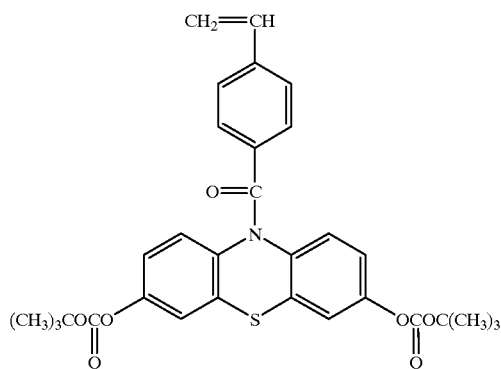
B-(23)
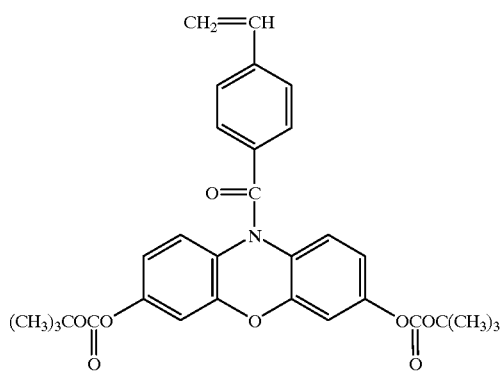
B-(24)
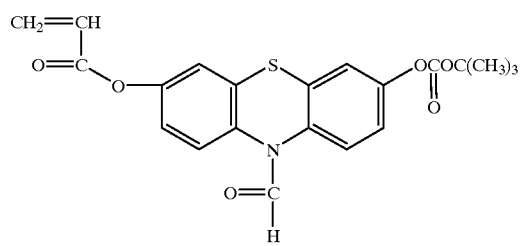
B-(25)
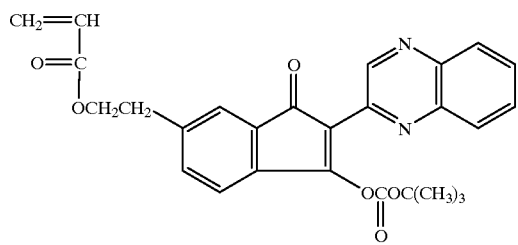
B-(26)
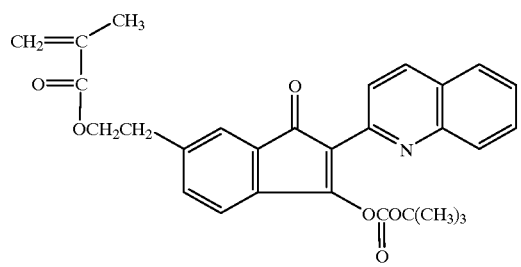
B-(27)
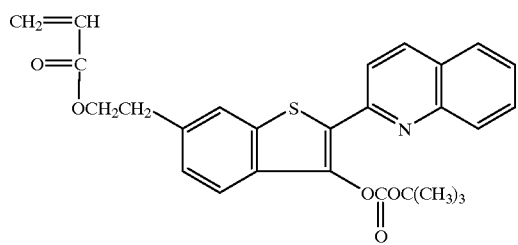
B-(28)
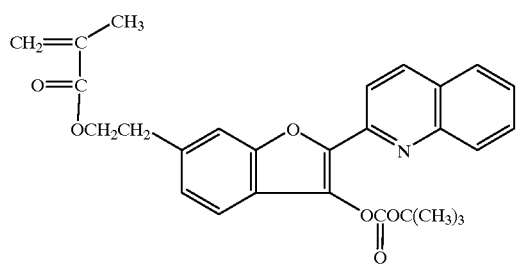

B-(29)
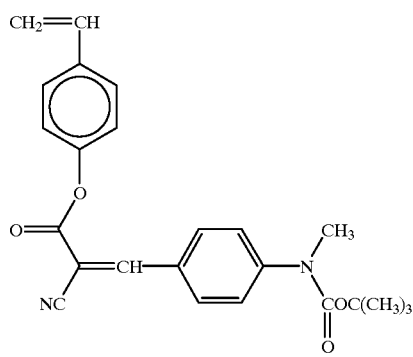
B-(30)
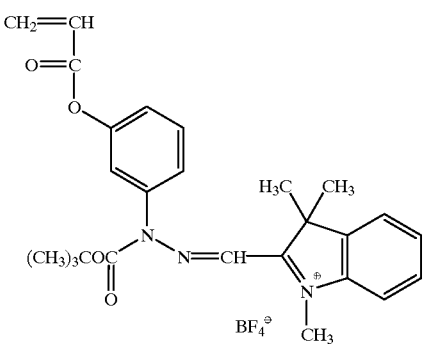
B-(31)
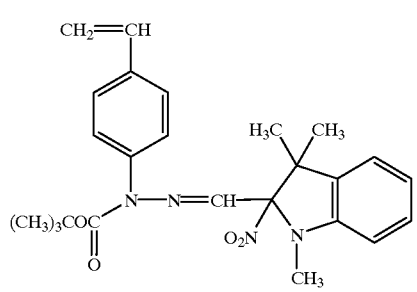
B-(32)
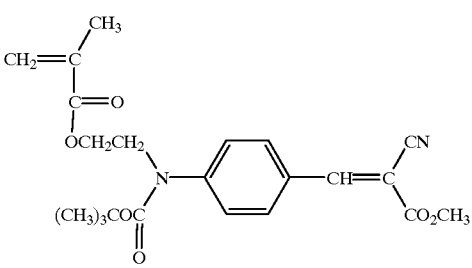
B-(33)
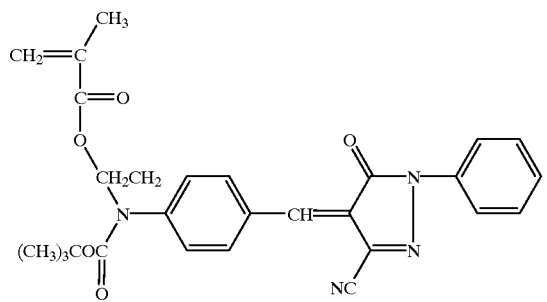
B-(34)
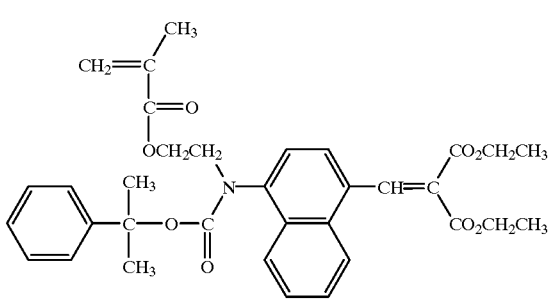
B-(35)
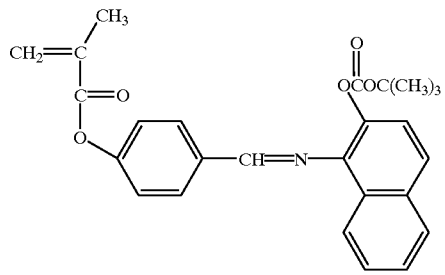
B-(36)
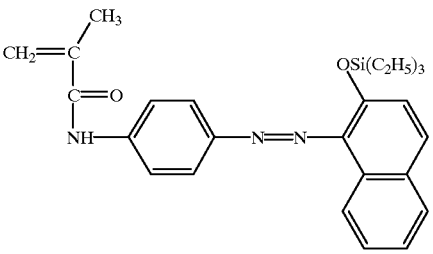

B-(37)
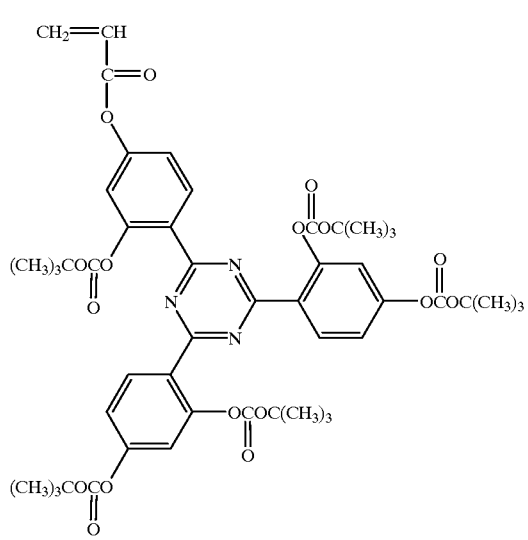
B-(38)
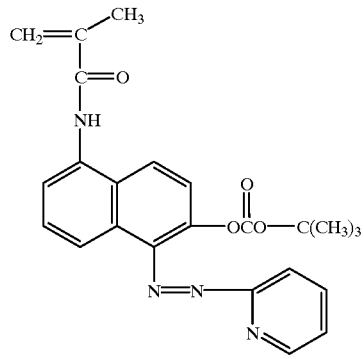
B-(39)
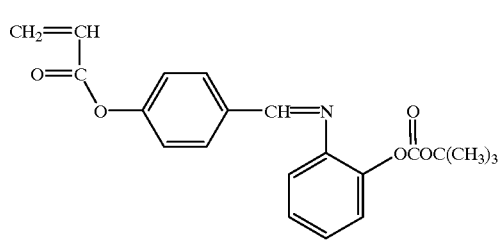
B-(40)
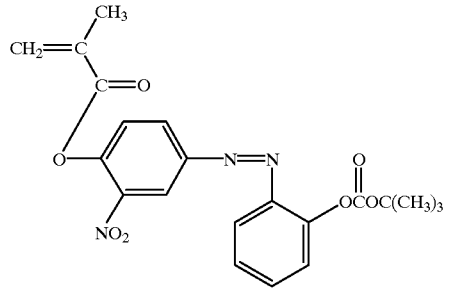
B-(41)
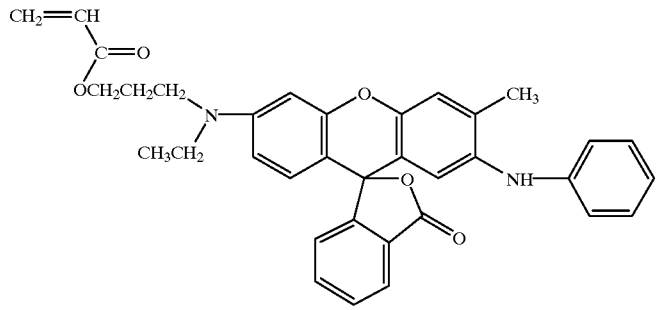
B-(42)
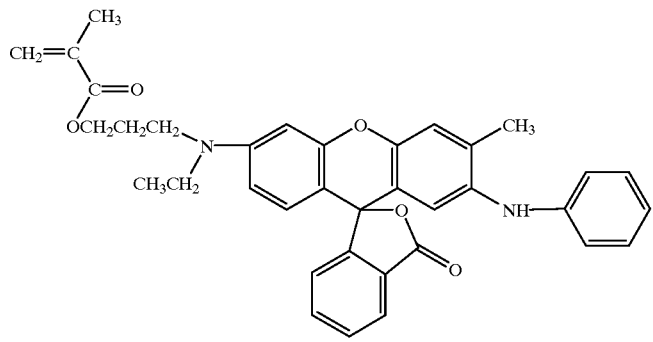

-continued
B-(43)
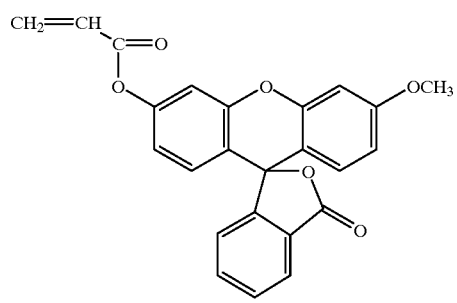
B-(44)
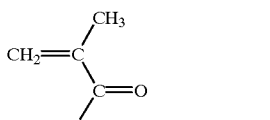
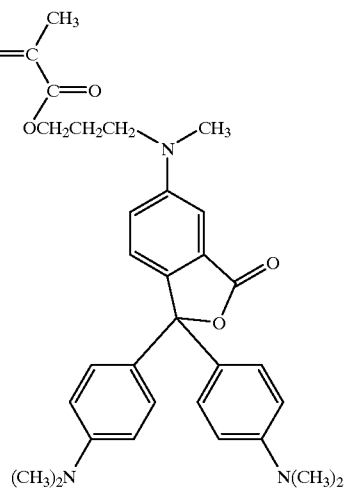
B-(45)
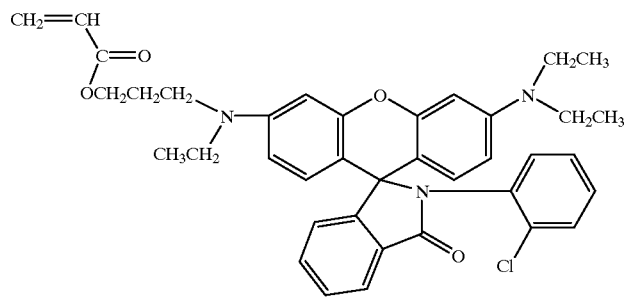
B-(46)
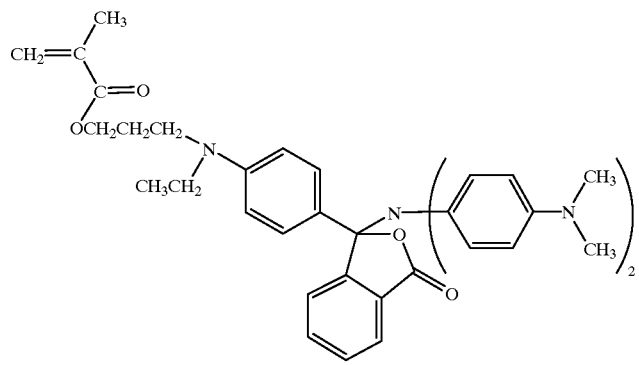
B-(47)
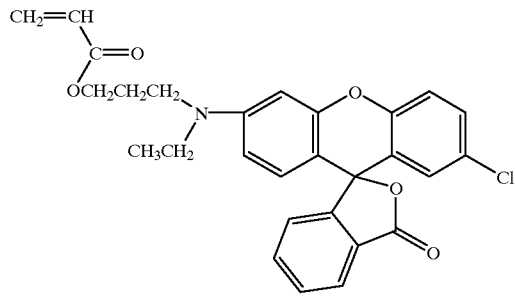

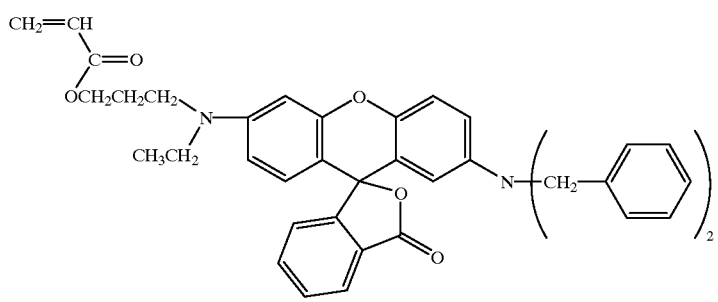

B-(48)

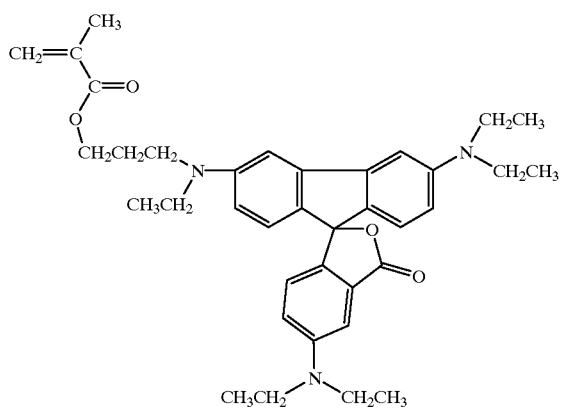

B-(49)

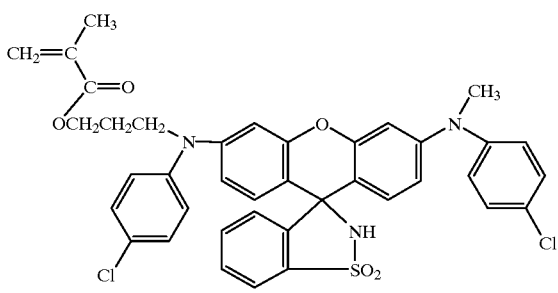

B-(50)

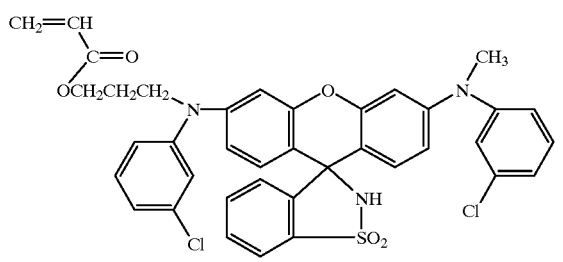

B-(51)

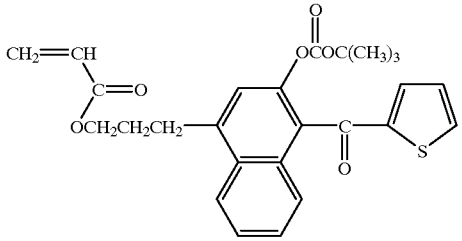

B-(52)

C in formula (6) represents a repeating unit obtained by polymerizing at least one vinyl monomer capable of forming a copolymer together with A and B, and the storage stability, coloring activity and the like can be controlled by adjusting the polarity, glass transition temperature or the like. Preferred examples thereof include acrylic ester, methacrylic ester, acrylamide, styrene and vinyl ether. Specific examples of the monomer for forming C are set forth below, however, the present invention is by no means limited thereto.

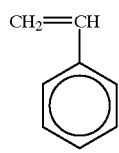

C-(1)

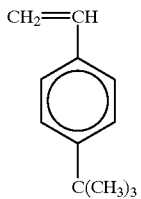

C-(2)

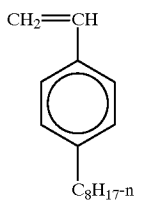

C-(3)

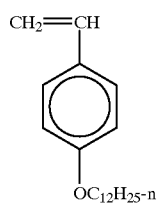
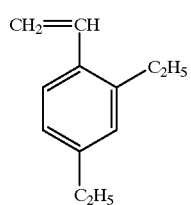
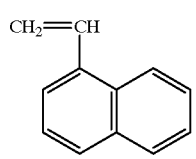
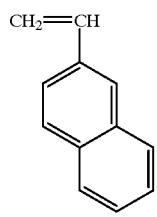
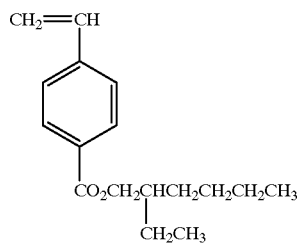
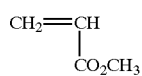
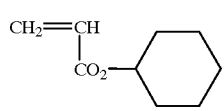
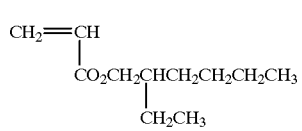
C-(4)
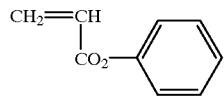
C-(5)
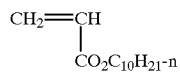
C-(6)
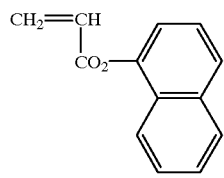
C-(7)
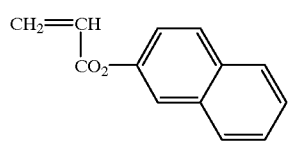
C-(8)
C-(9)
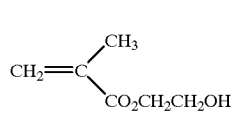
C-(10)
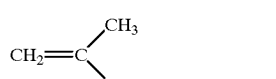
C-(11)
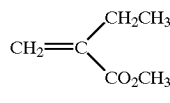
C-(12)
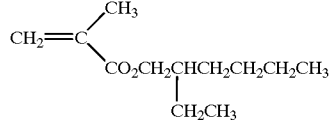
C-(13)
C-(14)
C-(15)
C-(16)
C-(17)
C-(18)
C-(19)
C-(20)
C-(21)
C-(22)
C-(23)
C-(24)
C-(25)
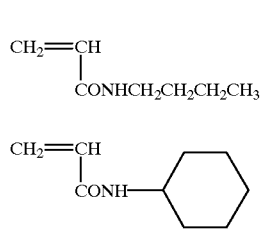

C-(26) 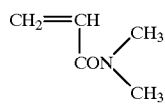

C-(27) 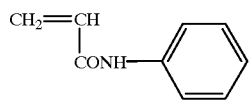

C-(28) 

C-(29) 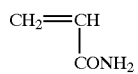

C-(30) 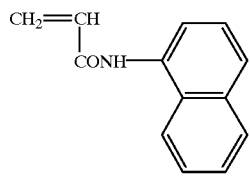

C-(31) 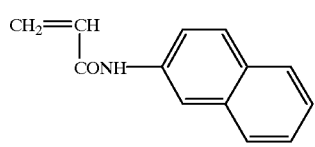

C-(32) 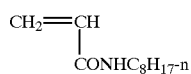

C-(33) 

C-(34) 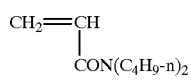

C-(35) 

C-(36) 

C-(37) 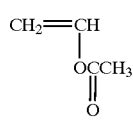

C-(38) 

C-(39) 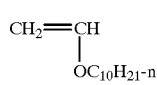

C-(40) 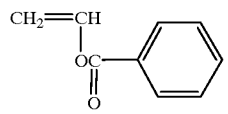

C-(41) 

C-(42) 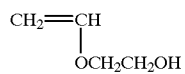

C-(43) 

C-(44) 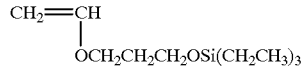

C-(45) 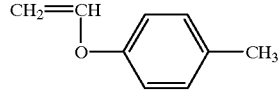

C-(46) 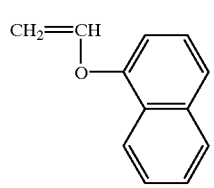

C-(47) 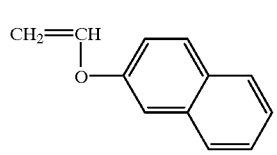

C-(48) 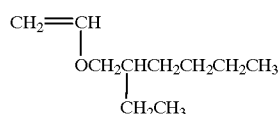

In formula (6), x, y and z represent % by weight of respective compositions. x, y and z satisfy the conditions of $1 \leq x \leq 99$, $1 \leq y \leq 99$, $0 \leq z \leq 98$ and $x+y+z=100$. x and y are preferably in the relation of $0.01y \leq x \leq 10y$, more preferably $0.1y \leq x \leq 5y$. z preferably satisfies the condition of $0 \leq z \leq 50$.

The polymer represented by formula (6) preferably has a molecular weight of from 1,000 to 1,000,000, more preferably from 2,000 to 100,000. The polymer may have any form of a random copolymer, an alternate copolymer and a block copolymer, however, a random copolymer easy to synthesize is commonly used.

The monomers for forming A, B and C and the preferred combinations of x, y and z in the polymer represented by formula (6) are shown below, however, the present invention is by no means limited thereto.

TABLE 1'

| | A | B | C | x | y | z |
|---|---|---|---|---|---|---|
| P-(1) | A-(1) | B-(1) | — | 67 | 33 | — |
| P-(2) | A-(1) | B-(1) | — | 75 | 25 | — |
| P-(3) | A-(1) | B-(1) | C-(17) | 50 | 25 | 25 |
| P-(4) | A-(1) | B-(1) | C-(18) | 50 | 25 | 25 |
| P-(5) | A-(1) | B-(1) | C-(1) | 50 | 25 | 25 |
| P-(6) | A-(1) | B-(1) | C-(11) | 40 | 20 | 40 |
| P-(7) | A-(1) | B-(5) | — | 67 | 33 | — |
| P-(8) | A-(1) | B-(6) | — | 67 | 33 | — |
| P-(9) | A-(1) | B-(13) | — | 67 | 33 | — |
| P-(10) | A-(1) | B-(19) | — | 67 | 33 | — |
| P-(11) | A-(1) | B-(21) | — | 67 | 33 | — |
| P-(12) | A-(1) | B-(25) | — | 67 | 33 | — |
| P-(13) | A-(1) | B-(29) | — | 67 | 33 | — |
| P-(14) | A-(1) | B-(41) | — | 67 | 33 | — |
| P-(15) | A-(1) | B-(41) | — | 75 | 25 | — |
| P-(16) | A-(1) | B-(41) | — | 80 | 20 | — |
| P-(17) | A-(1) | B-(43) | — | 75 | 25 | — |
| P-(20) | A-(2) | B-(1) | — | 67 | 33 | — |
| P-(21) | A-(6) | B-(1) | — | 67 | 33 | — |
| P-(22) | A-(8) | B-(1) | — | 67 | 33 | — |
| P-(23) | A-(13) | B-(1) | — | 67 | 33 | — |
| P-(24) | A-(28) | B-(5) | C-(10) | 50 | 10 | 40 |
| P-(25) | A-(30) | B-(41) | C-(14) | 60 | 20 | 20 |
| P-(26) | A-(41) | B-(1) | — | 67 | 33 | — |
| P-(27) | A-(42) | B-(41) | — | 67 | 33 | — |
| P-(28) | A-(43) | B-(26) | — | 67 | 33 | — |
| P-(29) | A-(45) | B-(1) | — | 67 | 33 | — |
| P-(30) | A-(47) | B-(1) | — | 67 | 33 | — |
| P-(31) | A-(1) | B-(1) | — | 50 | 50 | — |
| P-(32) | A-(1) | B-(1) | — | 20 | 80 | — |
| P-(33) | A-(1) | B − (1)/B − (28)/B − (42) (= 1/1/1) | C-(1) | 40 | 40 | 10 |
| P-(34) | A-(1) | B − (1)/B − (28) (= 1/1) | — | 50 | 50 | — |

The polymer of the present invention can be synthesized by, for example, solution polymerization, precipitation polymerization, suspension polymerization, bulk polymerization or emulsion polymerization. The polymerization may be initiated by a method of using a radical initiator or a method of irradiating light or radiant. These polymerizations methods and polymerization initiating methods are described, for example, in T. Tsuruta, *Kobunshi Gosei Ho'ho, kaitei-ban* (*Polymer Synthesis Method, revised edition*), Nikkan Kogyo Shinbun Sha (1971) and T. O'tsu and M. Kinoshita, *Kobunshi Gosei no Jikken-Ho* (*Experimental Method of Polymer Synthesis*), pp. 124–154, Kagaku Dojin (1972).

Of those polymerization methods, solution polymerization using a radical initiator is particularly preferred. Examples of the solvent for use in the solution polymerization include various organic solvents such as ethyl acetate, methanol, ethanol, 1-propanol, 2-propanol, 1-butanol, acetone, dioxane, N,N-dimethylformamide, N,N-dimethylacetamide, benzene, toluene, acetonitrile, methylene chloride, chloroform and dichloroethane. These solvents may be used individually or in combination of two or more thereof or may be used as a mixed solvent with water.

The polymerization temperature is necessary to be selected in relation with the molecular weight of the polymer produced or the kind of initiator. The polymerization temperature may be from 0 to 100° C. but it is usually from 30 to 100° C. In the present invention, the polymerization is preferably performed at from 30 to 60° C. because the monomer for forming the site of A in formula (1) may decompose at a high temperature.

Preferred examples of the radical initiator used for the polymerization include aza-based initiators such as 2,2'-azobisisobutyronitile, 2,2'-azobis(2,4-dimethylvaleronitrile), 2,2'-azobis(2-amidinopropane) dihydrochloride and 4,4'-azobis(4-cyanopentanoic acid) and peroxide-based initiators such as benzoyl peroxide, t-butyl hydroperoxide and potassium persulfate (which may be used as a redox initiator by combining, for example, with sodium hydrogensulfite). In the present invention, an initiator of giving a half-value period of 10 hours at a temperature of 70° C. or less (for example, 2,2'-azobis(2,4-dimethylvaleronitrile),2,2'-azobis(4-methoxy-2,4-dimethylvaleronitrile), dimethyl 2,2'-azobis(2-methylpropionate) and 2,2'-azobis[2-(3,4,5,6-tetrahydropropane)dihydrochloride]) is particularly preferred.

The amount of the polymerization initiator used may be controlled according to the polymerizability of the monomer or the molecular weight of the polymer intended but it is preferably from 0.01 to 5.0 mol % based on the monomers.

In synthesizing the polymer of the present invention, the polymerization may be performed by mixing monomers for forming A, B and C, placing the mixture in a reaction vessel and then adding an initiator or by passing through a step of adding dropwise those monomers to a polymerization solvent.

In the image recording medium of the present invention, the polymer used in the image forming layer is a polymer having both a partial structure having a function of generating an acid by the action of an acid and breeding an acid by the action of the acid generated from the moiety itself and a partial structure of causing change in the absorption region of from 360 to 900 nm by the action of an acid. As such a polymer, a polymer of a single monomer having these functions at the same time may be used, however, from the synthetic standpoint, a structure represented by formula (6) is generally used.

The image recording medium of the present invention is generally manufactured by coating a polymer represented by formula (6) on a support. In the case where the polymer of the present invention has also a function of generating an acid by heat, there occurs change in the absorption region only by the action of heat and accordingly, the thermosensitive recording material as such used exhibits high sensitivity and good image sharpness. Furthermore, the image recording medium of the present invention is advantageous in that the film thickness can be reduced, a fairly sharp image can be obtained and ablation is difficult to take place.

In the present invention, a slight amount of base may be added for the purpose of increasing the storage stability of the image recording medium, a compound capable of generating an acid by the action of light or heat may be separately added so as to increase the sensitivity, or if desired, additives such as a pigment, an antistatic agent and a sticking inhibitor may be added. Furthermore, an overcoat layer may be provided in order to protect the image forming layer or a backcoat layer may be provided on the back surface of the support. In addition, various known techniques for the thermosensitive material may be used, for example, a single or plurality of undercoat layers comprising a pigment or resin may be provided between the image recording layer and the support.

In the case of adding a base, an organic base is preferred and preferred examples thereof include guanidine derivatives (e.g., 1,3-diphenylguanidine, 1,3-dimethylguanidine, 1,3-dibutylguanidine, 1-benzylguanidine, 1,1,3,3-tetramethylguanidine), aniline derivatives (e.g., aniline, p-t-butylaniline, N,N'-dimethylaniline, N,N'-dibutylaniline, triphenylamine), alkylamine derivatives (e.g., tributylamine, octylamine, laurylamine, benzylamine, dibenzylamine) and heterocyclic compounds (e.g., N,N'-dimethylaminopyridine, 1,8-diazabicyclo[5.4.0]-undecene, triphenylimidazole, rutidine, 2-picolin). The base is preferably added in an amount of from 1 to 50 mol %, more preferably from 5 to 20 mol %, based on the composition represented by A of formula (1).

The polymer represented by formula (6) may contain a compound capable of generating an acid by the action of light or heat and specific examples thereof are as described above.

The compound is preferably added in an amount of from 1 to 50 mol %, more preferably from 1 to 20 mol %, based on the site of A in the polymer.

In the case of adding a pigment, examples thereof include diatomaceous earth, talc, kaolin, calcined kaolin, titanium oxide, silicon oxide, magnesium carbonate, calcium carbonate, aluminum hydroxide and urea-formalin resin.

Examples of other additives include an ultraviolet absorbent such as benzophenone-based ultraviolet absorbent and benzotriazole-based ultraviolet absorbent, a head abrasion or sticking inhibitor comprising a higher fatty acid metal salt such as zinc stearate and calcium stearate, and waxes such as paraffin, paraffin oxide, polyethylene, polyethylene oxide and caster wax, and these may be added if desired.

Examples of the support for use in the image recording medium of the present invention include papers such as wood free paper, baryta paper, coat paper, cast coat paper and synthetic paper, polymer film such as polyethylene, polypropylene, polyethylene terephthalate, polyethylene-2,6-naphtylene dicarboxylate, polyarylene, polyimide, polycarbonate and triacetyl cellulose, glass, metal foil and non-woven fabric.

In the case when the image recording medium of the present invention is used for forming a transmitting image, for example, as OHP film or photomechanical film, a transparent support is used. For the photomechanical film, a support having a small coefficient of thermal expansion and good dimensional stability and having no absorption in the photosensitive region of the PS plate is selected.

In the formation of an image using the image recording medium of the present invention, heating may be performed by a method of contacting the medium with a heated block or plate, a method of contacting the medium with a heat roller or heat drum, a method of irradiating a halogen lamp or an infrared or far infrared lamp heater, a method of imagewise heating the medium by a thermal head of a thermosensitive printer or a method of irradiating a laser ray. When the image recording medium of the present invention is used for the material required to have high resolution, such as photomechanical material, a scan exposure system using a laser ray is preferred. In order to form an image with a smaller heat energy, the thermosensitive recording material of the present invention may be previously heated at an appropriate temperature. In the present invention, after the imagewise heating according to the above-described method, the entire surface is heated at a temperature of from 60 to 150° C. (preferably from 60 to 120° C.) so that the picture image can be amplified. More specifically, in the polymer of the present invention, the site of A first decomposes by the heating to generate an acid and further, by the action of the acid generated, change in the absorption of B is caused. This reaction proceeds within a very short time upon irradiation of a laser ray but the picture image can be amplified by the after-treatment.

In the case of forming an image by the irradiation of a laser ray, a dye of absorbing light at the wavelength of the laser ray is necessary to be present so as to convert the laser ray to the heat energy. Examples of the laser light source include an excimer laser, an argon laser, a helium-neon laser, a semiconductor laser, a glass (YAG) laser, a carbon dioxide gas laser and a dye laser. Of these, a helium-neon laser, a semiconductor laser and a glass laser are useful in the present invention. In particular, a semiconductor laser is more useful because the device is compact and inexpensive. The semiconductor usually has an oscillation wavelength of from 670 to 830 nm and a dye having absorption in this near infrared region is used. Examples of the dye having near infrared absorption include a cyanine dye, a squarylium dye, a merocyanine dye, an oxonol dye and a phthalocyanine dye. Specific examples thereof include the materials described in U.S. Pat. Nos. 4,973,572, 4,948,777, 4,950,640, 4,950,639, 4,948,776, 4,948,778, 4,942,141, 4,952,552, 5,036,040 and 4,912,083.

In the case when a compound capable of generating an acid by light is used, a laser is selected according to the absorption characteristics of the photoacid generating agent as means for forming a latent image. For the purpose of spectral sensitization, various dyes may be added but in this case, the laser used must be selected taking account of the absorption wavelength of the dye.

The present invention is described in greater detail below by referring to the Examples, however, it should be understood that the present invention is not limited thereto.

The compounds shown below were dissolved in chloroform and the solutions obtained each was coated on a 100 μm-thick polyethylene terephthalate film and dried to obtain a transparent thermosensitive recording sheet. The polystyrene used was polystyrene bead (diameter: about 3.2 mm) produced by Wako Junyaku KK.

| Sample 1: | |
| --- | --- |
| E-(35) | 0.4 mmol/m$^2$ |
| F-(1) | 4 mmol/m$^2$ |
| H-(1) | 2 mmol/m$^2$ |
| IR dye | 113 mg/m$^2$ |
| Polystyrene | 0.85 g/m$^2$ |
| Sample 2: | |
| F-(1) | 4 mmol/m$^2$ |
| H-(2) | 2 mmol/m$^2$ |
| IR dye | 113 mg/m$^2$ |
| Polystyrene | 0.85 g/m$^2$ |
| Sample 3: | |
| E-(35) | 0.4 mmol/m$^2$ |
| F-(21) | 4 mmol/m$^2$ |
| H-(1) | 2 mmol/m$^2$ |
| IR dye | 113 mg/m$^2$ |
| Polystyrene | 0.85 g/m$^2$ |
| Sample 4: | |
| F-(35) | 0.4 mmol/m$^2$ |
| F-(36) | 4 mmol/m$^2$ |
| H-(1) | 2 mmol/m$^2$ |
| IR dye | 113 mg/m$^2$ |
| Polystyrene | 0.85 g/m$^2$ |
| Sample 5: | |
| E-(35) | 0.4 mmol/m$^2$ |
| F-(51) | 4 mmol/m$^2$ |
| H-(1) | 2 mmol/m$^2$ |
| IR dye | 113 mg/m$^2$ |
| Polystyrene | 0.85 g/m$^2$ |
| Sample 6: | |
| E-(31) | 0.4 mmol/m$^2$ |
| F-(1) | 4 mmol/m$^2$ |

| | |
|---|---|
| H-(1) | 2 mmol/m² |
| IR dye | 113 mg/m² |
| Polystyrene | 0.85 g/m² |
| Sample 7: | |
| | |
| F-(8) | 4 mmol/m² |
| H-(1) | 2 mmol/m² |
| IR dye | 113 mg/m² |
| Sample 8: | |
| | |
| E-(35) | 0.4 mmol/m² |
| F-(22) | 4 mmol/m² |
| G-(30) | 2 mmol/m² |
| IR dye | 113 mg/m² |
| Polystyrene | 0.85 g/m² |
| Sample 9: | |
| | |
| E-(35) | 0.4 mmol/m² |
| F-(22) | 4 mmol/m² |
| G-(25) | 2 mmol/m² |
| IR dye | 113 mg/m² |
| Polystyrene | 0.85 g/m² |
| Sample 10: | |
| | |
| E-(35) | 0.4 mmol/m² |
| F-(22) | 4 mmol/m² |
| H-(35) | 2 mmol/m² |
| IR dye | 113 mg/m² |
| Polystyrene | 0.85 g/m² |
| Reference Sample 1: | |
| | |
| p-Toluenesulfonic acid | 4 mmol/m² |
| H-(1) | 2 mmol/m² |
| IR dye | 113 mg/m² |
| Polystyrene | 0.85 g/m² |
| Reference Sample 2: | |
| | |
| H-(1) | 2 mmol/m² |
| IR dye | 113 mg/m² |
| Polystyrene | 0.85 g/m² |
| Reference Sample 3: | |
| | |
| E-(31) | 0.4 mmol/m² |
| Reference Compound 1 | 4 mmol/m² |
| H-(1) | 2 mmol/m² |
| IR dye | 113 mg/m² |
| Polystyrene | 0.85 g/m² |
| Reference Sample 4: | |
| | |
| E-(35) | 0.4 mmol/m² |
| Reference Compound 1 | 4 mmol/m² |
| H-(1) | 2 mmol/m² |
| IR dye | 113 mg/m² |
| Polystyrene | 0.85 g/m² |
| Reference Sample 5: | |
| | |
| Nitrocellulose (viscosity: 1,000 sec, produced by Dicel Kogyo KK) | 0.85 g/m² |
| Reference Dye 1 | 0.35 g/m² |
| Reference Dye 2 | 0.55 g/m² |
| IR Dye 1 | 113 mg/m² |
| Reference Sample 6: | |
| | |
| Polyvinyl butyral | 0.85 g/m² |
| Reference Dye 1 | 0.35 g/m² |
| Reference Dye 2 | 0.55 g/m² |
| IR Dye 1 | 113 mg/m² |

IR Dye:

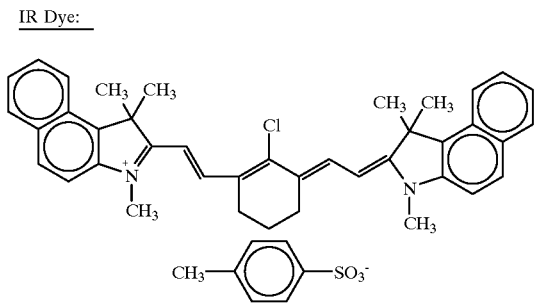

Reference Compound 1:

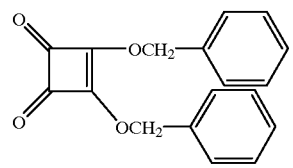

Reference Dye 1:

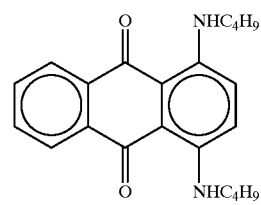

Reference Dye 2:

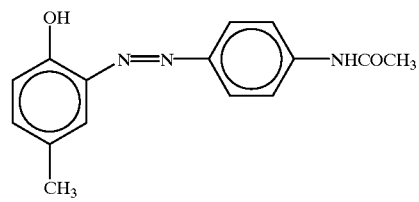

EXAMPLE 1

Laser Exposure Condition for Image Recording

Wavelengths of 8 lines of Spectra Diode Labs No. SDL-2430 (wavelength range: 800 to 830 nm) were combined and the output was set at 400 mW to prepare a laser for image writing.

Each of the samples prepared above was exposed using this laser by setting the beam system at 160 μm, the laser scanning speed at 0.5 m/sec (scan center part), the sample feeding speed at 15 mm/sec and the scanning pitch at 8 lines/mm so as to obtain an image of 22 mm×9 mm. At this time, the laser energy density on the sample was 5 mJ/mm².

After Samples 1 to 5 and Reference Samples 1 and 2 were scan exposed under the above-described laser exposure conditions, the color density at 360 nm in the exposed area was examined. Thereafter, each sample after the laser exposure was heat developed under the heating conditions of 120° C. and 30 seconds and then, the color density in the exposed area and unexposed area was determined.

The results obtained are shown in Table 1 (the color density shown is a value corrected by subtracting the absorption density (about 0.2) of the raw film).

TABLE 1

Color Density

| | Laser Exposed Area (5 mJ/mm$^2$) | | Laser Unexposed Area |
|---|---|---|---|
| | No Heating | Heating (120° C., 30 sec) | Heating (120° C., 30 sec) |
| Sample 1 | 0.8 | 2.8 | 0 |
| Sample 2 | 0.3 | 2.5 | 0 |
| Sample 3 | 0.2 | 2.6 | 0 |
| Sample 4 | 0.3 | 2.3 | 0 |
| Sample 5 | 0.1 | 2.1 | 0 |
| Reference Sample 1 | 1.9 | 2.8 | 2.8 |
| Reference Sample 2 | 0 | 0 | 0 |

It is seen from Table 1 that Reference Sample 2 free of an acid was not colored at all by the laser exposure or the heat development after the exposure, whereas Samples 1 to 5 of the present invention exhibited good coloring property at the heat development after the laser exposure. Furthermore, it is seen that in the samples of the present invention, the color density in the exposed area increased by the heat development after the laser exposure but since the unexposed area was not colored at all, a high contrast image could be obtained. In Sample 2, B-(1) has a function as an acid breeding agent and a function as a thermal acid generating agent at the same time and accordingly, a color image could be obtained even without separately adding an acid generating agent as done in Sample 1.

EXAMPLE 2

After Samples 1 to 6 and Reference Sample 1 were stored at 60° C. for 3 days, the color density at 360 nm was examined. Thereafter, the samples each was heat developed under the heating conditions of 120° C. and 30 seconds and then the color density was examined. Furthermore, the color density when the samples after storage each was laser exposed under the above-described exposure conditions and the color density when each sample was heat developed (120° C., 30 seconds) after the laser exposure were examined. The results obtained are shown in Table 2.

TABLE 2

60° C., 3 days

| | No Laser Exposure | | Laser Exposure (5 mJ/mm$^2$) | |
|---|---|---|---|---|
| | No Heating | Heating (120° C./30 sec) | No Heating | Heating (120° C./30 sec) |
| Sample 1 | 0 | 0 | 0.7 | 2.7 |
| Sample 2 | 0 | 0 | 0.4 | 2.8 |
| Sample 3 | 0.1 | 0.2 | 0.3 | 2.8 |
| Sample 4 | 0 | 0.1 | 0.2 | 2.4 |
| Sample 5 | 0 | 0 | 0.1 | 2.3 |
| Sample 6 | 0.5 | 1.3 | 0.9 | 2.7 |
| Reference Sample 1 | 0 | 0 | 0 | 0 |

It is seen from Table 2 that Reference Sample 1 was colored under the above-described storage conditions, whereas Samples 1 to 5 of the present invention were completely free of coloring after the storage and even after the heat development only was performed, were not colored at all, thus, revealed to have high storage stability. Furthermore, it is seen that Samples 1 to 5 of the present invention exhibited excellent coloring property at the laser exposure after the storage and at the heat development after the exposure, the same as the results shown in Table 1. It is also seen that Samples 1 to 5 of the present invention using a sulfonic acid precursor as the thermal acid generating agent are superior in the storage stability as compared with Sample 6 of the present invention using an extra acid precursor.

EXAMPLE 3

Laser Exposure Conditions for Image Recording

In the laser exposure method described in Example 1, the energy density was varied as shown in Table 3 by changing the laser scanning speed or the laser output.

Comparison of Image Formation Efficiency

Samples 1 to 10 of the present invention and Reference Samples 3 and 4 each was exposed by laser scanning and then heat developed under the heating conditions of 120° C. and 30 seconds. Then, the maximum color density at the laser scan center part (image area) was determined and by comparing the value obtained with the theoretical value in the case of 100% coloring, the image formation efficiency (coloring efficiency) was calculated. With respect to Reference Samples 4 and 5, the image formation efficiency (decolorization efficiency) was calculated from the comparison between the density of the laser scan center part (image area) and the density of the non-image area. The results obtained are shown in Table 3.

TABLE 3

Image Formation Efficiency
(Laser Exposure + Heat Development)

| | Laser Energy Density (mJ/mm$^2$) | | |
|---|---|---|---|
| | 10 | 5 | 3 |
| Sample 1 (Invention) | 89% | 97% | 85% |
| Sample 2 (Invention) | 87% | 92% | 78% |
| Sample 3 (Invention) | 92% | 98% | 93% |
| Sample 4 (Invention) | 90% | 89% | 68% |
| Sample 5 (Invention) | 93% | 87% | 63% |
| Sample 6 (Invention) | 96% | 100% | 97% |
| Sample 7 (Invention) | 94% | 98% | 92% |
| Sample 8 (Invention) | 87% | 68% | 33% |
| Sample 9 (Invention) | 98% | 93% | 48% |
| Sample 10 (Invention) | 92% | 89% | 32% |
| Reference Sample 3 | 72% | 13% | 0% |
| Reference Sample 4 | 2% | 0% | 0% |
| Reference Sample 5 | 70% | 35% | 0% |
| Reference Sample 6 | 25% | 0% | 0% |

In the case where the laser energy density was 10 mJ/mm$^2$, it was confirmed by the observation of the exposed area through an optical microscope that in all samples, ablation was generated at the laser scanning center part. Due to this, the apparent coloring efficiency of samples of the present invention which are a coloring type was evaluated lower than the actual coloring efficiency. On the other hand, in the case where the laser energy density was 5 mJ/mm² or less, ablation was not observed except for Reference Sample 4. It is seen from Table 3 that out of the samples of the present invention, samples using a dye capable of absorbing light at the wavelength of the laser ray could form an image efficiently even with a low energy (5 mJ/mm² or less) on the order of not causing ablation and were revealed to have higher sensitivity than the samples using ablation by the laser ray.

Furthermore, Samples 1 to 7 had higher sensitivity than Reference Samples 3 and 4 using a secondary acid generating agent (Reference Compound 1) described in WO94/10606. In particular, Reference Sample 4 using a combination of Reference Compound 1 and an acid generating agent of generating a sulfonic acid was scarcely colored.

Representative synthesis examples of the copolymer of the present invention are described below.

SYNTHESIS EXAMPLE 1

Synthesis of P-(1)

1) Synthesis of A-(1)

18 g of t-butyl 2-methyl-2-(2-hydroxymethyl) acetoacetate synthesized according to the method described in JP-A-8-248561, 19.8 g of triethylamine and 2 g of 4-dimethylaminopyridine were dissolved in 90 ml of methylene chloride. To the resulting solution, 18 g of p-vinylbenzenesulfonyl chloride (synthesized by allowing thionyl chloride to act on sodium p-vinylbenzenesulfonate) was added, and the solution was stirred at room temperature for 4 hours. To the reaction solution 100 ml of water was added, and then the organic layer was extracted and washed twice with 100 ml of water. The organic layer was dried over magnesium sulfate and after added thereto 2 mg of hydroquinone monomethyl ether, concentrated under reduced pressure. The oily product obtained was purified by a silica gel column chromatography (eluent: n-hexane/ethyl acetate=3/1) to obtain 17.7 g (yield 54.1%) of a colorless transparent oil. The structure obtained was identified by the mass spectrometry, elemental analysis and $^1$H-NMR.

Mass spectrometry: M$^+$=367

Elemental analysis:

| Calculated: | C: 58.68%, H: 6.57%, S: 8.70% |
| Found: | C: 58.69%, H: 6.59%, S: 8.71% |

$^1$H-NMR (CDCl$_3$) δ (ppm): 1.40 (s, 3H), 1.42 (s, 9H), 2.15 (s, 3H), 4.30 (Abq, 2H), 5.50 (d, 1H), 5.93 (d, 1H), 6.78 (dd, 1H), 7.58 (d, 2H), 7.85 (d, 2H)

2) Synthesis of B-(1)

50 g of 4-(2-methacryloyloxyethyl)-2-(2H-benzotriazol-2-yl)phenol (produced by Otsuka Kagaku KK) was dissolved in 300 ml of THF and thereto, 17.4 g of potassium t-butoxy was added under ice cooling. To the resulting solution, 50.4 g of di-t-butyl dicarbonate was added, and the mixture was stirred for 1.5 hours under ice cooling. To the solution obtained, 300 ml of water was added and further 500 ml of ethyl acetate was added to extract the organic layer. The organic layer was washed twice with water, dried over magnesium sulfate, and after adding thereto 10 mg of hydroquinone monomethyl ether, concentrated under reduced pressure. The concentrate obtained was recrystallized from acetonitrile to obtain 54 g (yield: 82.3%) of white crystals. The structure was identified by the mass spectrometry, elemental analysis and $^1$H-NMR.

Mass spectrometry: M$^+$=422

Elemental analysis for $C_{23}H_{25}N_3O_5$:

| Calculated: | C: 65.23%, H: 5.95%, N: 9.92% |
| Found: | C: 65.31%, H: 5.97%, N: 9.90% |

Melting point: 125–127° C.

$^1$H-NMR (CDCl$_3$) δ (ppm): 1.51 (s, 9H), 1.95 (s, 3H), 3.11 (t, 2H), 4.45 (t, 2H), 5.55 (s, 1H), 6.10 (s, 1H), 7.27–7.45 (m, 4H), 7.90 (d, 1H), 7.92 (d, 1H), 8.10 (s, 1H)

3) Synthesis of P-(1)

20 g of A-(1) and 11.5 g of B-(1) were dissolved in 50 ml of benzene and thereto 202.4 mg of 2,2'-azobis(2,4-dimethylvaleronitrile), followed by stirring under heating at 60° C. for 10 hours. The reaction solution was added to 500 ml of MeOH and the white polymer precipitated was isolated. As a result, 14.5 g (yield: 46.03%) of a polymer (P-(1)) having a molecular weight of 5,200 and a molecular weight distribution (Mw/Mn) of 3.7 was obtained. This polymer was identified to be a copolymer of A-(1) and B-(1) by $^1$H-NMR and x:y was verified to be 67:33 by the elemental analysis. The thermal decomposition temperature was from 145 to 148° C.

SYNTHESIS EXAMPLE 2

Synthesis of P-(14)

2 g of A-(1) and 1.52 g of B-(41) were dissolved in 5 ml of benzene and thereto 20.2 mg of 2,2'-azobis(2,4-dimethylvaleronitrile) was added, followed by stirring at 60° C. for 10 hours. The reaction solution was added to 30 ml of methanol and then white amorphous was obtained. The supernatant was removed by decantation and the polymer was dissolved in a slight amount of methylene chloride and added to methanol to cause reprecipitation. The supernatant was removed and the residue was dried to obtain 220 mg (yield: 6.25%) of a polymer (P-(14)) having a molecular weight of 3,800 and a molecular weight distribution (Mw/Mn) of 3.2 was obtained. This polymer was identified to be a copolymer of A-(1) and B-(41) by $^1$H-NMR and x:y was verified to be 67:33 by the elemental analysis. The melting point was from 120 to 123° C., the thermal decomposition temperature was from 145 to 148° C. and formation of a dark green color was confirmed at the same time with the decomposition.

EXAMPLE 4

The following compounds were dissolved in chloroform and the solutions obtained each was coated on a 100 μm-thick polyethylene terephthalate film and dried to prepare a transparent thermosensitive recording sheet.

Sample 1':

| | | |
|---|---|---|
| P-(1) | benzotriazole moiety: | 2 mmol/m² |
| IR dye | | 113 mg/m² |

Reference Sample 1':

| | | |
|---|---|---|
| p-Toluenesulfonic acid | | 4 mmol/m² |
| Comparative compound | benzotriazole: | 2 mmol/m² |
| IR dye | | 113 mg/m² |

Reference Sample 2':

| | | |
|---|---|---|
| Comparative compound | benzotriazole moiety: | 2 mmol/m² |
| IR dye | | 113 mg/m² |

Comparative Compound:

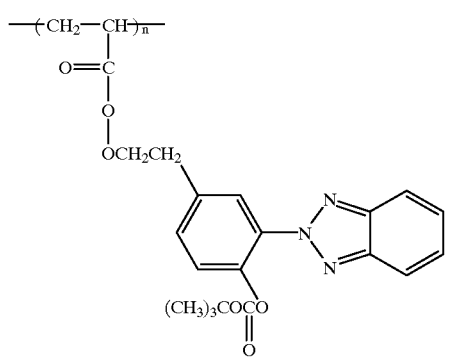

IR Dye (1):

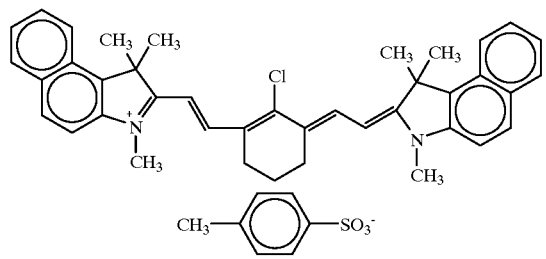

Laser Exposure Condition for Image Recording

Wavelengths of 8 lines of Spectra Diode Labs No. SDL-2430 (wavelength range: 800 to 830 nm) were combined and the output was set at 400 mW to prepare a laser for image writing.

Each of the samples prepared above was exposed using this laser by setting the beam system at 160 μm, the laser scanning speed at 0.5 m/sec (scan center part), the sample feeding speed at 15 mm/sec and the scanning pitch at 8 lines/mm so as to obtain an image of 22 mm×9 mm. At this time, the laser energy density on the sample was 5 mJ/mm².

After Sample 1' and Reference Samples 1' and 2' were scan exposed under the above-described laser exposure conditions, the color density at 360 nm in the exposed area was examined. Thereafter, each sample after the laser exposure was heat developed under the heating conditions of 120° C. and 60 seconds and then, the color density in the exposed area and unexposed area was determined.

The results obtained are shown in Table 4 (the color density shown is a value corrected by subtracting the absorption density (about 0.2) of the raw film).

TABLE 4

| | Color Density | | |
|---|---|---|---|
| | Laser Exposed Area (5 mJ/mm²) | | Laser Unexposed Area |
| | No Heating | Heating (120° C., 60 sec) | Heating (120° C., 60 sec) |
| Sample 1' | 0.8 | 2.3 | 0 |
| Reference Sample 1' | 1.2 | 2.3 | 2.3 |
| Reference Sample 2' | 0 | 0 | 0 |

It is seen from Table 4 that Reference Sample 2' was not colored at all by the laser exposure or the heat development after the exposure, whereas Sample 1' of the present invention exhibited coloring property equal to or superior to the coloring property of Reference Sample 1', only the by laser exposure. Furthermore, it is seen that in the Sample 1' of the present invention, the color density in the exposure area increased by the heat development after the laser exposure but since the unexposed area was not colored at all, a high contrast image could be obtained.

EXAMPLE 5

After Sample 1' and Reference Sample 1' were stored at 60° C. and 70% RH for 3 days, the color density at 360 nm was examined. Thereafter, the samples each was heat developed under the heating conditions of 120° C. and 60 seconds and then the color density was examined. Furthermore, the color density when the samples after storage each was laser exposed under the above-described exposure conditions and the color density when each sample was heat developed (120° C., 60 seconds) after the laser exposure were examined. The results obtained are shown in Table 5.

TABLE 5

| | 60° C. and 70% RH for 3 days | | | |
|---|---|---|---|---|
| | No Laser Exposure | | Laser Exposure (5 mJ/mm²) | |
| | No Heating | Heating (120° C., 60 sec) | No Heating | Heating (120° C., 60 sec) |
| Sample 1' | 0 | 0 | 1.8 | 2.3 |
| Reference Sample 1' | 2.1 | 2.3 | 2.3 | 2.3 |

It is seen from Table 5 that Reference Sample 1' was colored under the above-described storage conditions, whereas Sample 1' of the present invention was completely free of coloring after the storage and even after the heat development only was performed, was not colored at all, thus, revealed to have high storage stability. Furthermore, it is seen that Sample 1' of the present invention exhibited excellent coloring property at the laser exposure after the storage and at the heat development after the exposure, the same as the results shown in Table 4.

EXAMPLE 6

The following compounds were dissolved in chloroform and the solutions obtained each was coated on a 100 μm-thick polyethylene terephthalate film and dried to prepare a transparent thermosensitive recording sheet.

Sample 1':

| | | | |
|---|---|---|---|
| P-(1) | benzotriazole moiety: | 2 | mmol/m² |
| IR Dye (2) | | 40 | mg/m² |

Sample 2':

| | | | |
|---|---|---|---|
| P-(2) | benzotriazole moiety: | 2 | mmol/m² |
| IR Dye (2) | | 40 | mg/m² |

Sample 3':

| | | | |
|---|---|---|---|
| P-(1) | benzotriazole moiety: | 4 | mmol/m² |
| IR Dye (2) | | 50 | mg/m² |

IR Dye (2):

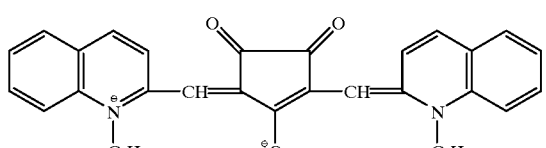

Laser Exposure Condition for Image Recording

The energy density was varied as shown in Table 4 by changing the laser scan speed or the laser output in the laser exposure conditions described in Example 4.

Evaluation of Image Formation Efficiency

Samples 1' to 3' of the present invention was heat developed under the heating conditions of 120° C. and 60 seconds after the laser exposure. Then, the maximum color density at the laser scan center part (image area) was determined and by comparing the value obtained with the theoretical value in the case of 100% coloring, the image formation efficiency (coloring efficiency) was calculated. The results obtained are shown in Table 6.

TABLE 6

| | Color Density | |
|---|---|---|
| | Laser Exposure (3.5 mJ/mm²) | Laser Exposure + Heat Development (3.5 mJ/mm² + 120° C./60 sec) |
| Sample 1' | 1.4 | 2.3 |
| Sample 2' | 1.3 | 2.3 |
| Sample 3' | 2.5 | 4.6 |

It is apparent from Table 6 that the compounds of the present invention were sufficiently colored even without adding a thermal acid generating agent and the polymer itself had a function as a thermal acid generating agent.

EXAMPLE 7

The compounds shown below were dissolved in chloroform and the solutions obtained each was coated on a 100 μm-thick polyethylene terephthalate film and dried to obtain a transparent thermosensitive recording sheet.

Sample 2':

| | | |
|---|---|---|
| P-(2) | benzotriazole moiety: | 3 mmol/m² |
| IR dye | | 113 mg/m² |

Sample 3':

| | | |
|---|---|---|
| P-(3) | benzotriazole moiety: | 2 mmol/m² |
| IR dye | | 113 mg/m² |

Sample 4':

| | | |
|---|---|---|
| P-(7) | benzotriazole moiety: | 2 mmol/m² |
| IR dye | | 113 mg/m² |

Sample 5':

| | | |
|---|---|---|
| P-(9) | benzotriazole moiety: | 2 mmol/m² |
| IR dye | | 113 mg/m² |

Sample 6':

| | | |
|---|---|---|
| P-(13) | leuco dye moiety: | 2 mmol/m² |
| IR dye | | 113 mg/m² |

Sample 7':

| | | |
|---|---|---|
| P-(14) | leuco dye moiety: | 2 mmol/m² |
| IR dye | | 113 mg/m² |

Sample 8':

| | | |
|---|---|---|
| P-(16) | | 2 mmol/m² |
| IR dye | | 113 mg/m² |

Sample 9':

| | | |
|---|---|---|
| P-(21) | | 2 mmol/m² |
| IR dye | | 113 mg/m² |

Sample 10':

| | | |
|---|---|---|
| P-(22) | benzotriazole moiety: | 2 mmol/m² |
| IR dye | | 113 mg/m² |

Sample 11':

| | | |
|---|---|---|
| P-(1) | benzotriazole moiety: | 2 mmol/m² |
| Thermal acid generating agent | | 0.1 mmol/m² |
| IR dye | | 113 mg/m² |

Sample 12':

| | | |
|---|---|---|
| P-(29) | benzotriazole moiety: | 2 mmol/m² |
| Thermal acid generating agent | | 0.1 mmol/m² |
| IR dye | | 113 mg/m² |

Sample 13':

| | | |
|---|---|---|
| P-(47) | benzotriazole moiety: | 2 mmol/m² |
| Thermal acid generating agent | | 0.1 mmol/m² |
| IR dye | | 113 mg/m² |

Reference Sample 3':

| | |
|---|---|
| Nitrocellulose (viscosity: 1,000 sec, produced by Dicel Kogyo KK) | 0.85 g/m² |
| Reference Dye 1 | 0.35 g/m² |
| Reference Dye 2 | 0.55 g/m² |
| IR Dye 1 | 113 mg/m² |

Reference Dye 1:

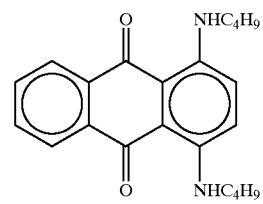

-continued

Reference Dye 2:

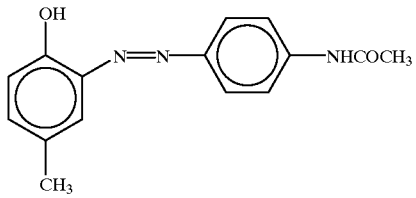

Thermal Acid Generating Agent:

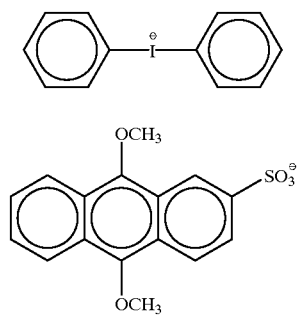

Laser Exposure Condition for Image Recording

The energy density was varied as shown in Table 7 by changing the laser scan speed or the laser output in the laser exposure conditions described in Example 4.

Comparison of Image Formation Efficiency

Samples 1' to 3' of the present invention was heat developed under the heating conditions of 120° C. and 60 seconds after the laser exposure. Then, the maximum color density at the laser scan center part (image area) was determined and by comparing the value obtained with the theoretical value in the case of 100% coloring, the image formation efficiency (coloring efficiency) was calculated. With respect to Reference Example 3', the image formation efficiency (decolorization efficiency) was calculated from the comparison between the density of the laser scan center part (image area) and the density of the non-image area. The results obtained are shown in Table 7.

TABLE 7

| Image Formation Efficiency (Laser Exposure + Heat Development) | | |
|---|---|---|
| | Laser Energy Density (mJ/mm$^2$) | |
| | 5 | 3 |
| Sample 1 (Invention) | 99% | 92% |
| Sample 2 (Invention) | 100% | 99% |
| Sample 3 (Invention) | 93% | 82% |
| Sample 4 (Invention) | 98% | 96% |
| Sample 5 (Invention) | 97% | 90% |
| Sample 6 (Invention) | 89% | 58% |
| Sample 7 (Invention) | 98% | 67% |
| Sample 8 (Invention) | 99% | 92% |
| Sample 9 (Invention) | 79% | 63% |
| Sample 10 (Invention) | 97% | 88% |

TABLE 7-continued

| Image Formation Efficiency (Laser Exposure + Heat Development) | | |
|---|---|---|
| | Laser Energy Density (mJ/mm$^2$) | |
| | 5 | 3 |
| Sample 11 (Invention) | 97% | 96% |
| Sample 12 (Invention) | 60% | 30% |
| Sample 13 (Invention) | 43% | 25% |
| Reference Sample 3 | 35% | 8% |

It is seen from Table 7 that the samples of the present invention could form efficiently an image with a low energy of 5 mJ/mm$^2$ and were superior to Reference Sample 3' using ablation by a laser ray.

While the invention has been described in detail and with reference to specific embodiments thereof, it will be apparent to one skilled in the art that various changes and modifications can be made therein without departing from the spirit and scope thereof.

What is claimed is:

1. A polymer represented by the following formula (6):

$$\text{--}(\text{A})_x(\text{B})_y(\text{C})_z\text{--} \quad (6)$$

wherein A represents a repeating unit obtained by polymerizing at least one vinyl monomer having a function of generating an acid by the action of an acid or heat and further breeding an acid by the action of the acid generated from the vinyl monomer itself; B represents a repeating unit obtained by polymerizing at least one vinyl monomer having a partial structure capable of causing variation in the absorption region of from 360 to 900 nm by the action of an acid; C represents a repeating unit obtained by polymerizing at least one vinyl monomer copolymerizable with A and B; and x, y and z each represents % by weight and satisfy the conditions of $1 \leq x \leq 99$, $1 \leq y \leq 99$, $0 \leq z \leq 98$ and x+y+z=100.

2. The polymer as claimed in claim 1, wherein A in formula (6) has a function of generating an acid by the action of heat.

3. The polymer as claimed in claim 2, wherein A in formula (6) is a repeating unit obtained by polymerizing at least one vinyl monomer represented by the following formula (7):

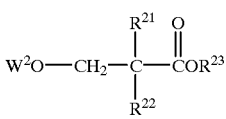

(7)

wherein $R^{21}$ represents an electron-withdrawing group having a Hammett's σp value greater than 0; $R^{22}$ represents an alkyl group or an aryl group; $R^{23}$ represents a secondary or tertiary alkyl group having a hydrogen atom at the β-position; $W^2$ represents a residue of an acid represented by $W^2OH$; and any one of the substituents $R^{21}$, $R^{22}$, $R^{23}$ and $W^2$ represents a polymerizable vinyl group.

4. An image recording medium which comprises a polymer having both (i) a partial structure of generating an acid by the action of an acid and further breading an acid by the action of the acid generated from the partial structure itself and (ii) a partial structure capable of causing variation in the absorption region of from 360 to 900 nm by the action of an acid.

5. The image recording medium as claimed in claim 4, wherein the polymer is a polymer represented by formula (6):

$$-(A)_{\overline{x}}(B)_{\overline{y}}(C)_{\overline{z}}- \qquad (6)$$

wherein A represents a repeating unit obtained by polymerizing at least one vinyl monomer having a function of generating an acid by the action of an acid and further breeding an acid by the action of the acid generated from the vinyl monomer itself; B represents a repeating unit obtained by polymerizing at least one vinyl monomer having a partial structure capable of causing variation in the absorption region of from 360 to 900 nm by the action of an acid; C represents a repeating unit obtained by polymerizing at least one vinyl monomer copolymerizable with A and B; and x, y and z each represents % by weight and satisfy the conditions of $1 \leq x \leq 99$, $1 \leq y \leq 99$, $0 \leq z \leq 98$ and $x+y+z=100$.

6. The image recording medium as claimed in claim 4, which further comprises an acid generating agent capable of generating an acid by the action of light or heat.

7. The image recording medium as claimed in claim 4, which further comprises (i) an acid generating agent capable of generating an acid by the action of heat and (ii) an infrared ray absorptive substance.

8. The image recording medium as claimed in claim 4, wherein the polymer is a polymer represented by formula (6):

$$-(A)_{\overline{x}}(B)_{\overline{y}}(C)_{\overline{z}}- \qquad (6)$$

wherein A represents a repeating unit obtained by polymerizing at least one vinyl monomer having a function of generating an acid by the action of an acid or heat and further breeding an acid by the action of the acid generated from the vinyl monomer itself; B represents a repeating unit obtained by polymerizing at least one vinyl monomer having a partial structure capable of causing variation in the absorption region of from 360 to 900 nm by the action of an acid; C represents a repeating unit obtained by polymerizing at least one vinyl monomer copolymerizable with A and B; and x, y and z each represents % by weight and satisfy the conditions of $1 \leq x \leq 99$, $1 \leq y \leq 99$, $0 \leq z \leq 98$ and $x+y+z=100$, whererin the image recording medium further comprises an infrared ray absorptive substance.

9. A method for recording an image, which comprises scan-exposing the image recording medium claimed in claim 4 by a laser beam.

10. A method for recording an image, which comprises scan-exposing an image recording medium claimed in claim 4 by a laser beam and then heating the entire surface of the image recording medium at a temperature of from 60 to 150° C.

11. An image recording medium comprising a polymer having both a moiety of generating an acid by the action of an acid and a partial structure of causing variation in the absorption region of from 360 to 900 nm by the action of an acid.

12. The image recording medium as claimed in claim 11, which further comprises an acid generating agent capable of generating an acid by the action of light or heat.

13. The image recording medium as claimed in claim 11, wherein the polymer is a polymer represented by formula (6):

$$-(A)_{\overline{x}}(B)_{\overline{y}}(C)_{\overline{z}}- \qquad (6)$$

wherein A represents a repeating unit obtained by polymerizing at least one vinyl monomer having a function of generating an acid by the action of an acid and further breeding an acid by the action of the acid generated from the vinyl monomer itself; B represents a repeating unit obtained by polymerizing at least one vinyl monomer having a partial structure capable of causing variation in the absorption region of from 360 to 900 nm by the action of an acid; C represents a repeating unit obtained by polymerizing at least one vinyl monomer copolymerizable with A and B; and x, y and z each represents % by weight and satisfy the conditions of $1 \leq x \leq 99$, $1 \leq y \leq 99$, $0 \leq z \leq 98$ and $x+y+z=100$.

14. The image recording medium as claimed in claim 11, wherein A in formula (6) is a repeating unit obtained by polymerizing at least one vinyl monomer represented by formula (7):

$$W^2O-CH_2-\underset{\underset{R^{22}}{|}}{\overset{\overset{R^{21}}{|}}{C}}-\overset{O}{\overset{\|}{C}}OR^{23} \qquad (7)$$

wherein $R^{21}$ represents an electron-withdrawing group having a Hammett's σp value greater than 0; $R^{22}$ represents an alkyl group or an aryl group; $R^{23}$ represents a secondary or tertiary alkyl group having a hydrogen atom at the β-position; $W^2$ represents a residue of an acid represented by $W^2OH$; and any one of the substituents $R^{21}$, $R^{22}$, $R^{23}$ and $W^2$ represents a polymerizable vinyl group.

15. The image recording medium as claimed in claim 11, which further comprises an infrared ray absorbing substance.

16. A method for forming an image, which comprises scan-exposing the image recording medium claimed in claim 11 by a laser beam.

17. A method for forming an image, which comprises scan-exposing the image recording medium claimed in claim 11 by a laser beam and then heating the entire surface of the image recording medium at a temperature of from 60 to 150° C.

* * * * *